United States Patent [19]

Toraichi

[11] Patent Number: 5,572,605
[45] Date of Patent: Nov. 5, 1996

[54] APPARATUS AND METHOD FOR INPUTTING, COMPRESSING AND OUTPUTTING CHARACTERS, ILLUSTRATIONS, DRAWINGS AND LOGOMARKS

[76] Inventor: Kazuo Toraichi, 14-2, Irumagawa 1-chome, Sayama-shi, Saitama-ken, Japan

[21] Appl. No.: 114,364

[22] Filed: Sep. 1, 1993

[30] Foreign Application Priority Data

Sep. 1, 1992 [JP] Japan ................................ 4-259137
Sep. 11, 1992 [JP] Japan ................................ 4-269646

[51] Int. Cl.$^6$ ........................................... G06K 9/36
[52] U.S. Cl. ..................... 382/241; 382/242; 382/243; 358/426
[58] Field of Search ........................ 382/22, 56, 25, 382/21, 241, 242, 243, 305, 201, 197, 203, 199; 358/426, 448

[56] References Cited

U.S. PATENT DOCUMENTS

| | | | |
|---|---|---|---|
| 4,771,474 | 9/1988 | Takashima et al. | 382/56 |
| 5,233,671 | 8/1993 | Murayama | 382/22 |
| 5,301,264 | 4/1994 | Hori et al. | 382/22 |
| 5,309,521 | 5/1994 | Matsukawa | 382/22 |

FOREIGN PATENT DOCUMENTS

2229337  9/1990  United Kingdom ............ H04N 1/411

OTHER PUBLICATIONS

Patent Abstracts of Japan, vol. 009, No. 217 (P-385) 4 Sep. 1985 & JP-A-60 075 975 (Shiyaken:KK) 30 Apr. 1985 *abstract*.

Bigelow et al, "Digital Typography", Scientific American, Aug. 1993, USA, 249, 2, pp. 94–105.

Coueignoux, "Character Generation by Computer", Computer Graphics and Image Processing, vol. 16, Jul. 1981, pp. 240–269.

Hersch et al, "Model-based Matching and Hinting of Fonts", Computer Graphics, vol. 25, No. 4, Jul. 1991, pp. 71–80.

Hersch, "Descriptive Contour Fill of Partly Degenerated Shapes", IEEE Computer Graphics and Applications, vol. 6, No. 7, Jul. 1986, pp. 61–70.

Potier et al, "Geometric Modelling of Digitized Curves", First International Conference on Document Analysis and Recognition Sep. 30–Oct. 2, 1991, pp. 152–150.

*Primary Examiner*—Leo Boudreau
*Assistant Examiner*—David R. Anderson
*Attorney, Agent, or Firm*—Cushman Darby & Cushman, L.L.P.

[57] ABSTRACT

A method of compressing inputting two-dimensional object, compressing the two-dimensional data in a short time to a small amount of data and reproducing in any size at any position. This invention reads two dimensional object, e.g. characters, figures, drawings or Illustrations optically, extracts peripheral points from a binary image, approximates the peripheral lines by Fluency functions, reckons curvatures at all points, and finds joints. The peripheral points series are divided by the joints. The lines between two neighboring joints are approximated by straight lines, arcs and free curves in this order. The free curves are approximated by linear combinations of Fluency functions. Adoption of joints greatly alleviates the quantity of data. Approximation by Fluency functions heightens the quality of the reproduced objects.

22 Claims, 50 Drawing Sheets

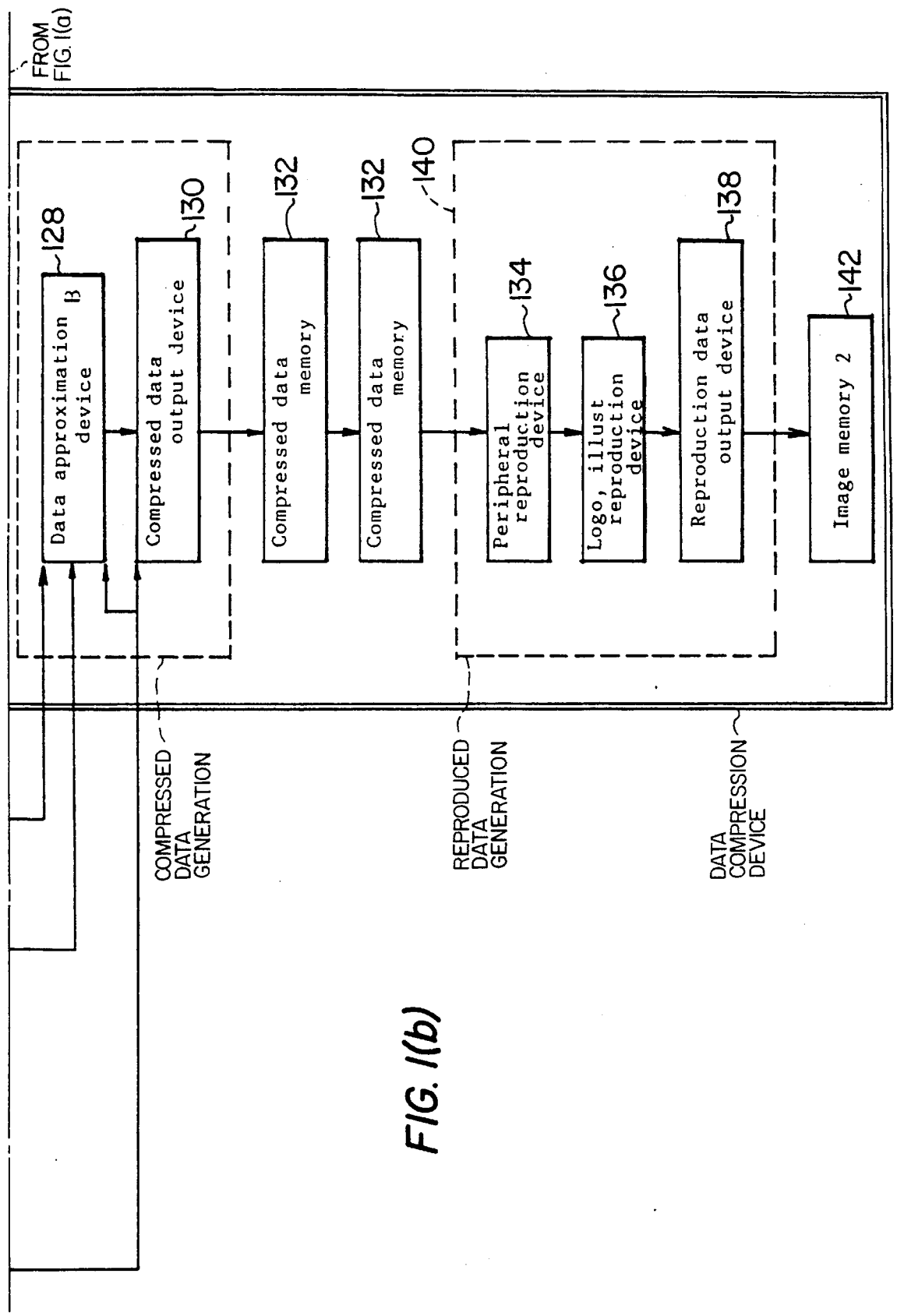
FIG. I(b)

FIG. 2
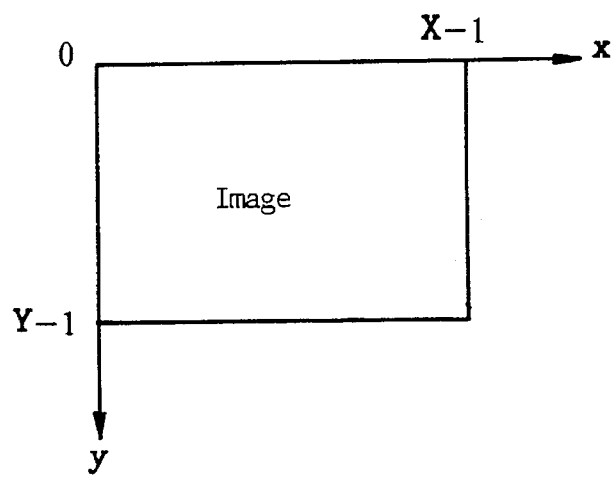
FIG. 3
| 5 | 6 | 7 |
|---|---|---|
| 4 |   | 0 |
| 3 | 2 | 1 |
FIG. 4
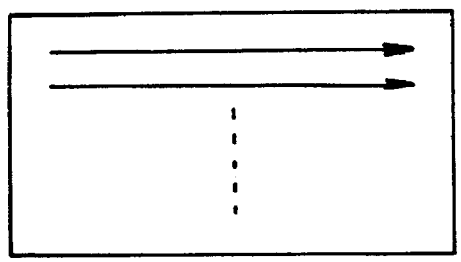
Scanning from left to right in lines downward Clockwise on outer periphery
Counterclockwise on inner periphery

(a)

(b)

(c)

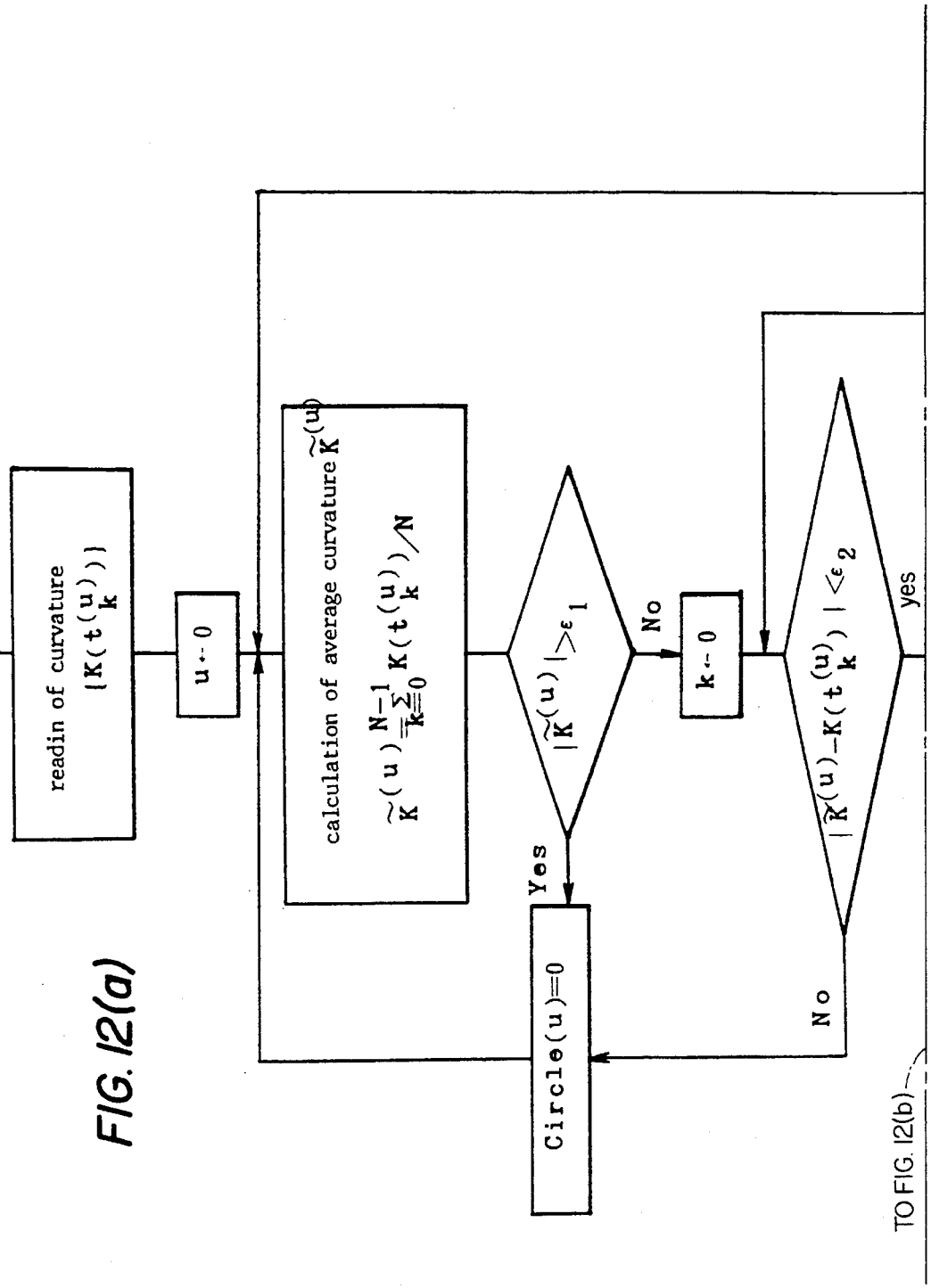

× : joints

× : joints

FIG.20

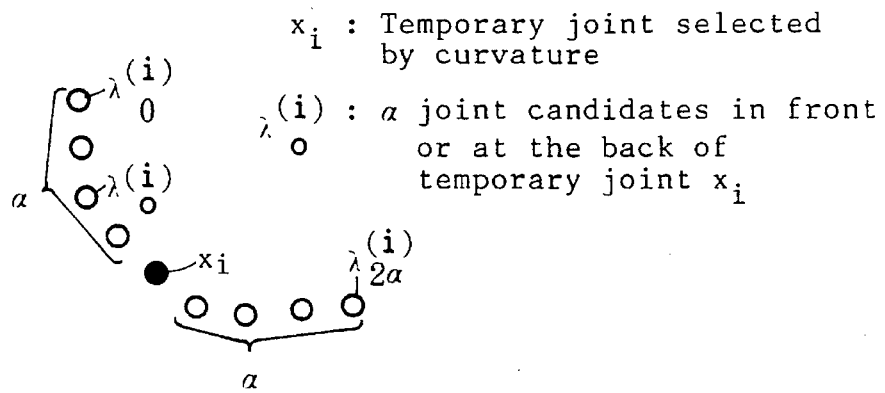

$x_i$ : Temporary joint selected by curvature $\lambda_o^{(i)}$ : $\alpha$ joint candidates in front or at the back of temporary joint $x_i$

FIG.21

Output neighbor

CASE 1    $J \geq 1$ ( neighboring joints exist )

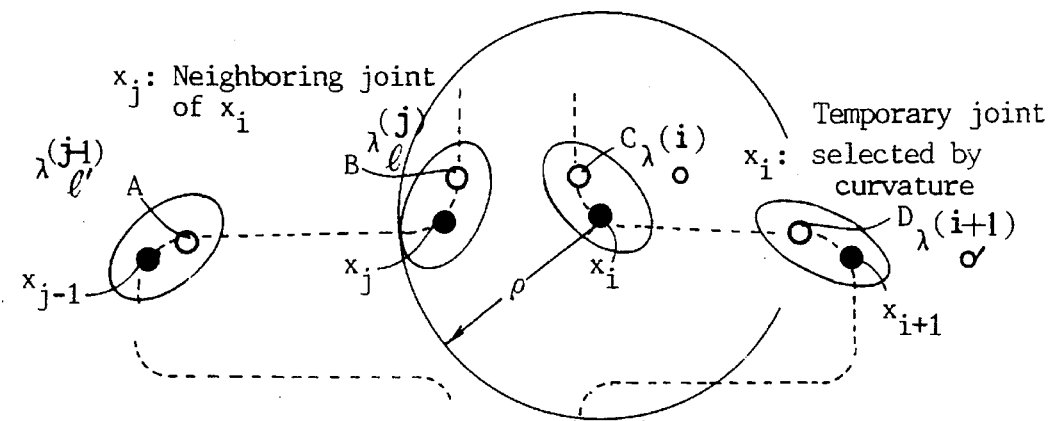

A: a point (fixed point) of $\max_{\ell'} P_{j-1}^{(t-1)}(\ell')$ among joint candidates $\lambda_{\ell'}^{(j-1)}$ of $x_{j-1}$ B: $\lambda_\ell^{(j)}$ C: $\lambda_o^{(i)}$ D: a point (fixed point) of $\max_{\alpha'} P_{i+1}^{(t-1)}(\alpha')$ amond joint candiates $\lambda_{\alpha'}^{(i+1)}$ of $x_{i+1}$

FIG.23(a)

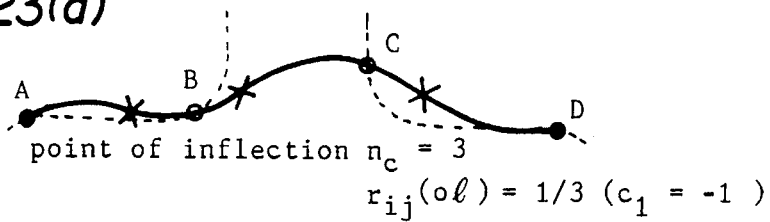

point of inflection $n_c = 3$ $r_{ij}(o\ell) = 1/3$ ($c_1 = -1$)

FIG.23(b)

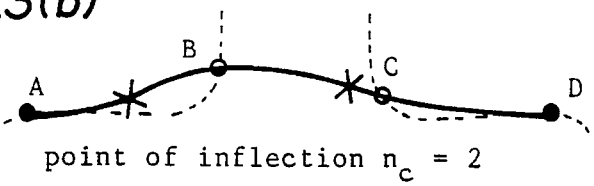

point of inflection $n_c = 2$

FIG.23(c)

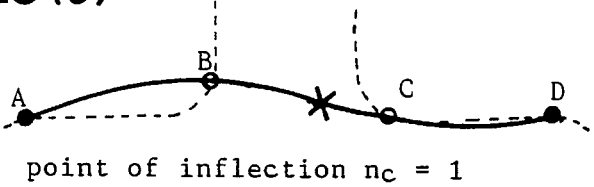

point of inflection $n_c = 1$

FIG.23(d)

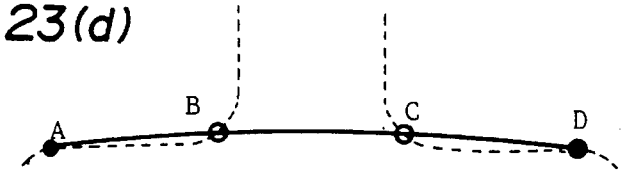

point of inflection $n_c = 0$
$r_{ij}(o\ell) = 1$

A: a point (fixed point) of $\max_{\ell'} P_{j-1}^{(t-1)}(\ell')$ among joint candidates $\lambda_{\ell'}^{(j-1)}$ of $x_{j-1}$ B: $\lambda_\ell^{(j)}$ C: $\lambda_o^{(i)}$ D: a point (fixed point) of $\max_{o'} P_{i+1}^{(t-1)}(o')$ among joint candidates $\lambda_{o'}^{(i+1)}$ of $x_{i+1}$ A : $\lambda_\ell^{(j)}$ B : $\lambda_o^{(i)}$ C : A point ( fixed point ) of
$\max\limits_{h} P_{i+1}^{(t-1)}(h)$ among joint candidates $\lambda_h^{(i+1)}$ of $x_{i+1}$ CASE 3   $J \geq 1$ A: a point (fixed point) of $\max_{\ell'} P_{j+1}^{(t-1)}(\ell')$ among joint candidates $\lambda_{\ell'}^{(j+1)}$ of $x_{j+1}$ B: $\lambda_{\ell}^{(j)}$ C: $\lambda_o^{(i)}$ D: a point (fixed point) of $\max_{o'} P_{i-1}^{(t-1)}(o')$ among joint candidates $\lambda_{o'}^{(i-1)}$ of $x_{i-1}$ FROM FIG. 28(a)

$$q_{i(o)}^{(t)\text{input}} = \max_{\lambda_1^{(j)} \in d_{j(i)}^{\text{input}}} \left\{ r_{ij(o1)} \times P_{j(1)}^{(t)} \right\}$$

$$q_{i(o)}^{(t)\text{output}} = \max_{\lambda_1^{(i)} \in d_{j(i)}^{\text{output}}} \left\{ r_{ij(k1)} \times P_{j(1)}^{(t)} \right\}$$

$$Q_{i(o)}^{(t)} = q_{i(o)}^{\text{input}} + q_{i(o)}^{\text{output}}$$

$$P_{i(o)}^{(t+1)} = \frac{P_{i(o)}^{(t)} \times Q_{i(o)}^{(t)}}{\sum_{\lambda_o^{(i)}} P_{i(o)}^{(t)} \times Q_{i(o)}^{(t)}}$$

t = 4 — yes → $\{ P_{i(o)}^{(4)} \}_{i=0}^{I-1}{}_{o=0}^{O-1}$

$$P'_i(o) = \begin{cases} 1 \\ 3 \\ 5 \\ \vdots \\ K-4 \\ K-2 \\ K \\ K-2 \\ K-4 \\ \vdots \\ 5 \\ 3 \\ 1 \end{cases}$$

$$P_i^{(0)}(o) = \frac{P'_i(o)}{\sum_o P'_i(o)}$$

$$P_i^{(t+1)}(o) = \frac{P_i^{(t)}(o) \times Q_i^{(t)}(o)}{\sum_{\lambda_o^{(i)}} P_i^{(t)}(o) \times Q_i^{(t)}(o)}$$

$$Q_i^{(t)}(o) = q_i^{input}(o) + q_i^{output}(o)$$

$$q_i^{(t)}(o) = \max \left\{ r_{ij}(o\,\ell) \times P_j^{(t)}(\ell) \right\}$$

- Input (readin)
- Extract peripheral lines → Extract integral circle
- Digitize
  Directly convert to analog signal
- Convert digital Curvature to analog signals — Joint position $\{x_i\}_{i=1}^{I}$ (I is total number of joints)
- Abstract $\lambda_k^{(i)}$
- Abstract neighbor joints $x_j$

FIG. 32(c) — Add

K joint candidates before and after $x_i$
$\{\lambda_k^{(i)}\}_{k=1}^{K}$

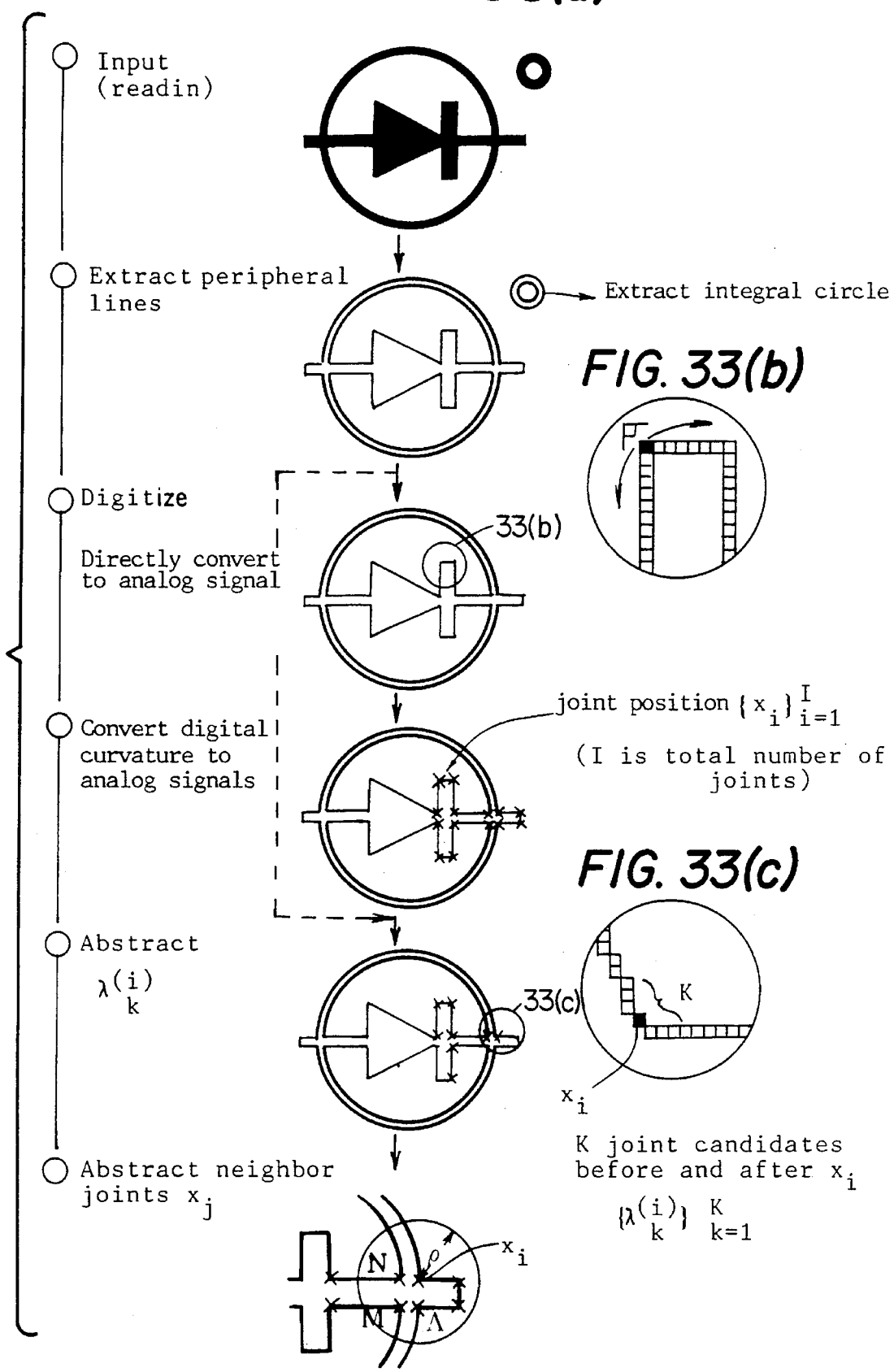

Joints of straight line $\{(X_{i4}^{(B)}, Y_{i4}^{(B)})\}$ $L_{ns} \geq K_7$ not eliminate $L_{ns} < K_7$ eliminate ☐ : peripheral points
▨ : joints Joints of partial circle ▨ : Joints FIG.46(a)
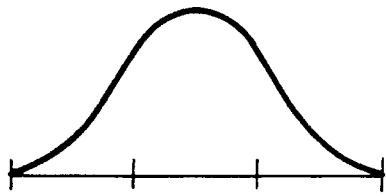
FIG.46 (b)        FIG.46 (c)
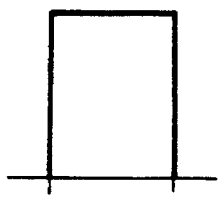        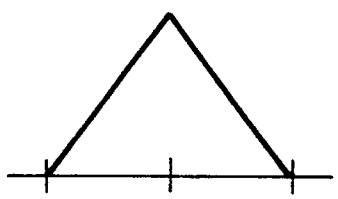
FIG.46 (d)        FIG.46 (e)
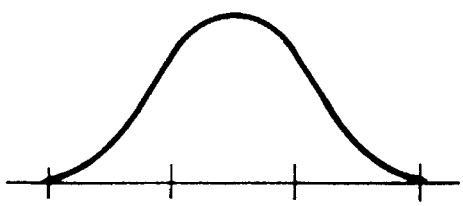        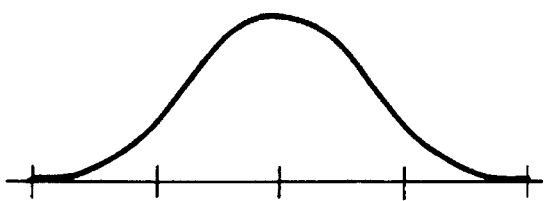

If dimension ( number of base functions ) is too small

Misfitting

If the dimension is increased, any curve can be well approximated by Fluency functions Rigorous approximation will increase dimension too much.
This approximation for calculating curvature employs bigger tolerance than the later approximation.

FIG.48(a)  FIG.48(b)  FIG.48(c)

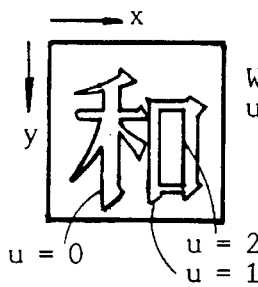
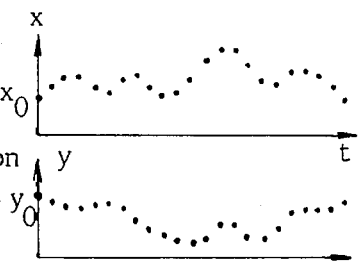

Start scanning from (0,0)

When u = 0, u = 0
u = 2
u = 1

Tracing front collides with a point separation to x and y

FIG.48(d)

FIG.48(e)
Point of first collision is an initial point
$(t_0^{(0)}, x_0^{(0)}), (t_0^{(0)}, y_0^{(0)})$ Approximate with 2nd order Fluency functions Start from M = 1

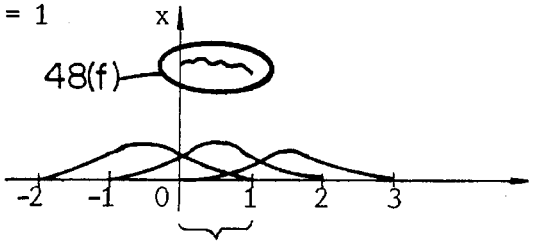

Approximate the piece

Approximate y similarly

If error exceeds ε, M → M + 1.
( error: sum of squares )

(increase dimension by one = increase one peak)

Big difference from original data

FIG.48(g)

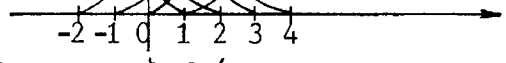

FIG.48(i)

converging

Increasing base functions

FIG.48(h) 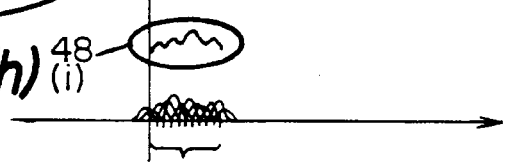

Bigger M can approximate more complicated curves
( In practical compression, some processes are done in all sub-regions )

FIG. 49(a)   FIG. 49(b)

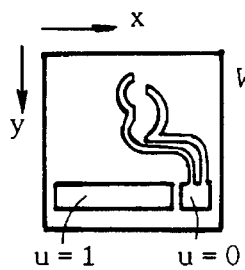

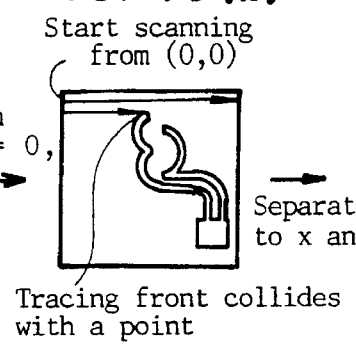

Start scanning from (0,0)

When u = 0,

Separation to x and y

Tracing front collides with a point

FIG. 49(c)

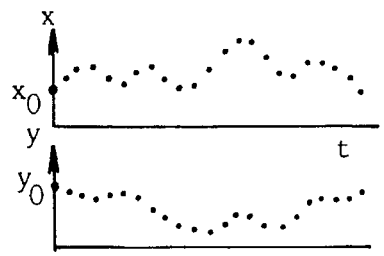

Point of first collision is an initial point $(t_0^{(0)}, x_0^{(0)})$, $(t_0^{(0)}, y_0^{(0)})$ Approximate with 2nd order Fluency functions
Start from M = 1

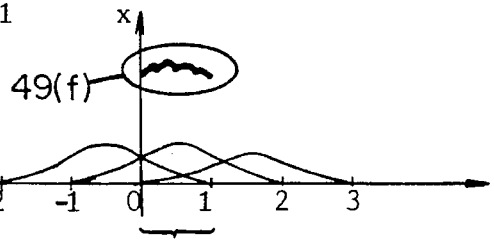

FIG. 49(f)

Approximate the piece

Approximate y similarly

If error exceeds ε, M → M + 1.
( error: sum of squares )

(increase dimension by one = increase one peak)

Big difference from original data

FIG. 49(g)

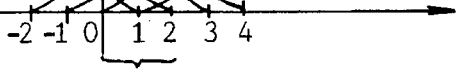

FIG. 49(i)

Increasing base functions converging

FIG. 49(h)

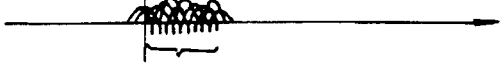

Bigger M can approximate more complicated curves
In practical compression, some processes are done in all sub-regions )

FIG.50 (a)
FIG.50 (b)
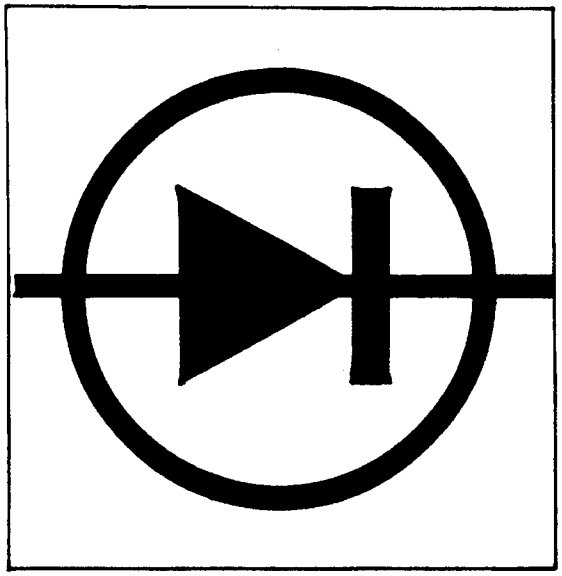
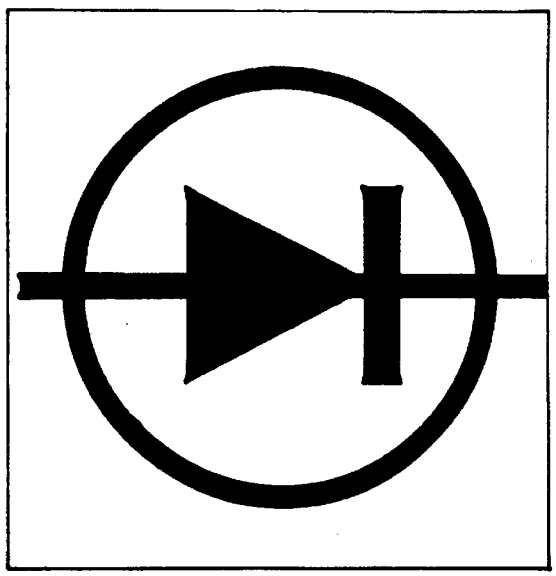
FIG.51

APPARATUS AND METHOD FOR INPUTTING, COMPRESSING AND OUTPUTTING CHARACTERS, ILLUSTRATIONS, DRAWINGS AND LOGOMARKS

FIELD OF THE INVENTION

This application claims the priority of Japanese Patent Applications No. 259137/1992 filed Sep. 1, 1992 and No. 269646/1992 filed Sep. 11, 1991, which are incorporated herein by reference.

This invention relates to an apparatus and method for inputting, compressing, and outputting image data, i.e. characters (print type or writing brush type), illustrations, drawings and logomarks without degrading the quality of the original images. In the case of characters, this apparatus reads in the mother characters of a character font by an image scanner, digitizes the data, compresses the digital data without losing the characteristics of the original characters, eliminates noise, stores the compressed data in a memory and revives the characters in any scale from the compressed data at any time. Similarly, in the case of drawings or illustrations, this apparatus inputs drawings or illustrations from original ones by an image scanner, converts data to digital data, compresses the digital data without losing the characteristics of the original drawings or illustrations, eliminates noise, memorizes the compressed data in a memory and restores the drawings or illustrates in any scale at any position on a paper, etc. at any time from the compressed data. This apparatus and method can be effectively used in printing machines, word processors or computers.

A character font of print is an assembly of print characters which have common features and sizes. A set of a definite size of character font is prepared in printing companies, etc. However, if the companies want to use the characters in smaller sizes or in bigger sizes by enlarging or diminishing the standard font, the mother character font is optically enlarged or reduced by a photocopy machine. But the optical change of size of characters is likely to degrade the quality of the reproduced characters owing to photo-induced noise. Straight lines become wavy, corners become blunt and thin lines blur. If the image data of a character font should be memorized, it is convenient to store the character font not as two-dimensional forms of characters themselves on paper but to store it as abstract digitized data in a memory. Japanese character font includes many kanjis (Chinese characters). If the amount of data for one character is large, it will take much time to store the character as digital data and it will require a big memory with a great capacity. Further, it will take much time to output the characters. A large amount of data for a character will be uneconomical. Less data per character are preferable for storing and outputting in any case.

On the contrary, drawings, illustrations or logomarks are assemblies of figures or patterns of arbitrary shapes or sizes. Some drawings are expressed in three-dimension space. However, this invention confines the scope of drawings to two-dimensional ones. Original drawings have been drafted on a paper. The original drawings are kept in a document file. If someone wants to reproduce a drawing, its original drawing must be photocopied by a copy machine. Enlargement or reduction will be done optically by enlarging photocopy or reducing photocopy.

Furthermore, if someone wishes to insert some figure into a position of a document, he must copy the figure, cut the copied figure by scissors, and glue the figure on the position by paste. All processes are done by manual operations. Since drawings, illustrations, etc. are assemblies of amorphous patterns or shapes, it is still difficult to store, reproduce, enlarge or reduce drawings, illustrations, logomarks, etc. Many designers and other people are making many illustrations, logomarks and figures every day. The same drawings or illustrations are not repeatedly used. Thus the processing of drawings has not been automated at all. Reproduction of drawings is also done in a large scale by printing machines instead of copy machines. In the case of printing, an original copy is produced by photocopy of the drawing. Thus printing is substantially a reproduction by photocopy. There is no prior art of automatic processing of drawings, illustrations, etc.

SUMMARY OF THE INVENTION

The apparatus of this invention comprises an image scanner for reading in characters, illustrations, drawings, logomarks and the like as an image on an image screen having pixels arranged in a matrix on which a two-dimensional coordinate is defined, an image memory for memorizing the image as a binary image defined on the pixels, a peripheral point extraction device for extracting peripheral points and peripheral point series from the memorized image and for representing the peripheral points by the series number and the two-dimensional coordinate defined on the pixels, a peripheral point memory for memorizing the series number and the two-dimensional coordinate (X,Y) of the peripheral points, a data approximation device A for approximating x-coordinates and y-coordinates of the peripheral points by piecewise polynomials $S_x(t)$ and $S_y(t)$ based upon Fluency functions having an intermediate variable t till an error between the coordinates and the approximating polynomials at the peripheral points decreases below a predetermined threshold, a curvature calculation device for calculating curvatures at all peripheral points by differentiating the piecewise polynomials $S_x(t)$ and $S_y(t)$, an integral circle extraction device for extracting integral circles from the curvatures, a joint position extraction device for extracting temporary joints which are peripheral points having a larger curvature than a threshold, an optimum joint extraction device for selecting optimum joints from joint candidates near the temporary joints which give the smoothest curve connecting four joints candidates belonging to four neighboring temporary joints, a joint eliminating device for removing needless joints without which the peripheral points can be approximated by piecewise polynomials with little error, a data approximation device B for approximating the peripheral lines between two neighboring joints by a straight line firstly and by an arc secondly, if an error of approximation by a straight line or an arc is still large, approximating x-coordinate and y-coordinate of the peripheral line by piecewise polynomials $S_x(t)$ and $S_y(t)$ based on Fluency functions of dimension M with an intermediate variable t, if an error is still large, approximating the same line by higher dimensional piecewise polynomials, till the error decreases below a predetermined constant, a compressed data memory for memorizing coordinates of the joints parameters approximating the lines between neighboring joints, a peripheral line reproduction device for reproducing the peripheral closed lines from the data of the joints and the parameters approximating the lines, a character • logo • illust • reproduction device for reproducing characters, illustrations, drawings, logomarks and the like by giving different colors to inner regions within the peripheral closed lines and to outer regions, and a reproduction data output device for outputting the reproduced data as real characters, drawings, illustrations or logomarks on paper, plastic sheet or other medium.

The function of this invention is now explained in brief. The whole parts of this invention are listed in FIG. 1 in advance.

A. First image memory 100;
B. Peripheral point series extracting device 102;
C. Peripheral point series memory 104;
D. Data approximation device A 106;
E. Curvature calculating device 108;
E'. Approximate curvature memory 110;
F. Integral circle extracting device 112;
G. Integral circle memory 114;
H. Joint extracting device 116;
I. Joint memory 118;
J. Optimum joint extracting device 120;
K. Optimum joint memory 122;
L. Joint elimination device 124;
M. Final joint memory 126;
N. Data approximation device B 128;
O. Compressed data output device 130;
P. Compressed data memory 132;
R. Peripheral line reproduction device 134;
S. Character (logo-illustration) reproduction device 136;
T. Reproduced data output device 138; and
U. Second image memory 140.

For example, processes are now explained with regard to a Japanese cursive character "ぱ(pa)" which is shown by FIG. 32. First the character written on a sheet of paper is read by an image scanner. This is an optical reading, i.e., optical input. Extraction of peripheral points which are an assembly of the peripheral lines makes a blank character which is represented by peripheral lines. This example reveals five groups of peripheral points; one group is the left vertical line, two groups are contained in the middle part resembling "よ" and the other groups belong to the right small round "○". The peripheral points are all represented by two-dimensional coordinates (X,Y). Then, coordinates X and Y are commonly expressed in series in each peripheral point group as functions of intermediate variables t. Namely, X and Y are converted to X(t) and Y(t), where "t" are independent variables, X and Y are dependent variables of t. All peripheral points are expressed by (X(t),Y(t)) as continuous functions of t, since the independent variables t are assigned in series to all peripheral point groups. Then X(t) and Y(t) of the peripheral points are approximated by piecewise polynomials. The approximation by piecewise polynomials converts the coordinates X(t) and Y(t) of peripheral points to continuous functions of t. Curvatures of the continuous curve (X(t),Y(t)) are calculated at all peripheral points by two-time differentiation. The peripheral point groups having a constant curvature at all points form a true, integral circle.

The point groups are first identified and separated as a circle. In the example, the righthand "○" is separated as a circle. Three peripheral point groups remain. The points which have a curvature bigger than the prescribed value are defined as joints. In other words, the point at which the inclination of lines abruptly changes is called a joint. Extraction of joints is one of most conspicuous characters of this invention. In the fourth figure of FIG. 32, joints are being extracting at corners or crossing points of peripheries. The joints are denoted by "x". The joints are sometimes added or eliminated afterward.

Then the peripheral lines are divided at the joints into sub-lines in which a set of piecewise polynomials is defined. Namely, a short sub-line between one joint and the next joint is the region on which a set of piecewise polynomials is defined. Such a joint which has been defined at the point having a big curvature is a first, temporary joint. In a preferable case, temporary joints are safely utilized as boundary points of piecewise polynomials. In the case of a character font, the objects of processing are clear-cut characters with little noise. Joints can be obtained exactly only from the calculation of curvature.

The selection of the joints is sometimes refined further. Some temporary joints will be eliminated and some joints will be added. Amendment of joints will be done for enhancing matching of a joint with neighbouring joints. The good coordination among joints is important for obtaining a clear-cut approximation of the original characters. The process of amendment will be later explained as the temporary joints and joint applicants. Furthermore, it is also profitable to eliminate unnecessary joints after the positions of joints have been changed. The amendment of joints will effectively remove noise which has been generated by the optical input (read-in). The positions of joints are finally decided by the amendment, i.e. adding and removing of joints. The final joints are literally called "final joints".

After the final joints have been decided, the lines between joints and the neighbouring joints are approximated by a straight line, partial circle and a free curve in this turn. The approximation shall be done in the order of a straight line, a partial circle and a free curve. Here a word "partial" is added in order to discriminate the circle from an integrated, closed circle. In the case of character font, straight line parts prevail. Most of the lines will be straight lines in the case of Chinese characters (Kanji). Partial circles succeed the straight lines in quantity. Free curves are least in many characters. In general, Chinese characters include straight lines, partial circles and free curves in quantity in this order. The order of frequency of appearance of straight lines, partial circles and free curves is the same as the order of the approximation of straight lines, partial circles and free curves. However, the order of approximation is not originated from nor determined by the order of frequency of appearance in characters. Otherwise enhancement of quality of approximated data demands the order of approximation, i.e. first by straight lines, second by partial circles and third by free curves. Otherwise if the lines were first approximated by free curves, straight lines and partial circles would be approximated by free curves in quadratic equations. Assembly of quadratic equations could not express straight lines or circles exactly. Noise would further deform the lines which have been inherently straight lines or circles. If the free curve approximation preceded the other approximation, straight lines and circles would suffer fatal deformation.

The lines are approximated in the order of straight lines, circles and free curves in order to approximate the straight lines and circles exactly. The straight line approximation needs short time. The data are quite a few. The circle approximation is also simple. A circle is identified by a coordinate of center, a radius and an arc angle. Most lines can be approximated by straight lines and partial curves. The remainder which can be approximated neither by straight lines nor circles will be processed by the free curve approximation. The scope of the independent variable t defining the line is divided into n small pieces and the line is approximated by piecewise polynomials defined on the n pieces. Increase of the number n of the pieces enhances the precision of approximation The approximation brings about parameters defining straight lines, partial circles and free curves constructing the peripheral lines of the original characters. The parameters are memorized as data of character font. The amount of data per character is about 300 to 500 bytes, depending on the number of lines or the complexity of the character.

Otherwise, when we handle a character as black-white figure, we have to memorize as much data as 8 kbytes per a character, if the image has 256 pixels in vertical direction and 256 pixels in horizontal direction. This invention allows us to compress the data memorized to a great extent. Exact compression of data is one of greatest features of this invention. Reversely, the straight lines, the arcs (partial circles) and free curves are restored by reading out the memorized data and rebuilding the lines, circles and curves at the joints.

For an example of logomarks or illustrations, a diode of FIG. 33 will be explained in short. At first, the figure of a diode is read in by an image scanner. This is an optical input or readin of logomarks or illustrations. The peripheral lines are extracted. The second figure of FIG. 33 exhibits the assembly of peripheral lines of the diode. Five peripheral point groups are included in the figure. The upper righthand circles have two concircle peripheral lines. The diode has two inner, upper and lower peripheral lines and one outer peripheral line. All the peripheral point groups are designated by two-dimensional coordinate (X,Y). The variables X and Y are represented by an intermediate variable t as X(t) and Y(t).

All peripheral lines are integrally approximated by piecewise polynomials defined at the full region of the point groups. Namely, the definition region of the approximation function is equal to the full length of the peripheral closed loop. The approximation by the polynomials converts the point series into two continual functions X(t) and Y(t) of t. The peripheral lines expressed by X(t) and Y(t) are twice-differentiated at all points with t in order to obtain the curvature at the point. As similar to the case of character, the peripheral lines which have a constant curvature at all points are eliminated as a true, integrated circle. The righthand small round is removed in this example. Three peripheral point groups remain. Then joints which have a curvature bigger than the determined value are abstracted for the remainder. Some joints are shown by "x" in the fourth figure of FIG. 33.

Then the peripheral lines are divided by the joints. If a clearly drafted figure is used as an original figure, the pertinent joints can be selected only from the curvature, since little noise is included. However, even if an original drawing is poorly drafted and blurred with noise, this invention reproduces a refined figure by amending the selection of joints. Since the following procedures are as same as the procedures of character, further explanation should be omitted.

Advantages of this invention will be explained. This invention enables a set of a computer, image scanner and printer to input original character font, illustrations, logomarks and compress into a small amount of data, memorize the shortened data and reproduce a copy of the original object in any size with a high quality in a short time.

In the case of character font, the processing time per character is very short. When a new character font comprising thousands of kanjis (Chinese characters) is originated, all the shapes of thousands of characters can easily be stored into a memory device in a short time as compressed data by this invention. Besides the easy input, this invention also facilitates the output of objects. Any size of a copy with high quality can be reproduced from the stored data.

In the case of illustrations, drawings and logomarks, this invention similarly allows a computer, image scanner and printer to input original figures, compress two-dimensional data into a small amount of digital data, and memorize the compressed data in a memory device. There is no need to keep the original paper on which the original figures are drawn. This invention can realize a paperless storage of illustrations or drawings for the first time. Furthermore, this invention succeeds in enhancing the quality of the reproduced figures, because straight lines in figures are extracted clearly as straight lines, circles in figures are extracted as geometrically-regular circles specified by a radius and a center, arcs in figures are also extracted as geometrically-regular arcs defined by a radius, a center and a center angle. Free curves are approximated by linear combinations of Fluency functions. Such a geometrical revision improves the quality of reproduced figures or characters in this invention by removing the inherently included or optically-induced noise. The elimination of redundant joints further enhances the quality of reproduced illustrations or figures. The time of processing per figure is short. When a lot of new illustrations or designs are originated, the designs can be memorized in a short time as mathematical data.

FIG. 51 and FIG. 52 exhibit examples of enlargement and reduction. Optical enlargement by a copy machine is likely to invite noise and blur peripheral lines. On the contrary, this invention enlarges or reduces figures by mathematical calculations. An arc or circle can be reproduced as a mathematically-regular arc or circle in an enlarged scale or reduced scale. Thus enlarged figures are clear-cut and definite. Neither peripheral lines blur nor straight lines become wavy. The quality of the enlarged figures of the invention excels in comparison with the optically enlarged figures by a photocopy machine.

FIG. 53 and FIG. 54 are examples demonstrating the freedom of rotation, anisotropic transformation, enlargement and reduction. FIG. 54(a) enlarges vertically the original figure. Fig. (c) slantingly transforms the figure. FIG. 54(d) rotates the figure by 90 degrees. FIG. 54(e) and FIG. 54(f) are examples of simultaneous rotation, transformation and reduction. FIG. 55 demonstrates examples of enlarging and reducing of the same mark. The position of printing is also freely chosen. These examples are rich in free curves. This invention can be applied even such examples and can find joints in the figures. FIG. 56 and FIG. 57 show post cards printed with illustrations. The post card can be made by enlarging or reducing an original drawing to an arbitrary size and printing the marks at an arbitrary position. This invention easily satisfies the requirement. Conventionally such a post card has been made by photocopying an original figure to a pertinent size, cutting the copy, and gluing the cut copy at a suitable position of a sheet of paper. This invention saves such tedious manual operations.

There have been no pertinent means for enlarging or reducing figures, illustrations or drawings except photocopying so far. But the processing of figures by the photocopying incurs the inclusion of noise and the degeneration of quality. Repetitions of photocopy vastly degrade the quality of reproduced figures. The photocopy cannot enlarge or reduce figures anisotropically.

On the contrary, this invention stores the data of figures as joints and coefficients of piecewise polynomials. Thus, mathematical calculation can enlarge, reduce, transfer, rotate and anisotropically deform the read-in figures. Neither inclusion of noise nor degradation accompanies the operations. Contrarily, this invention succeeds in raising the quality of figures by the elimination of redundant joints. The transference is accomplished by the parallel displacement of the coordinates of all joints. The enlargement and reduction are done by multiplying the coordinates, the radiuses of arcs, and the coefficients of piecewise polynomials. A small amount of data facilitates the calculation.

The rotation demonstrated in FIG. 54 can be done only by the calculation of multiplying the coordinates $\{(x_i^{(u)}, y_i^{(u)})\}$ of joints and the coefficients $\{c_h^{(x)}\}$, $\{c_h^{(y)}\}$ of approximation functions by the factors determined by the rotation angle.

The anisotropic enlargement or reduction is done by multiplying different factors to x-components and y-components of the joints or coefficients.

All Affine transformations, i.e. transference, rotation, enlargement, reduction and anisotropic deformation can be easily accomplished by a linear-transformation of the coefficients $\{c_h^{(x)}\}$, $\{c_h^{(y)}\}$. Since mathematical calculation realizes these Affine transformations, no noise accompanies the transformations. The processing invites no degradation of the quality of the reproduced figures. The time of calculation is very short, since the number of data has been reduced.

BRIEF DESCRIPTION OF THE DRAWINGS

FIGS. 1(a) and 1(b) are schematic view of apparatus for inputting and outputting of character font, logomarks, illustrations and the like of this invention.

FIG. 2 is a view of coordinates defining pixels on an image on which a character, logomark or illustration is input.

FIG. 3 is a view of chain codes defined around a pixel.

FIG. 4 shows the way of finding peripheral points in an image data.

FIGS. 12(a) and 12(b) are a flow chart of abstracting integral circles from the peripheral lines.

FIGS. 17(a) and 17(b) depict a sixteenth note as an example of logomarks, wherein FIG. 17(a) is an original draft and FIG. 17(b) is the peripheral lines on which joints are denoted by x.

FIGS. 18(a) and 18(b) depict a diode as an example of logomarks or illustrations of diode, wherein FIG. 18(a) is an original figure and FIG. 18(b) is peripheral lines having joints.

FIG. 20 depicts defining the numbers of a temporary joint and of neighbouring joint candidates.

FIG. 21 depicts clarifying the definition of numbers of temporary joints and output neighbor joints.

FIGS. 23(a)–23(d) demonstrate the curve connecting A, B, C and D and the numbers of the turning points in the curve, where C is a joint candidate near a temporary joint selected by the bigness of curvature, B is a joint candidate of output neighbor, D is the next joint of the temporary joint, and A is the joint just before the output neighbour joint candidate B.

FIGS. 28(a) and 28(b) are a flow chart showing the definition of the probability variables and the repetition of calculation of the probability variables which estimate the matching of the joint candidate.

FIGS. 32(a)–32(d) are an explanatory figure for retrospecting the processes mentioned in short by an example of "ぱ(pa)".

FIGS. 33(a)–33(c) are an explanatory figure for retrospecting the processes mentioned in brief by an illustration of a diode.

FIGS. 46(*a*)–46(*e*) are figures of a second order fluency function, 0-th order fluency function, first order fluency function and third order fluency function respectively.

FIGS. 48(*a*)–48(*i*) demonstrate the processes for approximating all the peripheral point groups by piecewise polynomials by quoting the Chinese character "和(wa)" as an example.

FIGS. 49(*a*)–49(*i*) demonstrate the processes for approximating all the peripheral point groups by piecewise polynomials by quoting an illustration of tobacco as an example.

FIG. 50(*a*) depicts an original drawing of a diode to be compressed and memorizes by this invention and FIG. 50(*b*) depicts a drawing reproduced by the memorized data.

FIG. 51 is an example of a logo-illustration with many free curves.

The position or size of the illustration can be arbitrarily selected.

Figure 57:
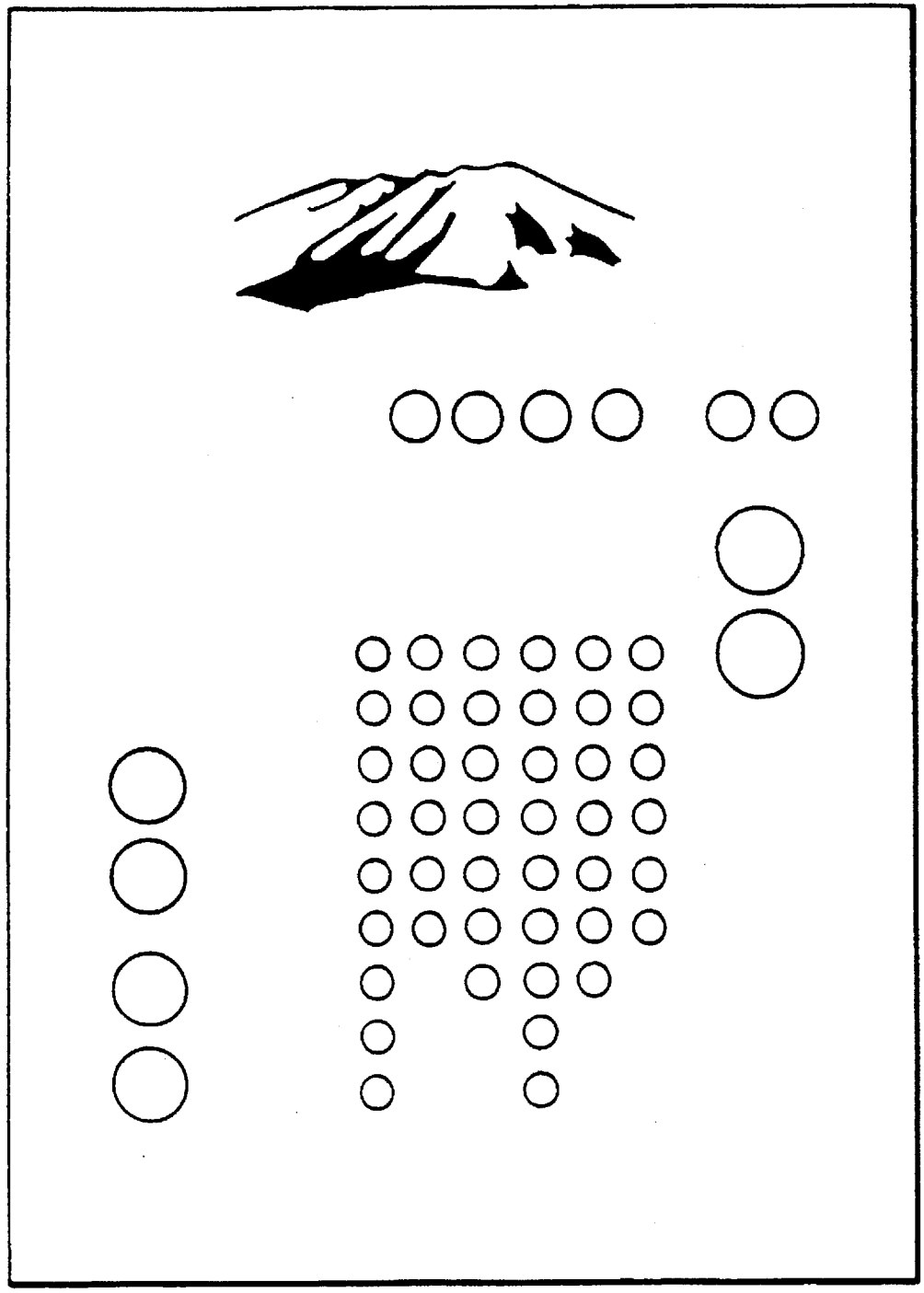

FIG. 57 is an example of a mail card in which an illustration of a mountain has been inserted by this invention.

DETAILED DESCRIPTION OF PREFERRED EMBODIMENTS

[A. First Image Memory 100]

Character font, logomarks, illustrations and the like written on paper are read in by an optical means. The read-in data are input as two-dimensional data into the first image memory 100. If the original object is monochromatic, lines, dots or other written parts become black pixels in an image screen. The other parts of blank become white pixels. A pixel takes only two values, i.e. black or white. The original characters, logomarks or illustrations may be colored. But the image memory stores the object with only two-value data for each pixel. A pixel is also assigned either to white or black in the colored object. The colored parts become black and the remaining parts which do not construct the characters, logomarks or illustrations become white. The data of black or white are memorized to all individual pixels.

For example, the object is input by an image scanner with a precision of 256 dots×256 dots. Of course the number of dots of input is arbitrarily selected. A larger number of dots in the image scanning will enhance the quality of the input image. However, if the number of dots (number of pixels) is large, it will take much time and require much memory capacity to calculate or store data. Thus, a pertinent size of an image scanner shall be chosen. The image data of the object are discriminated dot-by-dot whether the datum is black or white and stored to a memory pixel-by-pixel in the image memory.

The dot in an image screen is sometimes called a pixel. The word "pixel" is entirely equivalent to a dot. A sequence of black pixels is called a point series or a point group. A point means a black pixel. A dot may be a white pixel or black pixel. The position of a point is designated by a coordinate (X,Y), where X is the column number of counted pixels from the top to the bottom in the vertical direction and Y is the line number of counted pixels from the left to the right in the horizontal direction. The coordinate variables will be discriminated by affixing various suffixes.

[B. Peripheral Point Extracting Device 102]

The peripheral point extracting device 102 extracts the peripheral lines of the characters, logomarks, illustrations and the like read into the image memory. The operation of extraction is done by the steps of:

① discovering an unknown peripheral point by scanning the image data from the left to the right along a line and in the same direction along the next line and so on. FIG. 4 demonstrates the scanning for discovering an unknown peripheral point.

Figure 1A:
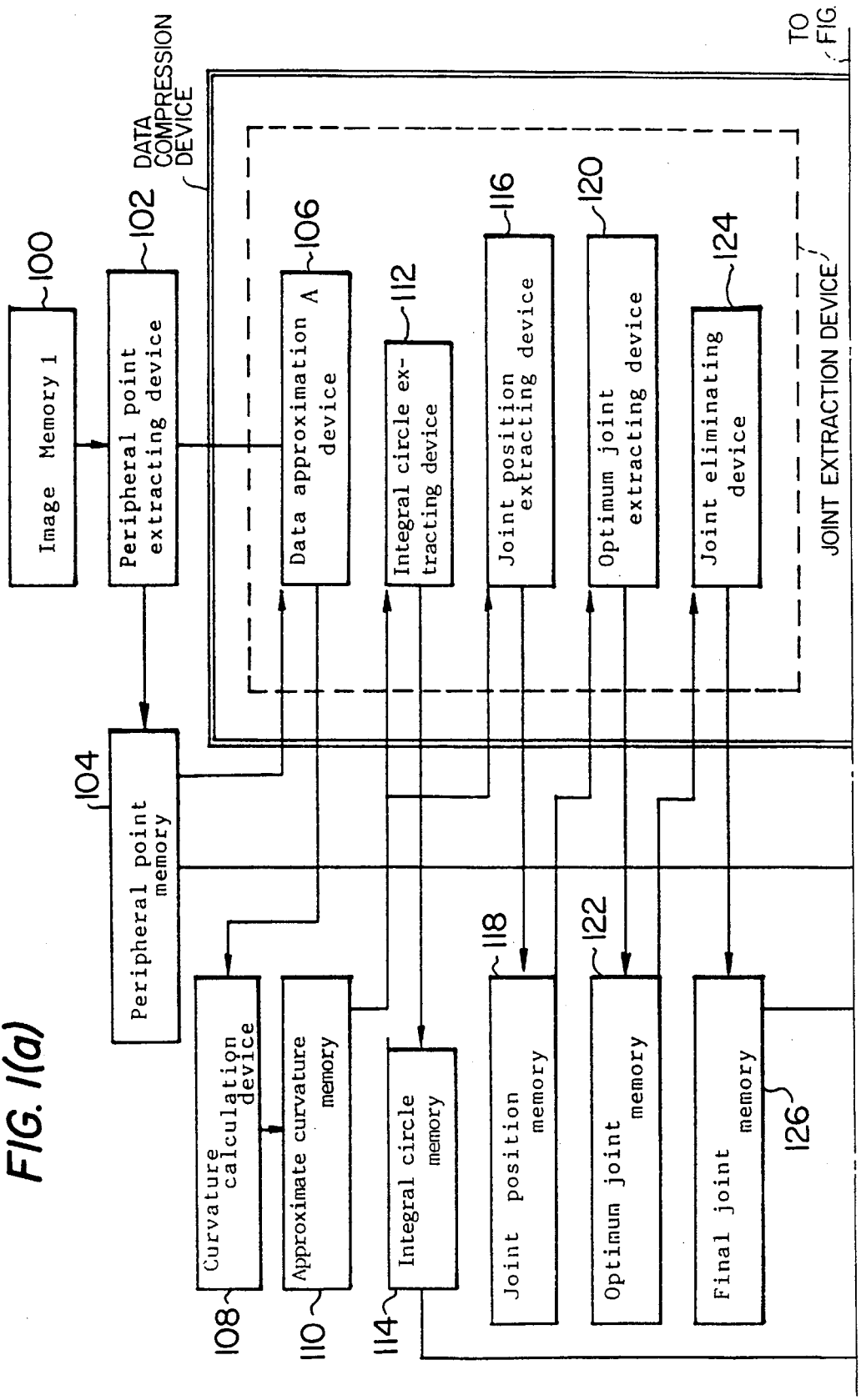
Figure 5:
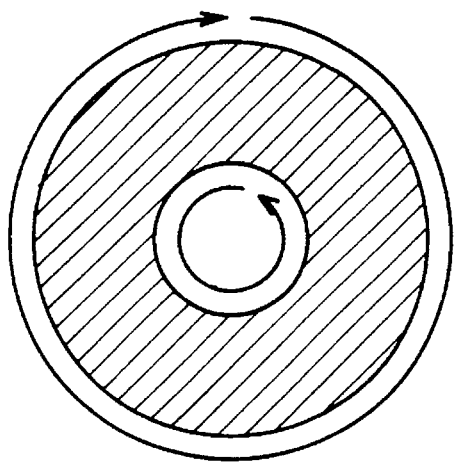
FIG. 5 shows the way of finding another peripheral point when a peripheral point has already found.

② finding the following peripheral points by searching the data in series clockwise on an outer periphery or counterclockwise on an inner periphery till the searching front returns the initial point. FIG. 5 shows the search of peripheries.

③ investigating all black pixels on the image memory from the uppermost line to the bottom line.

The definition of various words used herein is now explained. Any image can be expressed as an assembly of black pixels. All pixels are denoted by the coordinate (x,y) defined on the image, where "x" is the horizontally-increasing number of columns and where "y" is the vertically decreasing number of lines. X=0 and Y=0 is the uppermost and left-most dot. X pixels align in the horizontal direction. Y pixels align in the vertical direction. x takes a value between 0 and X−1. y takes a value between 0 and Y−1. As shown in FIG. 2, the y-axis is defined downward. Since the image is obtained by inputting an object, i.e. character, logomark, illustration or handwritten drawing, the pixels take either a black state or a white state.

Two-fold Image Data Input

A characteristic function $g_{xy}$ is defined by:
(i) if a black pixel (point) exists at the point (x,y) in the scope of $0 \leq x < X-1, 0 \leq y < Y-1$, $$g_{xy}=1 \qquad (1)$$

(ii) Otherwise (no black pixel exists at the point (x,y) or the pixel is beyond the definition scope)

$$g_{xy}=0 \qquad (2)$$

Namely, the characteristic function $g_{xy}$ represents a white dot by "0" and a black dot by "1".

Representation of Peripheral Point Series

Peripheral point series is a series of continuous black dots enclosing an assembly of black dots. A peripheral point series exists in the inner blank of an annular, closed assembly of black pixels as well as on the outer periphery. A closed set of continuous peripheral points is called "peripheral point series". U denotes the total number of peripheral point series. U series of peripheral points are designated by numbers from 0 to U−1. "u" is the number of the series of peripheral points. Series number "u" takes an arbitrary value between 0 and U−1. The total number of peripheral points contained in the series u is designated by N(u). "k" is the number of a peripheral point in the series u. Point number "k" is an integer between 0 and N(u)−1.

$(x_k^{(u)}, y_k^{(u)})$ signifies the coordinate of the k-th peripheral point in the u-th peripheral point series. The whole of peripheral points are integrally expressed by $$\{(x_k^{(u)}, y_k^{(u)})\}k=\square^{N(u)-1} u=\square^{U-1} \qquad (3)$$

"$k=\square^{N(u)-1}$" means that the point number k can adopt integers from 0 to N(u)−1 in the U-th peripheral point series. "$u=\square^{U-1}$" means that the series number u takes integers from 0 to U−1.

Chain Codes

Chain codes are the numbers from 0 to 7 allocated to eight neighboring pixels around a pixel clockwise. The chain codes will be used to signify the continuity of peripheral points as well as to investigate the continuity of the points. "c" denotes a chain code. Two functions α(c) and β(c) are defined by the following conditions:

| if c = 3, 4 or 5 | α (c) = −1 | (4) |
| if c = 2 or 6 | α (c) = 0 | (5) |
| if c = 0, 1 or 7 | α (c) = 1 | (6) |
| if c = 5, 6 or 7 | β (c) = −1 | (7) |
| if c = 0 or 4 | β (c) = 0 | (8) |
| if c = 1, 2 or 3 | β (c) = 1 | (9) |

Peripheral lines are extracted from the image data on the basis of the functions defined so far. A black pixel is discovered by scanning the whole image from uppermost dot to the lowest right dot. The peripheral lines are outer pixels of an assembly of the black dots holding $g_{xy}=1$. Encircling the assembly of the black pixels, the peripheral point extracting device memorizes the coordinates of the point series. Regarding the direction of encircling, an outer periphery is traced clockwise and an inner periphery is traced counterclockwise. FIG. 5 shows the order of tracing for peripheral points.

Figure 6:
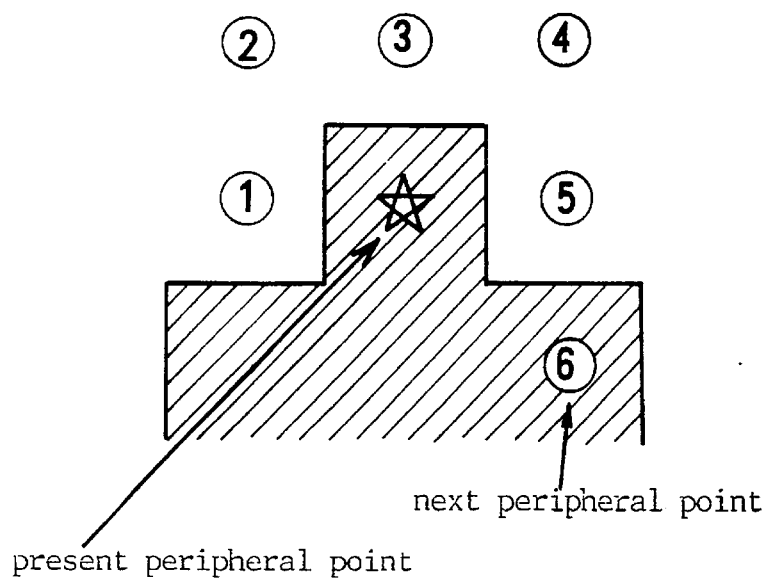
FIG. 6 demonstrates the current peripheral point and the succeeding peripheral point in the region in which white pixels and black pixels are present.

The tracing front has found a peripheral point of a peripheral point series. In order to find a next peripheral point, eight neighbor pixels around the last-found peripheral point are investigated clockwise to determine whether the pixels are black or white. FIG. 6 demonstrates the search of the next peripheral point. The point marked by "☆" is the last-found peripheral point. The tracing front searches eight dots clockwise. Pixels 1,2,3,4 and 5 are white dots ($g_{xy}=0$). They are not peripheral points. Pixel 6 is the first black dot ($g_{xy}=1$). Pixel 6 is a peripheral point. Then the third peripheral point will be searched around pixel 6 in a similar manner.

Similar processes will find peripheral points in succession. Since a next peripheral point is surely selected in eight neighbor dots, the assembly of the peripheral points forms a continuous series of points. $g_{xy}=2$ is allocated to peripheral points. Assignment of $g_{xy}=2$ discerns the peripheral points from white dots ($g_{xy}=0$) and from inner black dots ($g_{xy}=1$) in black patterns. The black dots should exist in a lump. Thus, the peripheral lines must form closed loops. The tracing front will return the initial peripheral point. When the tracing front returns the initial point, the extraction of peripheral points finishes regarding the series. There are U peripheral point series (closed loops) in the object. The number of peripheral point series is denoted by "u" ($0 \leq u \leq U-1$). "k" indicates the number of the peripheral point in a series. Of course $0 \leq k \leq N(U)-1$.

When a series of peripheral points has been determined, the search of FIG. 4 shall be started again in order to a next peripheral point. If the next point is found, the peripheral point series to which the found peripheral point belongs will be searched in the similar manner.

If the object (character, illustration, drawing, logomark or logotype) includes plural series of peripheral points, the same procedure will be repeated from the uppermost line to the lowest line in order to discover and determine all point series. The series of peripheral points are assigned with the numbers 0,1,2, ..., and (U−1). If the object has an inner hole as shown in FIG. 5, several times of searches find out a peripheral point belonging to the inner peripheral point series. When a peripheral point is discovered, the following points will be similarly searched by the way of FIG. 6. In the case of the inner lines, the points will be traced counterclockwise (FIG. 5). Then all peripheral points will be searched in the similar way. The coordinates of all the points will be memorized in a memory. The characteristic function of them is 2 ($g_{xy}=2$).

Figure 7:
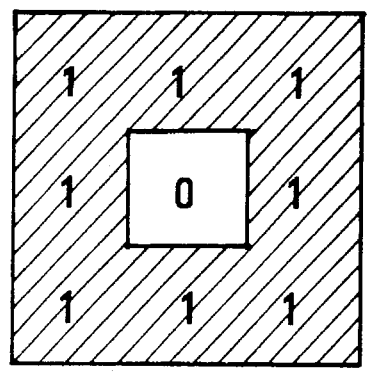
FIGS. 7(a)–7(c) show the process of abstracting an outer peripheral line and an inner peripheral line and assigning a value "2" to the pixels.
Figure 7:
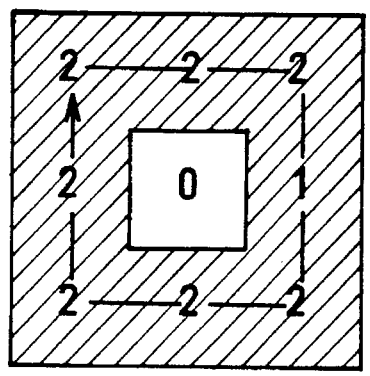
Figure 7:
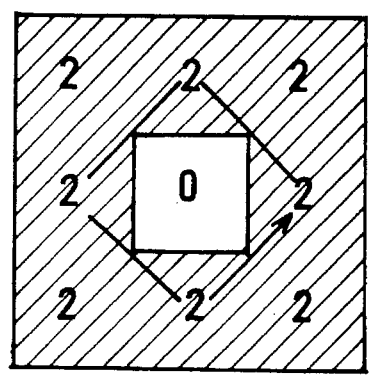
Figure 8A:
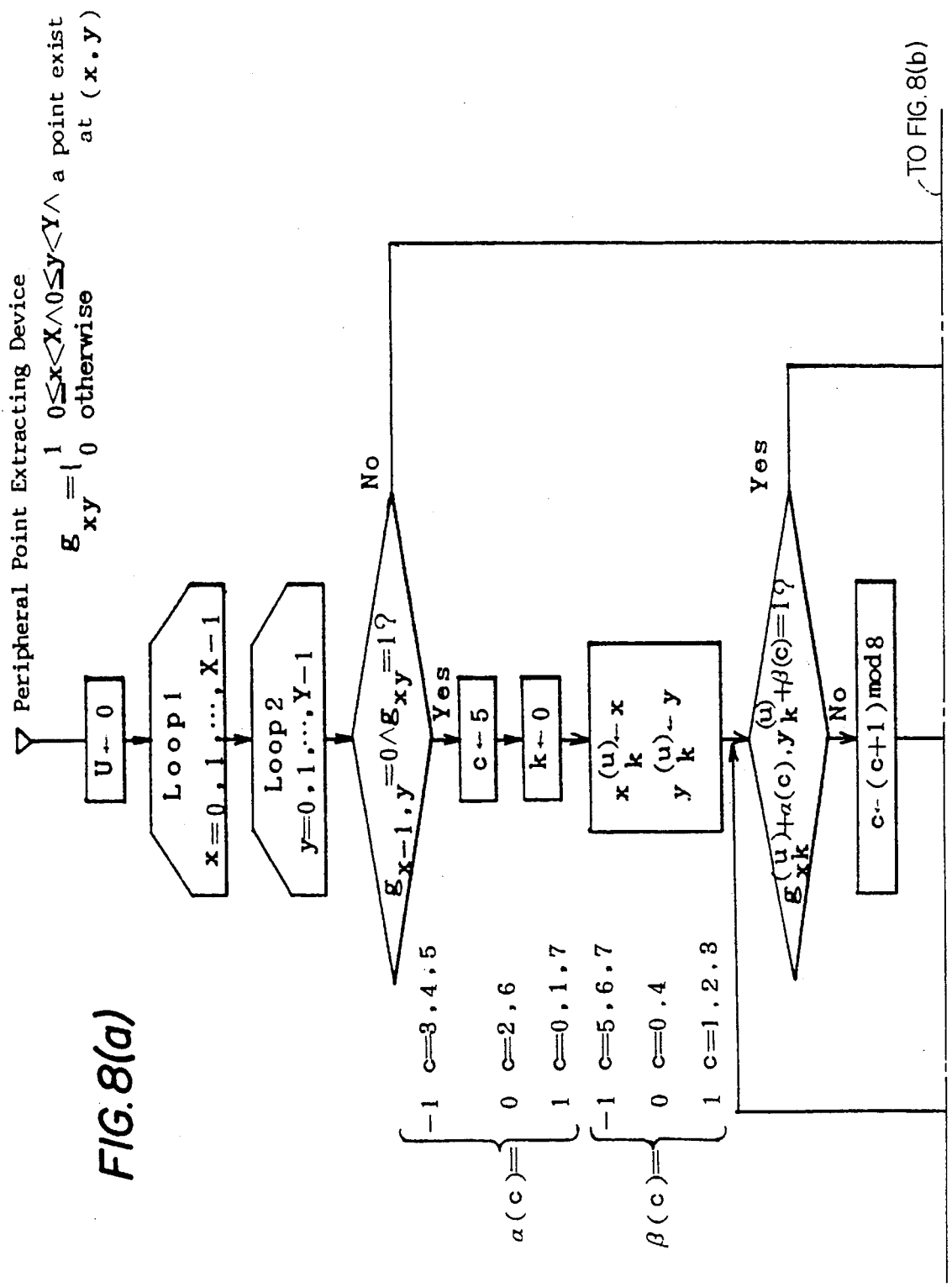
FIGS. 8(a) and 8(b) are a flow chart showing the function of the peripheral point extracting device.
Figure 8B:
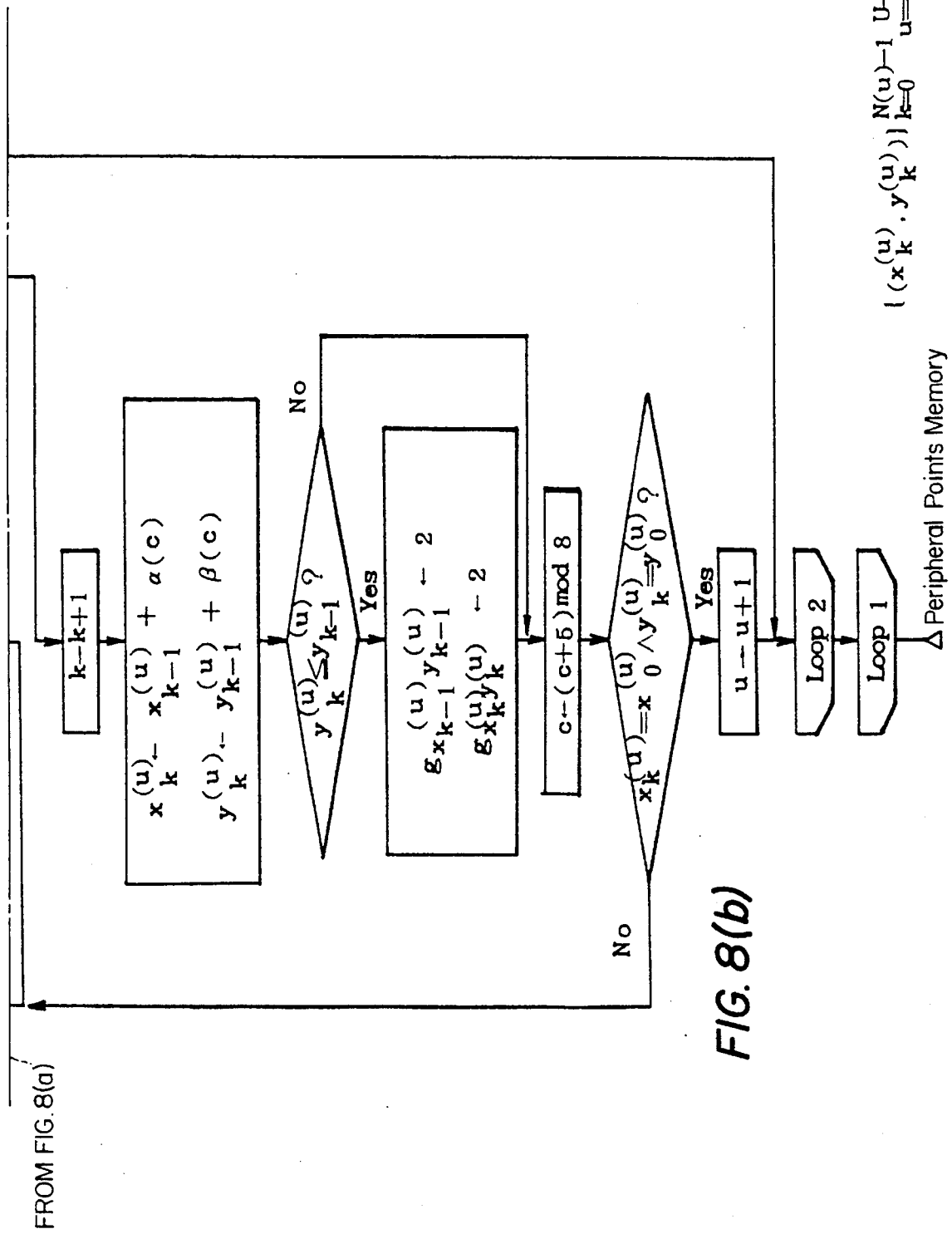

The search of peripheral point series is done with regard to the pixels of $g_{xy}=1$. A problem arises in the pattern which has a width of one pixel between the outer periphery and the inner periphery. FIGS. 7(a)–7(c) demonstrate the example. FIG. 7(a) is an annular pattern with one pixel width. The pixels with $g_{xy}=1$ exist in a square with a hole of $g_{xy}=0$. If the width between the outer periphery and the inner periphery is more than 2 pixel width, the previously mentioned procedures can determine the outer peripheral point series and the inner peripheral point series without ambiguity. However, if the width is a pixel width, the mentioned method will meet with a difficulty. First the outer peripheral point series is extracted. All frame dots having $g_{xy}=1$ originally were converted to $g_{xy}=2$ by the trace of the outer peripheral line according to the method. All the dots had $g_{xy}=2$. The pixels of $g_{xy}=1$ vanished. Since the tracing of peripheral line must start from a dot of $g_{xy}=1$, no trace of the inner peripheral line would start. The tracing front was not aware of the inner peripheral line. No trace would start for the inner periphery. The hole would be ignored.

To solve the difficulty, one rule is added. The rule is that the conversion from $g_{xy}=1$ to $g_{xy}=2$ shall be forbidden, if the next peripheral point lies lower than the present point. The next peripheral point should be left to $g_{xy}=1$. The peripheral point remains intact. FIG. 7(b) has such a point ($g_{xy}=1$) of the middle line of the right column. The point $g_{xy}=1$ becomes the seed for the trace of the inner peripheral line. The search begins from the pixel of $g_{xy}=1$ of the middle line of the right column. The inner peripheral points will be found by the tracing starting from the pixel. Without ignoring the hole, the tracing front will discover all peripheral points. FIG. 7(c) shows the result.

When the peripheral points have been determined, the rest of the black dots which exist at inner regions by more than two pixel thickness in black patterns are unnecessary to define the patterns. Determination of the peripheral points enables us to define the pattern without ambiguity. The coordinates of the inner black dots need not be memorized at all. The data of the inner black pixels are erased entirely. The elimination of the data alleviates the load of memory to a great extent.

[C. Peripheral Point Memory 104]

The peripheral point memory 104 is a device for storing the parameters defining the peripheral points. The parameters are memorized in the memory as $\{(x_k^{(u)},y_k^{(u)})\}k=\square^{N(u)-1}u=0^{U-1}$. As previously mentioned, U is the total number of the series, and u is the number of series. N(u) is the total number of the peripheral points of the u-th series. k is the number of point of the u-th series. $(x_k^{(u)},y_k^{(u)})$ means the two-dimensional coordinate of the k-th peripheral point of the u-th series. All peripheral points in the u-th series are represented by assigning values $0,1,2,\ldots,N(u)$ to k. All series are cited by taking values $0,1,2,\ldots,U-1$ for u.

[D. Data Approximation Device A 106]

This invention includes two data approximation devices 106, 128. The first device is now explained. The first data approximation device 106 is affixed with A to distinguishing the latter one. The first approximation is required to determine joints by calculating curvature of the peripheral point series. Joints are one of most important concepts of this invention. Joints mainly base this invention. A joint is determined by calculating curvature of the peripheral lines. Without preliminary processing, the curvature may be calculated from discrete point data of peripheral lines directly. This invention can utilize such curvature by the discrete calculation.

However, a more refined method for calculation of curvature is adopted here. The curvature will be calculated by approximating the peripheral point series with piecewise equations and differentiating the peripheral line function twice.

It may be an ordinary method for calculating curvature to differentiate the dependent variable y with the independent variable x and obtain the result of twice-differentiation. However, the direct differentiation of y with x is not desirable, since it makes the equations asymmetric with x and y. Symmetry of equation is with preferable x and y.

Thus, this invention employs a more sophisticated way. Variable "t" is adopted as an independent variable, and "x" and "y" are dependent variables on t. The peripheral points (x,y) are approximated by second order piecewise polynomials of t. The degree of approximation is estimated by the method of least squares. The approximation shall be renewed by increasing the base functions of piecewise polynomials, if the deviation is still too much. Several repetitions of calculations will bring about a sufficient approximation by piecewise polynomials. The approximation aims not to obtain the final result but to calculate curvature for determining joints.

Figure 9:
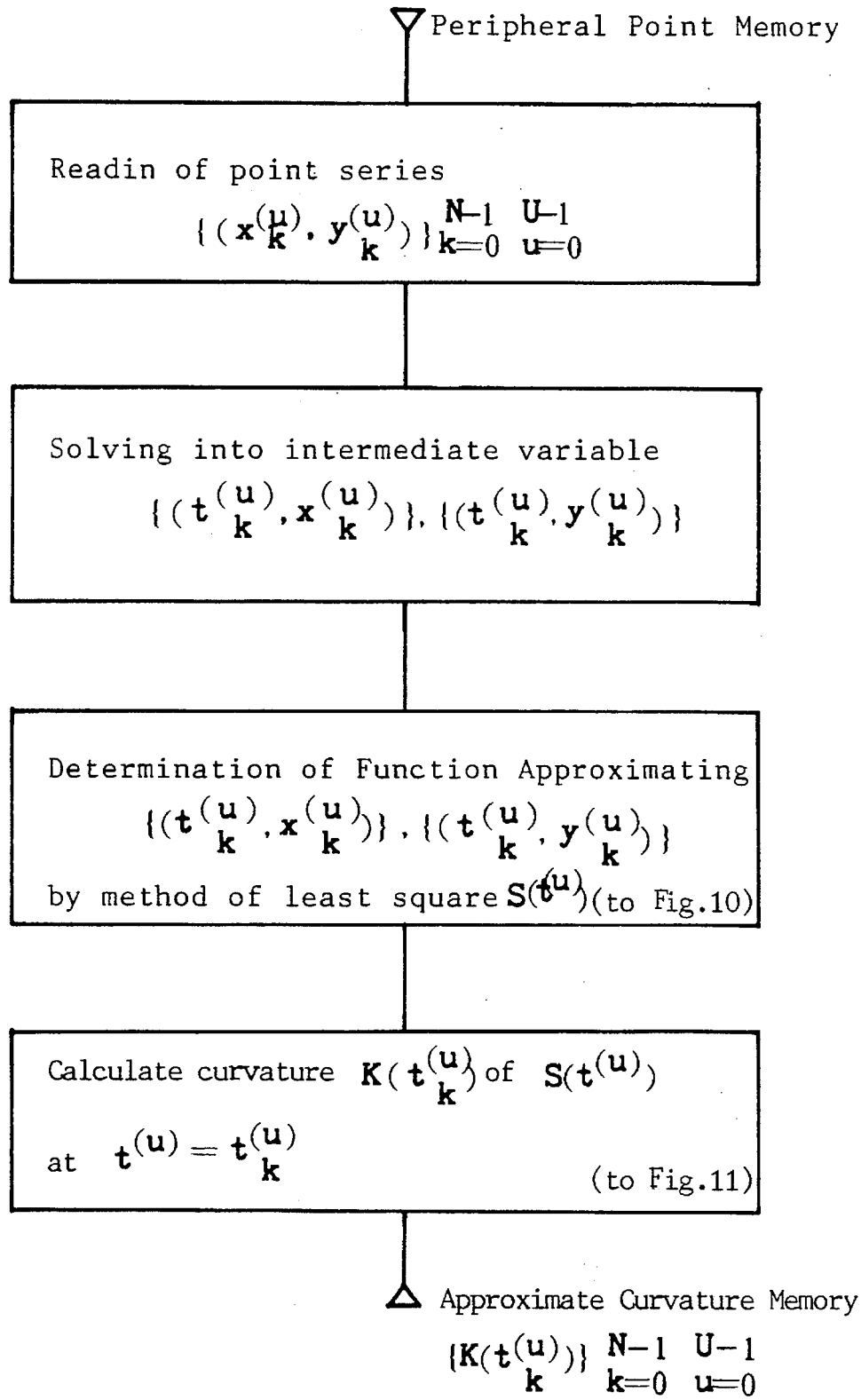
FIG. 9 is a flow chart of the function of the data approximation device for approximating peripheral point groups.

As mentioned before, the coordinate of the k-th point of the u-th series is denoted by $(x_k^{(u)},y_k^{(u)})$. A set of coordinates of the periphery is obtained from the previously explained peripheral point memory. FIG. 9 shows the processes for approximation. All coordinates $\{x_k^{(u)},y_k^{(u)}\}$ are read in from the peripheral point memory 104. Two-dimensional coordinates are now expressed by an intermediate variable t. A set of variables $\{x_k^{(u)},y_k^{(u)}\}$ is divided into two sets of independent variable t and dependent variables x and y; $\{t_k^{(u)},x_k^{(u)}\}$ and $\{t_k^{(u)},y_k^{(u)}\}$. The adoption of the intermediate variable t reduces two-dimensional problem to one-dimensional problem. The second block of FIG. 9 demonstrates the division of variables into two sets of variables. The same procedures will be performed for both sets of $\{t_k^{(u)},x_k^{(u)}\}$ and $\{t_k^{(u)},y_k^{(u)}\}$. Thus only the calculation of the set $\{t_k^{(u)},x_k^{(u)}\}$ is explained from now onward.

$S_x(t)$ is a function for approximating the u-th series of peripheral points $\{t_k^{(u)},x_k^{(u)}\}$. $S_x(t)$ is given by the linear combination of a set of second-order fluency functions $\{\phi_m\}$. Similarly $\{t_k^{(u)},y_k^{(u)}\}$ is also approximated by $S_y(t)$. The method of least squares estimates the degree of matching of the approximation with the original peripheral points. The tolerance for error is predetermined. If the error of the approximation equations from the original coordinates is within the threshold, the approximation is satisfactory for calculating curvature. If the error is still beyond the threshold, the approximation shall be renewed by increasing the number of base fluency functions. The approximation function will be defined on the increased bases.

What is important is that the $S_x(t)$ and $S_y(t)$ integrally approximate the whole closed loops of the peripheral point series. The region in which X or Y is defined is not divided into sub-regions. The same set of fluency functions is defined in the whole region. Namely, this first approximation includes no joint. The reason why the approximation includes no joints is because no joints have not been known yet at the stage. This approximation aims to calculate curvature of the peripheral lines.

As explained before, there is an easier method of calculating curvature without using this approximation. That is the way of calculating curvatures at a peripheral point from the discrete coordinates of neighboring peripheral points. Such a discrete calculation of curvature allows to practice the method of this invention. This invention is based on the approximation depending on joints which can be found by the bigness of curvature. The discrete calculation suffices for deciding joints. However, the way of calculation from the discrete points shall not be explained further, since some formulation of calculation of curvature has been known and other formulation can easily be deduced.

Here the generation of approximation functions $S_x(t)$ and $S_y(t)$ is clarified. $S_x(t)$ (also $S_y(t)$) is the linear combination of the fluency base functions. In other word, S(t) shall be expanded with coefficients on the non-periodic, m-th order Fluency functions φ (t) as bases.

$$S_x(t) = \Sigma_{k=-m}^{M+m} C_k^{(x)} \phi_k(t) \quad (10)$$

Fluency functions are functions invented by the inventor (Mr. Toraichi). The name "Fluency" has also been named by the inventor. Fluency has been named after the character of connecting points which are as fluent as possible. Fluency functions differ from spline functions which have been used for approximation. Fluency functions are superior to spline functions in the performance of approximation. "m" is the order of the polynomials. M is the dimension which is the number of pieces divided in the definition region. The definition region is written as [0,T]. A parameter k is suffixed to a Fluency function as $\phi_k(t)$. $C_k^{(x)}$ is a coefficient of the linear combination. Fluency function $\phi_k(t)$ is defined by:

$$\phi_k(t) = 3(t/M)^{-m} \Sigma_{q=0}^{m+1} (-1)^q \{t-(k+q)(T/M)\}^m_+ / \{q!(m+1-q)!\} \quad (11)$$

where $$k = -m, -m+1, \ldots, 0, 1, 2, \ldots, m+M \quad$$

The symbol "+" affixed the bracket { ... } means taking only a positive value of the bracket. If value in the bracket is negative, the bracket shall be 0. Namely, $$(t-a)^m_+ = (t-a)^m \text{ for } t > a \quad (12)$$
$$0 \text{ for } t \leq a \quad (13)$$

The base function $\phi_k(t)$ is a one-peak function which has definite (non-zero) values in (m+1) pieces from the k-th piece to the (k+m+1)-th piece. The base function is a sum of the m-th order functions obtained by transferring one-by-one an elementary curve $\{t-(k+q)(T/M)\}^m_+$(increasing q by one) which rises from 0 at t=(k+q)(T/M). When t>(k+m+1)(T/M), the base function φ(t) must be zero. The coefficients of the elementary curves are completely determined to be $(-1)^q/\{q!(m+1-q)!\}$ by the condition. T is the full length of definition region of t. M is the dimension which is equal to the number of division of the definition region T. The one unit of the division (T/M) is called a piece. M pieces (T/M) form a definition region T. All the coefficients of the base functions are uniquely defined within the definition region T. The length of T can be arbitrarily defined. The definition length T may have a common length. Otherwise T has a length in proportion to the number of peripheral points N(u). This invention preliminarily approximates the whole of the series of peripheral points with fluency functions without joints (which will be clarified later). Since there are sufficient pieces (T/M) in the definition region, the peripheral point series can be approximated satisfactorily. If the error of approximation is still large, the degree of approximation shall be enhanced by increasing the dimension M of Fluency functions. However, higher dimension hi requires more calculation and longer processing time.

One of the assertions of the Inventor is that linear combination of the first order Fluency functions and the second order Fluency functions is sufficient to represent the changes of most of the physical variables in nature. Namely, more than third order Fluency functions are unnecessary in many cases. Fluency functions the Inventor has originated are not a complete orthogonal system. If all order m of Fluency functions were employed to form a liner combination, arbitrary functions could be represented without doubt. However, the Inventor believes the feature of Fluency functions otherwise. Some low orders of Fluency functions suffice to represent any variables in nature. This invention adopts only the second order Fluency functions (m=2). All peripheral point series of characters, logomarks or illustrations can be approximated with the second order Fluency functions without significant errors. Of course, this invention can be built by higher than third order Fluency functions at the cost of increase of calculation time.

It is the most desirable to represent the change of physical variables in nature by a linear combination of most suitable system of functions. The adoption of the most suitable system of functions allows the least number of functions to approximate any variables with the highest precision.

On the contrary, the employment of a poorly-fitting system of functions would require a large linear combination including a lot of base functions for approximate any variables. Excess number of base functions makes it difficult to obtain a good approximation and imposes a heavy load on a memory because of the excess of data. The selection of misfit functions also incurs the difficulty of readout (output). The most suitable set of functions should be chosen. The Inventor believes the second order Fluency functions (m=2) is the most pertinent system of approximation.

Therefore, the Inventor now adopts the second order Fluency functions. FIG. 46(a) shows a second order Fluency function as a base. This is a piecewise polynomial. The polynomial is expressed by a quadratic curve ranging within three pieces. The rising at the first piece is quadratic and the falling at the third piece is also quadratic. The peak of the second piece is quadratic, too. The function has different quadratic equations in different pieces. At the boundaries of pieces, the values of the functions themselves and the first order differential coefficient are equal in both pieces.

The zero-th order Fluency function is a rectangular function which takes a single value only in a piece. FIG. 46(b) is the zero-th order Fluency function. The first order Fluency function is a triangle function which exists in two pieces, as shown by FIG. 46(c). The third order Fluency function is a smooth cubic function, which spans in four pieces, as shown in FIG. 46(e).

In general, the m-th order Fluency function (m≥2) is a smooth m-th order function which ranges in (m+1) pieces and has a peak at the middle. The function rises in the 1st piece in m-th order and falls in the (m+1)-th piece in m-th order. The function is also m-th order at the middle peak. The base function $\phi_k(t)$ is identified by a parameter k. "k" denotes the position of the function. An increase of k by one displaces the same function to the right by one piece. When a variable is approximated in a definition region by the m-th order piecewise polynomials, every piece has (m+1) base functions $\phi_k(t)$ substantially, because other base functions are all zero in the piece. It is possible to adopt more than third order (m≥3) Fluency functions.

But second order Fluency functions are here introduced as the bases of approximation (m=2). The base functions $\phi_k(t)$ spreads in three pieces. It rises and falls as a quadratic equation. The X-coordinate $S_x(t)$ of the series of peripheral points is expressed by a linear combination of $\phi_k(t)$.

$$S_x(t) = \Sigma_{k=-2}^{M+2} C_k^{(x)} \phi_k(t) \quad (14)$$

$$\phi_k(t) = 3(T/N)^{-2} \Sigma_{q=0}^{3} (-1)^q \{t-(t+q)(T/M)\}^2_+ /\{q!(3-q)!\} \quad (15)$$

The base function is a superposition of four quadratic equations denoted by $\{t-(k+q)(T/M)\}^2_+$ which are obtained by the displacement of one by (T/M). $\phi_k(t)$ has non-zero value from the k-th piece to the (k+3)-th piece. The coefficients $(-1)^q/\{q!(3-q)!\}$ are determined by the condition that $\phi_k(t)$ must vanish in the (k+4)-th piece. The number of the base functions is (M+5). M is the number of divisions of the definition region T. This is called a dimension M of approximation. M is different from m. Here, m=2. But the dimension M is a parameter which shall be increased for enhancing the precision of approximation.

Figure 47A:
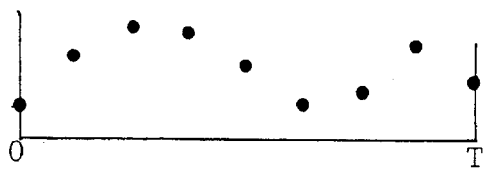
FIGS. 47(*a*)–47(*c*) are figures of approximating arbitrary data by Fluency functions as base functions and of showing an arbitrary function which can be precisely approximated by heightening the dimension of the Fluency functions.
Figure 47B:
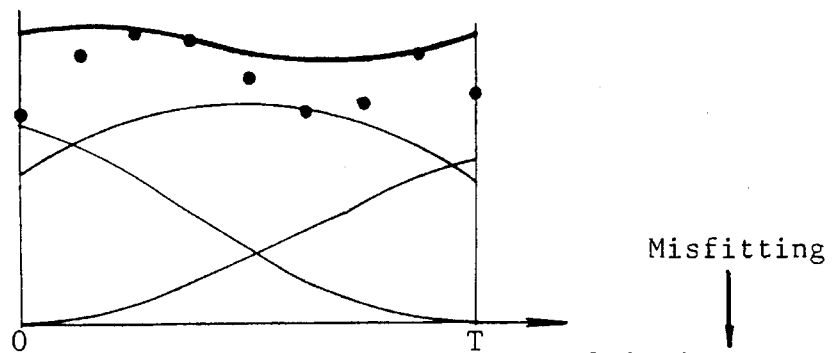
Figure 47C:
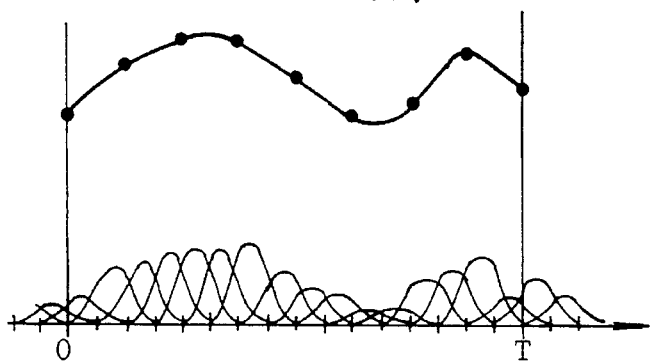
Figure 52:
FIG. 52 is a reduced figure of FIG. 51 which has been compressed, memorized and reproduced in a reduced size.

FIGS. 47(a)–47(c) will be helpful in understanding. FIG. 47(a) shows data points for example. The definition region of data points is 0 to T. FIG. 47(b) exemplifies an approximation of the data points by three base functions without division to pieces (M=1). The base functions and coefficients are so few that any linear combination of the base functions gives the data a poor approximation. However, an increase of the dimension M improves the approximation. As demonstrated in FIG. 47(c), any complexity of change can be approximated to a satisfactory extent by enhancing the dimension M.

The degree of approximation is estimated by the fidelity that $S_x(t)$ and $S_y(t)$ represent the original peripheral point series $(x_k^{(u)}, y_k^{(u)})$.

The method of least square is utilized to estimate the quality of the approximation. "Q" designates a sum of the squares of differences between approximating functions $S_x(t)$ and $S_y(t)$ and original coordinate $(x_k^{(u)}, y_k^{(u)})$.

$$Q = \Sigma_{k=\square}^{N(u)} [\{S_x(t_k^{(u)}) - X_k^{(u)}\}^2 + \{S_x(t_k^{(u)}) - y_k^{(u)}\}^2] \quad (16)$$

The method of least square demands the minimum of Q. The coefficients of the base functions are obtained by minimizing Q. The scope of summation is the whole peripheral points belonging to a peripheral point series u. Since this approximation is done for calculating curvature at peripheral points, rigorous precision is not demanded to the approximation. This is the first data approximation A. Data approximation will be repeated later. The later approximation B which gives parameters featuring the object requires more precise determination of coefficients.

Figure 10A:
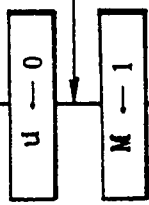
FIGS. 10(a) and 10(b) are a flow chart of the process of determining the coefficients for approximating the whole of the peripheral point groups.
Figure 10B:
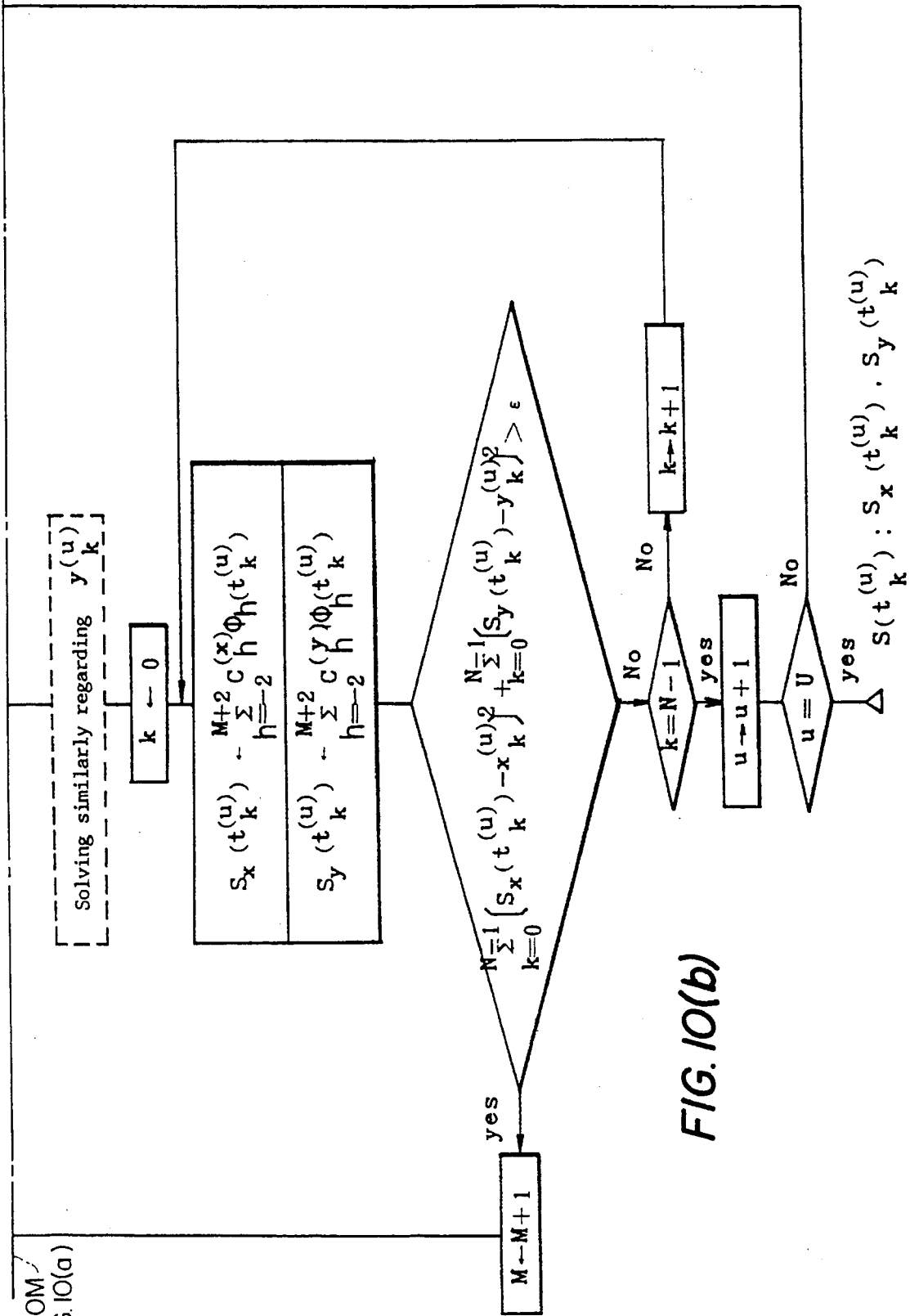

FIGS. 10(a) and 10(b) demonstrate a flow chart for the data approximation. Determination of coefficients $c_h$ is the purpose of the process described in the flow chart. The dimension M is a parameter for approximation. The coefficients $c_h$ are uniquely determined from Eq. (10) for a dimension M. However, the coefficients for the value of M do not necessarily satisfy the requirement imposed by the method of least squares. If Q is still bigger than a threshold, the dimension 54 shall be increased by one for improving approximation. Thus, the dimension is a parameter for signifying the hierarchy of approximation. The calculation is repeated by increasing 54 by one, till the error Q of the method of least square decreases below the threshold. When the approximation attains a satisfactory degree, the coefficients $c_h$ at the value of M are finally ascertained.

In Eq. (10), if $t=t_k$, $S_x(t)=x_k^{(u)}$. Substituting the relation into Eq. (10), we obtain $$x_k^{(u)} = \Sigma_{h=-2}^{M+2} C_h^{(x)} \phi_h(t_k^{(u)}) \quad (17)$$

Multiplying them by $\phi_w(t_k^{(u)})$ and summing up them with k, we gain the equations for determining the coefficients.

$$\Sigma_{k=\square}^{N(u)-1} \phi_w(t_k^{(u)}) X_k^{(u)} = \Sigma_{k=\square}^{N(u)-1} \Sigma_{h=-2}^{M+2} C_h^{(x)} \phi_h(t_k^{(u)})$$
$$\phi_w(t_k^{(u)}) = \Sigma_{h=-2}^{M+2} \Sigma_{k=0}^{N(u)-1} \phi_h(t_k^{(u)}) \phi_w(t_k^{(u)}) C_h^{(x)} \quad (18)$$

The second equation is here converted into the third equation by changing the order of summation. Since they are definite progressions, the order of summation can be freely varied.

The lefthand terms $\Sigma_{k=0}^{N(u)-1} \phi_w(t_k^{(u)}) X_k^{(u)}$ of Eq. (18) is deemed as a (M+5) dimensional column vector with suffixes w (w=−2, −1, 0, ..., M+2). The former terms $\Sigma_{k=\square}^{N(u)-1} \phi_h(t_k^{(u)}) \phi_w(t_k^{(u)})$ of the right hand terms are also deemed as a matrix of M+5 lines by M+5 columns whose elements are sums of products of Fluency functions. The latter terms $c_h^{(x)}$ of the righthand are a (M+5) dimensional column vector. A vector of C is denoted by an enlarged character c now. Vectors b x and c x are defined by $$c\,x = ^T\{C_{-2}^{(x)}, C_{-1}^{(x)}, C_0^{(x)}, \ldots, C_{M+1}^{(x)}, C_{M+2}^{(x)}\} \quad (19)$$

$$b\,x = ^T\{\Sigma_{k=0}^{N(u)-1} \phi_{-2}(t_k^{(u)}) x_k^{(u)}, \Sigma_{k=0}^{N(u)-1} \phi_{-1}(t_k^{(u)}) x_k^{(u)}, \ldots,$$
$$\Sigma_{k=\square}^{N(u)-1} \phi_{M+1}(t_k^{(u)}) x_k^{(u)}, \Sigma_{k=0}^{N(u)-1} \phi_{M+2}(t_k^{(u)}) x_k^{(u)}\} \quad (20)$$

The suffix "T" indicates a transposed matrix. A matrix G is defined by $$G = \{G_{hw}\} = \{\Sigma_{k=0}^{N(u)-1} \phi_h(t_k^{(u)}) \phi_w(t^{(u)})\} \quad (21)$$

Eq. (18) is reduced to a simplified equation holding among these vectors and matrixes.

$$b\,x = G\,c\,x \quad (22)$$

This is a matrix equation for seeking vector c x. The coefficients $\{c_k^{(u)}\}$ can be obtained by multiplying the inverse matrix $G^{-1}$ of G.

$$c\,x = G^{-1}\,b\,x \quad (23)$$

The coefficients $\{C_h^{(x)}\}$ of the present dimension M are determined by the matrix equation. This is the calculation of x-component. Similar calculations are carried out for y-component.

$$S_y(t) = \Sigma_{h=-2}^{M+2} C_h^{(y)} \phi_h(t) \quad (24)$$

$$y_k^{(u)} = \Sigma_{h=-2}^{M+2} C_h^{(y)} \phi_h(t_k^{(u)}) \quad (25)$$

$$\Sigma_{k=\square}^{N(u)-1} \phi_w(t_k^{(u)}) y_k^{(u)} = \Sigma_{k=\square}^{N(u)-1} \Sigma_{h=-2}^{M+2} C_h^{(y)} \phi_h(t_k^{(u)})$$
$$\phi_w(t_k^{(u)}) = \Sigma_{h=-2}^{M+2} \Sigma_{k=0}^{N(u)-1} \phi_h(t_k^{(u)}) \phi_w(t_k^{(u)}) c_h^{(y)} \quad (26)$$

Vectors b y and c y are defined as $$c\,y = ^T\{C_{-2}^{(y)}, C_{-1}^{(y)}, \ldots, C_{M+1}^{(y)}, C_{M+2}^{(y)}\} \quad (26')$$

$$b\,y = ^T\{\Sigma_{k=0}^{N(u)-1} \phi_{-2}(t_k^{(u)}) y_k^{(u)}, \ldots, \Sigma_{k=\square}^{N(u)-1} \phi_{-1}(t_k^{(u)}) y_k^{(u)}, \ldots$$
$$\ldots, \Sigma_{k=\square}^{N(u)-1} \phi_{M+1}(t_k^{(u)}) y_k^{(u)}, \Sigma_{k=0}^{N(u)-1} \phi_{M+2}(t_k^{(u)}) y_k^{(u)}\} \quad (27)$$

Like Eq. (23), the matrix equation also holds for y-components.

$$c\,y = G^{-1}\,b\,y \quad (28)$$

where $G^{-1}$ is the reverse matrix of G which has been defined by Eq. (21). This equation gives the solutions of the coefficients $\{C_h^{(y)}\}$ for a certain dimension M. FIG. 10 demonstrates the processes of calculation.

The calculation is carried out from the first peripheral point series u=0. The initial dimension M is 1. For u=0 and M=1, the vectors and matrix are defined. M=1 determines the number and forms of the vectors b x, b y and the matrix G. Eqs. (23) and (28) determine the coefficients $C_h^{(x)}$ and $c_h^{(y)}$ of $S_x(t)$ and $S_y(t)$ which approximate the first peripheral point series $(x_k^{(u)}, y_k^{(u)})$. The sum Q of squares of differences between the original peripheral points $(x_k^{(u)}, y_k^{(u)})$ and the approximating, continual functions $S_x(t)$ and $S_y(t)$ in order to estimate the degree of approximation.

$$Q = \Sigma_{k=0}^{N(u)-1} \{S_x(t_k^{(u)}) - x_k^{(u)}\}^2 + \{S_y(t_k^{(u)}) - y_k^{(u)}\}^2 \quad (29)$$

The sum Q is compared with a predetermined threshold (tolerance) $\epsilon$ for error. $\epsilon$ is a definite small positive constant. For example, the threshold may be equal to the distance between two neighboring pixels. If $Q > \epsilon$, the approximation is still insufficient. Then the dimension, i.e. degree of approximation shall be raised by one from M=1 to M=2. The increase of one $C_k$ accompanies the rise of M. In the dimension M=2, the similar process shall be repeated. If $Q > \epsilon$ still, M shall be increased further by one. The similar trials shall be repeated by raising M by one, till $Q < \epsilon$. When the inequality $Q > \epsilon$ holds for the first time, the repetition of approximation is finished. The coefficients $\{C_h^{(x)}\}$, $\{C_h^{(y)}\}$ and dimension M are finally determined. The approximation functions $S_x(t)$ and $S_y(t)$ are also determined. Approximation of the first peripheral point series u=0 has been done. Next, the similar approximation starts for the second peripheral point series u=1. Some repetitions of approximation will determine the coefficients for u=1. Similarly, if the coefficients of the peripheral point series u has been determined, the same calculation shall be done on the next peripheral point series u+1 till u attains U−1 (the final peripheral point series).

FIGS. 48(a) to 48(i) again demonstrate the processes of approximation of a character font. A Chinese character, e.g. "和" is input to an image memory by an image scanner. A scanning front scans the image from the left, uppermost pixel (0,0). The first point with which the scanning front meets is designated by $t_0^{(\square)}$, $x_0^{(\square)}$) and $(t_{58}^{(0)} y_0^{(\square)})$. Then the extraction of the first peripheral point series u=0 begins from the initial point by the way of FIG. 6. The coordinates (x,y) of the found points are indicated in series by the intermediate variable t. The peripheral point extraction results in obtaining three independent peripheral point series (U=3). "u=0" is the left peripheral point series. "u=1" is the outer peripheral point series like "□". "u=2" is the inner point series of u=1. All three series u=0,1 and 2 have the expression of the coordinates with the intermediate variable t. The righthand graph of points exhibits an example of x(t) and y(t).

The point series are approximated by the second order Fluency functions (m=2). The dimension M indicates the degree of approximation.

The approximation starts from M=1. M=1 treats all the definition region [0,T] ([0,1] in this case) as one piece. Three base functions $\phi_{-2}(t)$, $\phi_{-1}(t)$ and $\phi_0(t)$ have definite values (non-zero) in the piece. Six coefficients $C_k^{(x)}$, $C_h^{(y)}$ (k,h=−2,−1, 0) of the base functions are determined by Eqs. (23) and (28) for approximating $x(t_k)$ and $y(t_k)$ of the points by $S_x(t)$ and $S_y(t)$. A curve shown at the middle figure of FIG. 48 is obtained. Enlarged curve is shown at the left extension with original points, which indicates large errors of the curve. The errors can be estimated by the sum of squares of errors as denoted by Eqs. (16) and (29). This estimation is called now the estimation by the method of least square. If the approximation turns out to be insufficient, the dimension M shall be increased by one. The next line exhibits the example of M=2. The definition region is divided into two pieces [0, 0.5] and [0.5, 1]. The base functions increase to four, i.e. $\phi_{-2}(t)$, $\phi_{-1}(t)$, $\phi_0(t)$ and $\phi_1(t)$. Similar approximation is repeated on the four base functions. Eight coefficients are determined by the matrix equations Eqs. (23) and (28). An error is estimated by the method of least square. If the error is larger than the threshold, the approximation calculations shall be repeated by increasing M by one. The lowest line exhibits the case of M=10. Ten pieces with a 0.1 length appear in the definition region [0,1]. Twelve base functions $\phi_{-2}(t)$, $\phi_{-1}(t)$, ... and $\phi_9(t)$. The larger M becomes, the more precisely Fluency functions approximate any complex distribution of points. Big dimension M allows us to approximate any curves by Fluency base functions with high precision. The calculation explained here is rather a rough approximation for obtaining curvature without joints. The whole of a peripheral point series is treated as one definition region. On the contrary, the approximation for compressing data is carried out with regard to the definition regions between neighboring joints. The division of the definition region into pieces must not be confused with the division of a peripheral line by joints. No joint is used in the first approximation for calculating curvature. The above is the data approximation device A 106.

FIGS. 49(a) to 49(i) again explain the approximation in the case of logomarks or illustrations. An illustration of tobacco is input by an image scanner on a display and in an image memory. A tracing front scans the tobacco image from the uppermost, left pixel (0,0). The tracing front meets for the first time with a point of the figure. The point is the initial point. The coordinates are represented by $(t_0^{(\square)}, X_\square^{(0)})$ and $(t_0^{(\square)}, y_\square^{(0)})$. The tracing operation starts from the initial point for extracting a peripheral line. Extraction of peripheral points gains two series of peripheral points. The left, lower rectangle is denoted by u=1. "u=0" is assigned to the right perfume. Both peripheral point series are expressed with the intermediate variable t by $\{t_k^{(u)}, x_k^{(u)}\}$ and $\{t_k^{(u)}, y_k^{(u)}\}$. The following processes are similar to the case of the character font of FIGS. 48(a)–48(i). This invention enjoys a wide scope applicability. The same method can be applied to characters and free-drafted drawings without any revisions.

[E. Curvature Calculating Device 108]

Figure 11:
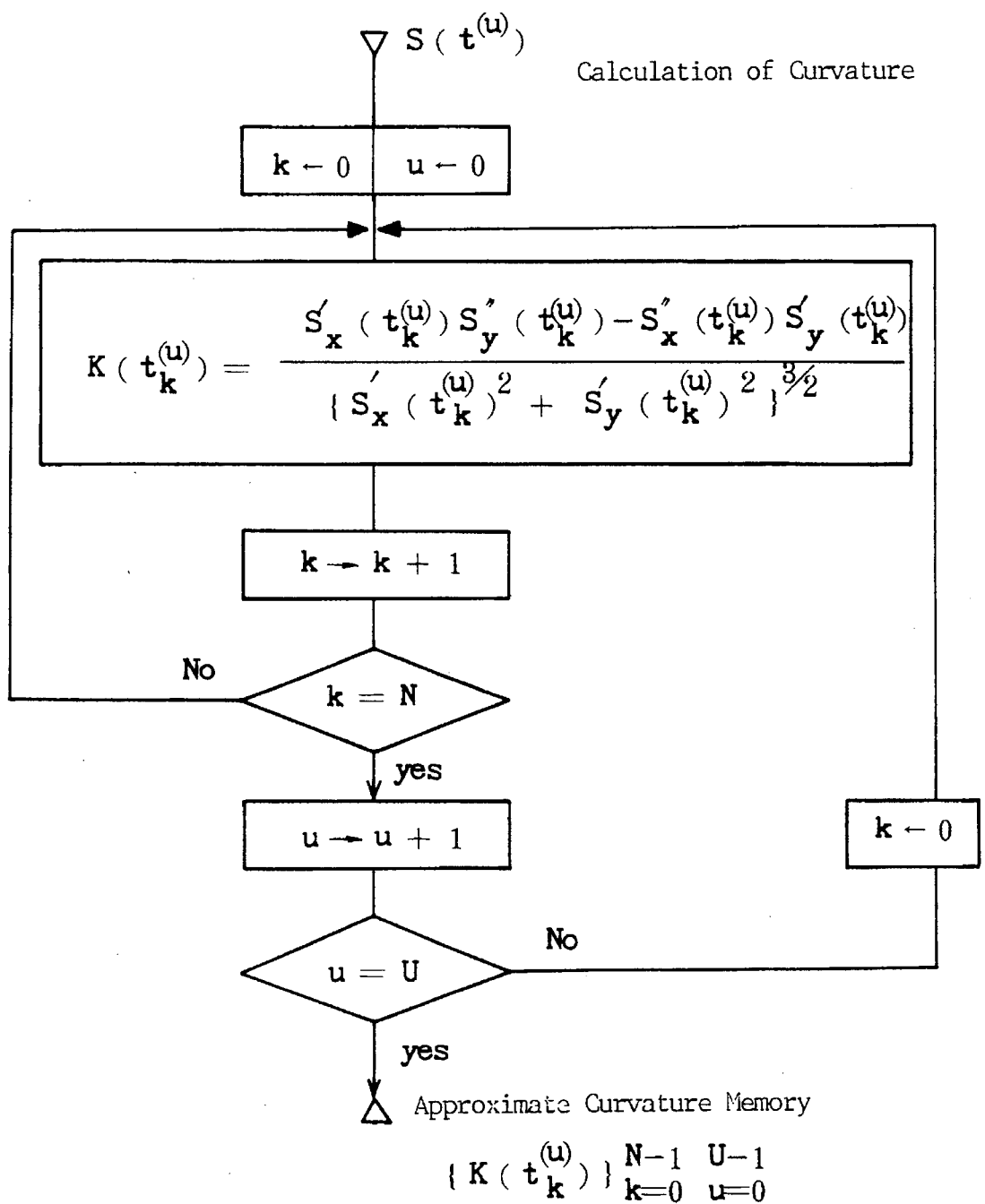
FIG. 11 is a flow chart for calculating the curvature at all points on the peripheral line.

All peripheral points series $\{x^{(u)}(t_k^{(u)}), y_k^{(u)}(t_k^{(u)})\}$ on the object (characters and illustrations) have been provided with approximation functions $S_x(t)$ and $S_y(t)$. Curvatures are calculated by differentiating the continual approximation functions $S_x(t)$ and $S_y(t)$ twice with t at all points of all peripheral point series. FIG. 11 shows a flow chart for calculating curvatures. The k-th peripheral point of the u-th series has the curvature K(t) given by, $$K(t_k^{(u)}) = \{S_x'(t_k^{(u)}) S_y''(t_k^{(u)}) - S_x''(t_k^{(u)}) S_y'(t_k^{(u)})\} / \{S_x'(t_k^{(u)})^2 + S_y'(t_k^{(u)})^2\}^{3/2} \quad (30)$$

The calculation starts from the first point k=0 of the first series u=0. The curvatures are calculated in succession at all points of all series. If the k-th point has been calculated, the similar treatment is done to the (k+1) point. When the u-th series has been calculated, the (u+1)-th series is reckoned.

[E'. Approximate Curvature Memory 110]

An approximate curvature memory 110 memorizes the curvatures $\{K(t_k^{(u)})\}$ of all points k (k=0 to N(u)) of all peripheral point series u (u=0 to U−1).

[F. Integral Circle Extraction Device 112]

Figure 44A:
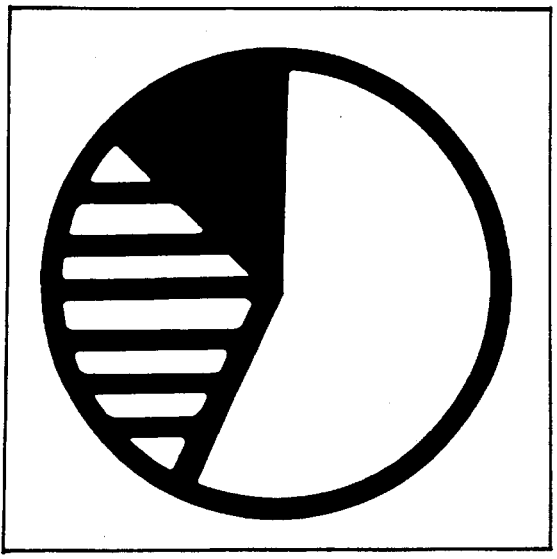
FIG. 44(*a*) depicts an original illustration of a circular graph to be compressed and stored in a memory and FIG. 44(*b*) depicts a final illustration of a circular graph reproduced from the stored data according to this invention.
Figure 44B:
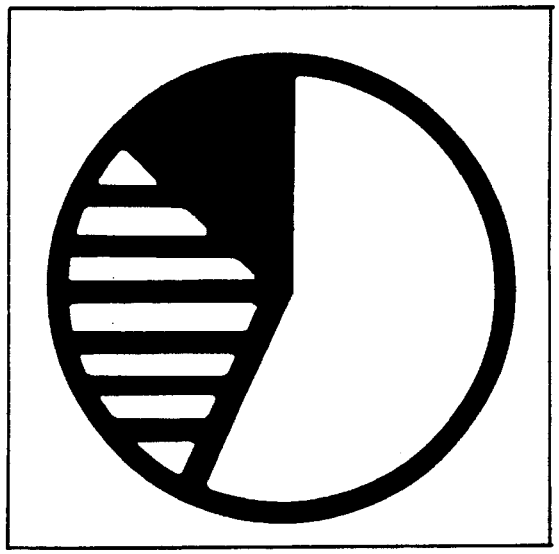

This device judges from the data of curvatures whether a peripheral point series form a true, integral circle or not. Here, an integral circle is an isolated, complete round shape with a 360 degree circumference. The completeness of circle is denoted by "integral". Partial circles with less than 360 degree circumference are distinguished from integral circles. Isolation is another requirement of the integral circle. Even if a circle is complete, the circle which intersects with other lines is not an integral circle. This device extracts only integral circles among the peripheral point series. In general, characters, logomarks, illustrations or handwritten drawings include plenty of integral circles. Such integral circles are extracted at first. From the diode of FIG. 33, the upper righthand two circles are eliminated by the integral circle extraction device. From the circular graph of FIG. 44, the outer circle is removed by the integral circle extraction device. The integral circles are excluded from the succeeding approximation.

An early extraction of integral circles brings about the following advantages. One is an exclusion of noise. If a circle which has been inherently a true circle is a little deformed by the noise which occurs at the optical input of an image scanner, the circles judged as an integral circle are treated as true circles specified only by the position of the center and the radius. Another advantage is an excellent data compression. Only three parameters (radius, X-coordinate, Y-coordinate of the center) define a circle.

An integral, true circle is defined by the constant curvature at all points. The property allows the device to extract integral circles from other patterns.

Figure 12B:
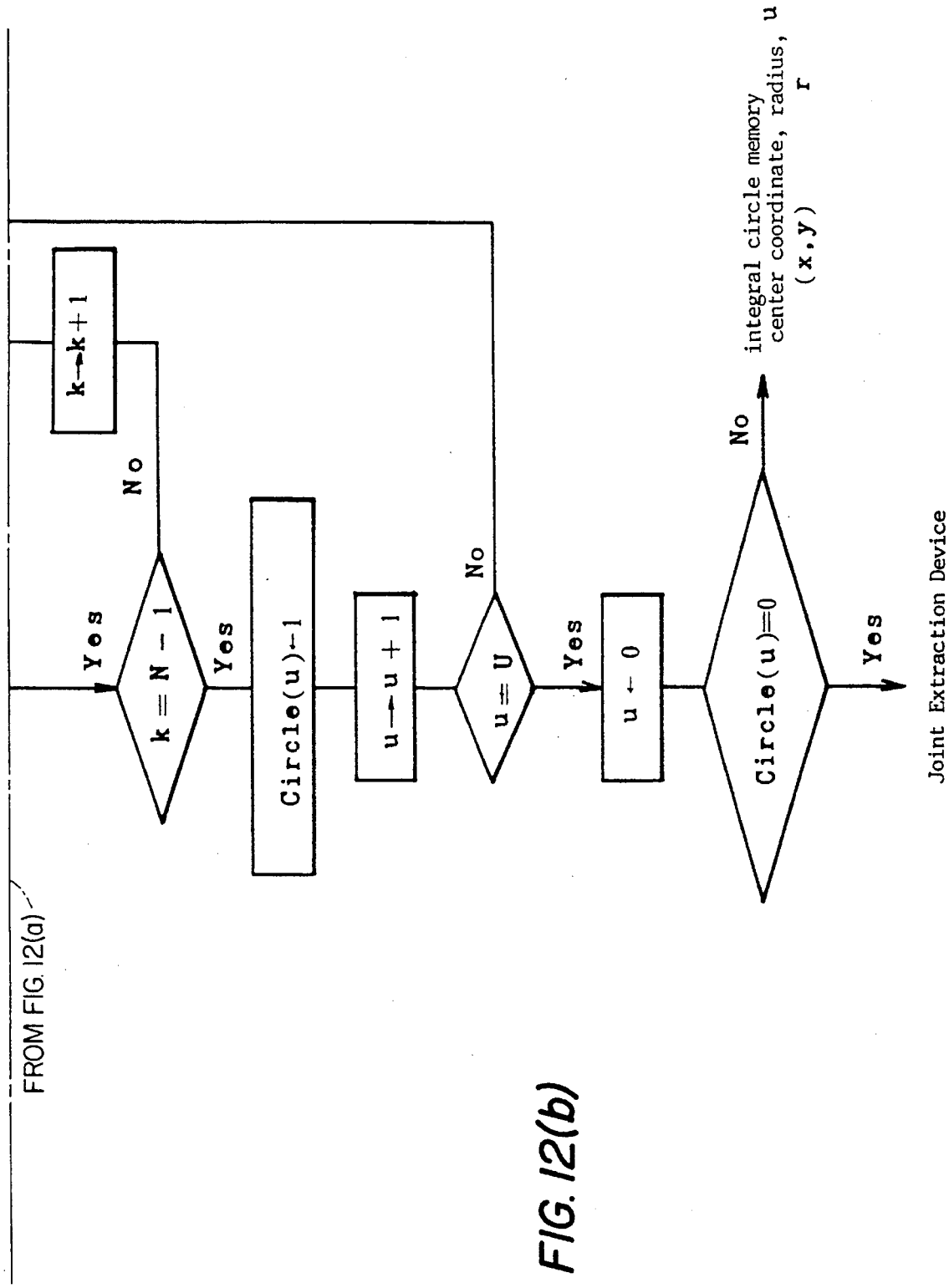

FIGS. 12($a$) and 12($b$) are a flow chart of the integral circle extracting device. At first, all the data of curvatures $\{K(t_k^{(u)})\}$ are input from the curvature memory. The following processes decide whether the present peripheral point series forms a true, integral circle. First of all, an average curvature $K^{(u)}$ of the u-th series of peripheral points is calculated by $$K^{(u)} = \{\Sigma_{k=0}^{N(u)-1} K(t_k^{(u)})\}/N(u) \qquad (31)$$

This is the average curvature. An upper limit $\epsilon_1$ of curvatures is predetermined. If the average curvature is more than the upper limit, the point series does not form an integral circle. Namely, if $$|K^{(u)}| > \epsilon_1 \qquad (32)$$

the u-th peripheral point series does not belong to an integral circle. The series includes sharp turning points, deflection points or the points which cannot be twice differentiated. Such peripheral point series are indicated by "circle=0" which is an indicator of non-integral-circle patterns.

On the contrary, if the average curvature $K^{(u)}$ is smaller than the upper limit $\epsilon_1$ ($K^{(u)} > \epsilon_1$), the point series has a probability that the point series forms an integral circle. In order to judge whether the point series forms an integral circle, the differences between the average curvature $K^{(u)}$ and the curvatures $K(t_k^{(u)})$ of all individual points shall be compared with the predetermined threshold $\epsilon_2$. If all the differences lie within the threshold $\epsilon_2$, the point series forms an integral circle. Namely, the series u is an integral circle, if the following inequality holds for all peripheral points k ($k=0,1,2,\ldots,N(u)$) of the series u.

$$|K^{(u)} - K(t_k^{(u)})| < \epsilon_2 \qquad (33)$$

The inequality must be hold for all peripheral points k of the point series u in order to judge whether the peripheral point series u form an integral circle. The peripheral point series which satisfies the inequality (33) at all points is indicated with "Circle=1" which means that the series forms an integral circle.

If some of the differences exceed the threshold ($|K^{(u)} - K(t_k^{(u)})| > \epsilon_2$), the point series is not an integral circle. Such peripheral point series is affixed with the indication "Circle=0" which means that the series does not form an integral circle. This process for extracting an integral circle is practiced for all peripheral point series from u=0 to u=U−1.

The peripheral point series which have been attached with "Circle=1" are memorized in an integral circle memory with the coordinates (X,Y) of the center and the radius r. The above is the function of the integral circle extraction device.

[G. Integral Circle Memory 114]

An integral circle memory 114 stores the coordinates (X,Y) of the center and the radius r of the integral circles which have been found in the former step. Only three parameters are enough to describe the form of the peripheral point series of an integral circle. In the case of a single circle, the original pattern is an isolated circle painted overall with black. In the case of double circles, the original pattern is a round "○" of, e.g. "ば び ぶ べ ぼ".

[H. Joint Position Extracting Device 116]

A joint is defined as a junction point between a straight line and another straight line, a junction point between a straight line and a curve, or a junction point between a curve and another curve. Two lines with different inclinations meet each other at the junction point. The junction point is simply called a joint. The joint can be deemed as a point at which a line changes the inclination discontinuously. The introduction of joints is one of the most conspicuous features of this invention. Prior art of memorizing two-dimensional data have no concepts equivalent to "joints" of this invention. This invention adopts joints for compressing two-dimensional data for the first time. Joints will play an extremely important role for approximating characters, logomarks or illustrations by functions in this invention. Since joints are totally a new concept discovered by the Inventor, it is important to clarify the definition, role, significance, and abstraction of joints. Precise, pertinent determination of joints enables this invention to maintain the data of, e.g. character font, logomarks, illustrations and the like at high quality and to minimize the quantity of the data. Joints effectively compress the data of objects, keeping the quality at a high level.

Figure 13A:
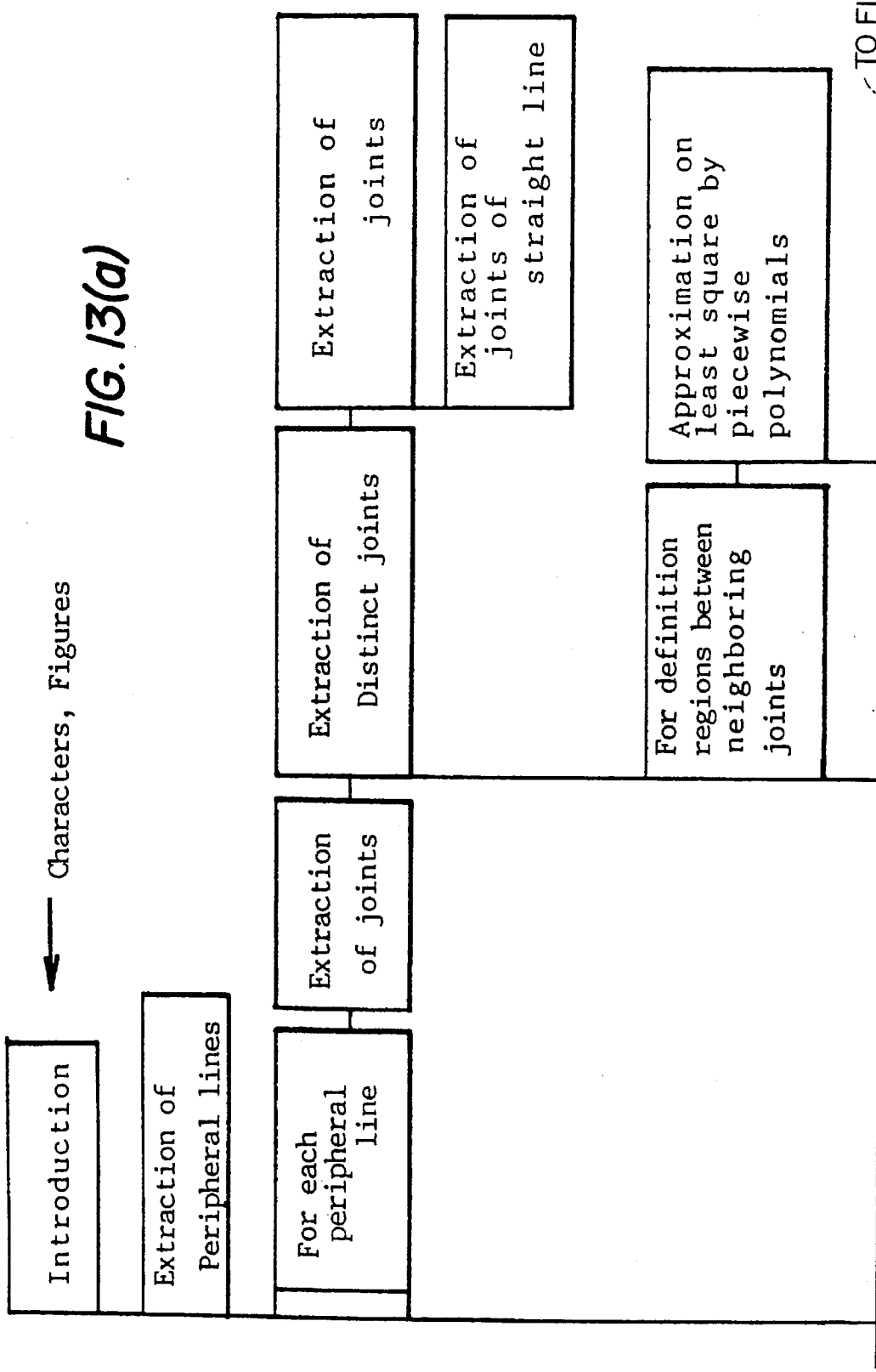
FIGS. 13(a) and 13(b) are a flow chart of processes for extracting joints.
Figure 13B:
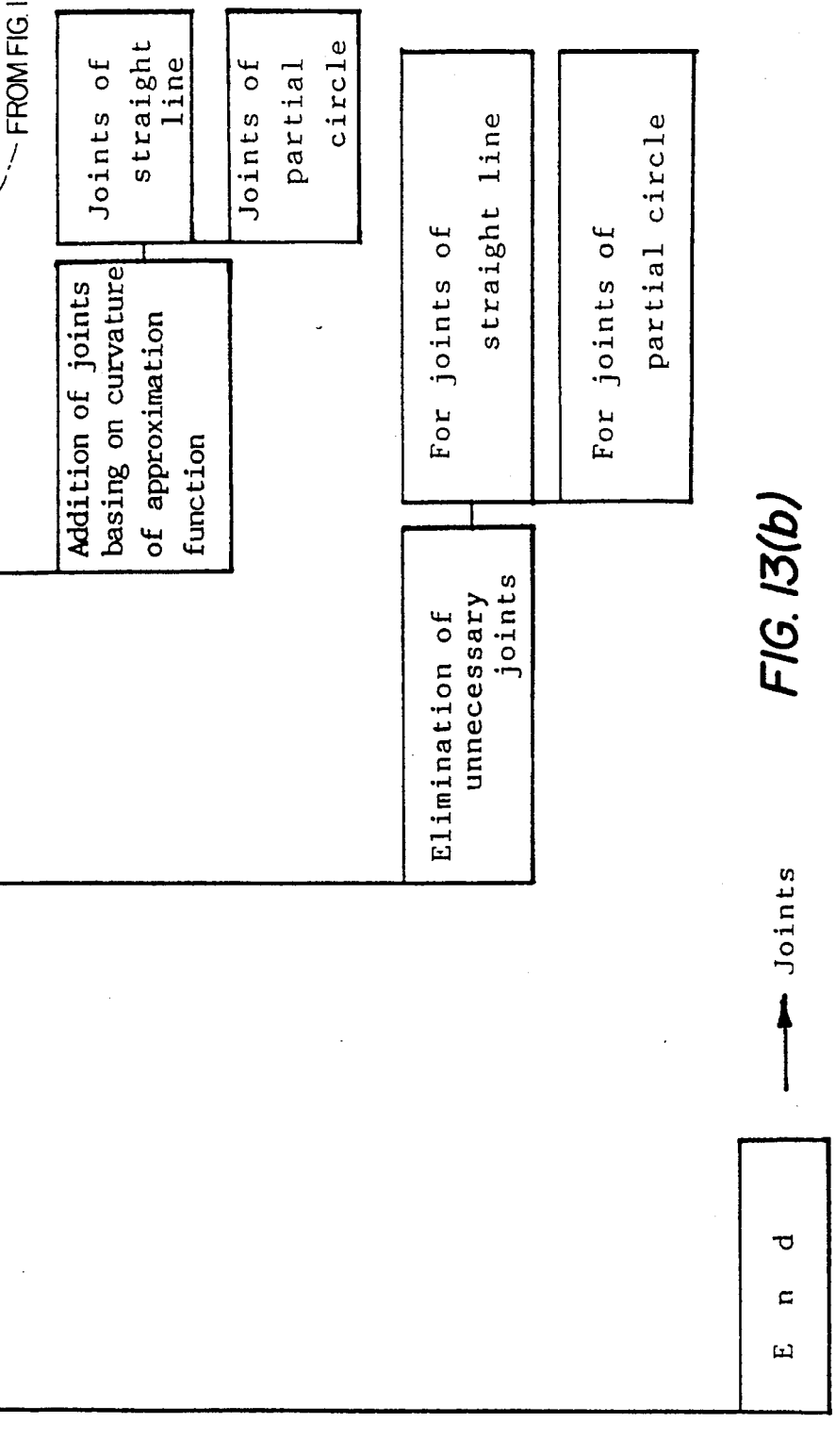

FIGS. 13($a$) and 13($b$) demonstrate the processes for extracting points. An object, e.g. character, logomark, illustration or drawing is input by an image scanner into an image memory and on a display at first. An image of the object is digitized into a binary image which includes only white (blank) pixels and black pixels. Peripheral point series are extracted from the binary image. Joints are extracted from the peripheral point series by the following processes. First clear-cut joints are extracted. The joints are determined by a large curvature. The clear-cut peripheral joints are not optimum but still temporary. Thus, the clear-cut joints are called temporary joints. However, the temporary joints determined from the bigness of curvature are still insufficient for obtaining all necessary joints. On the contrary, unnecessary joints may be included in the temporary joints.

Thus, the determination of joints requires a revision. Then the joints at a right angle part are extracted after the temporary joints have been found. The extraction of the joints of a right angle part is important to smooth the junctions at crossing points of lines in the object, e.g. character, logomark, drawing or illustration. Then the joints of straight lines are extracted in addition to the temporary joints. The joints of straight lines are abstracted by the bigness of curvature in the case of broad straight lines. However, in the case of a very thin straight line, an initial point or final point cannot be abstracted by the condition of the greatness of curvature. Such addition of joints is hardly required to treat characters, because all lines have some broadness. But illustrations, figures or logomarks often require the addition of the joints of straight lines, because they often include very thin lines with a width as small as a pixel.

Contrarily the temporary joints sometimes include unnecessary joints. Such joints must be removed for heightening the quality of reproduced patterns as well as reducing the quantity of data. One kind of needless joints are the joints contained in straight lines. Sometimes a temporary joint lies midway in a straight line with a very small distance from the straight line. If removal of the midway joint does not impair the straightness of the lines, the temporary joint shall be removed, because the joint has been produced by noise. The other kind of needless joints is joints included in arcs (partial circles). Occasionally a redundant temporary joint lying midway in an arc splits the arc which has been inherently a single arc into two partial arcs. Such a midway joint should be removed. The removal of the redundant joint redounds to an unification of two arcs into a single arc.

When all joints have been determined finally, the lines connecting neighboring joints shall be approximated by piecewise polynomials. Here a line by a pair of neighboring joints is called a definition region. If a closed loop has N joints, there are independent N definition regions in the loop. The peripheral closed loop changes the inclination drastically at the joints, because a big curvature is equivalent to a big change of inclination of the line. But inclination is constant or changes smoothly in the intermediate part between two neighboring joints, i.e. a definition region. Thus, the line (or curve) of a definition region can be approximated by a straight line, an arc or a set of polynomials. The approximation of peripheral points is similar to the previous approximation described at [D. data approximation device A 106]. But the previous approximation was based on one definition region spanning the whole peripheral loop. The present approximation will be based on independent definition regions which have been produced by dividing a peripheral line by several joints. Every definition region demands the approximation process by the piecewise polynomial. A set of coefficients is determined for every independent definition region.

First temporary joints are abstracted from the data of peripheral point series. As mentioned before, joint has a big curvature from the definition. The inclination of the curve changes distinctly at a joint. Joints are important points which determine the definition region of approximating functions. Lines between neighboring joints are either straight lines or smooth curves in which the inclination changes continuously. In any cases, the lines between two neighboring joints can be expressed with simple approximating functions, if the selection of joints is suitable. All necessary data are established by calculating all approximation functions representing all the definition regions.

However, if the selection of joints is not appropriate and the neighboring joints separate from each other, the line between the neighboring joints cannot be expressed by a simple approximation function. Thus, too little number of joints incurs the increase of the number of data. On the contrary, excess number of joints increases the data of coordinates of joints and fails in compressing data sufficiently. The selection of joints is important therefore.

Figure 14:
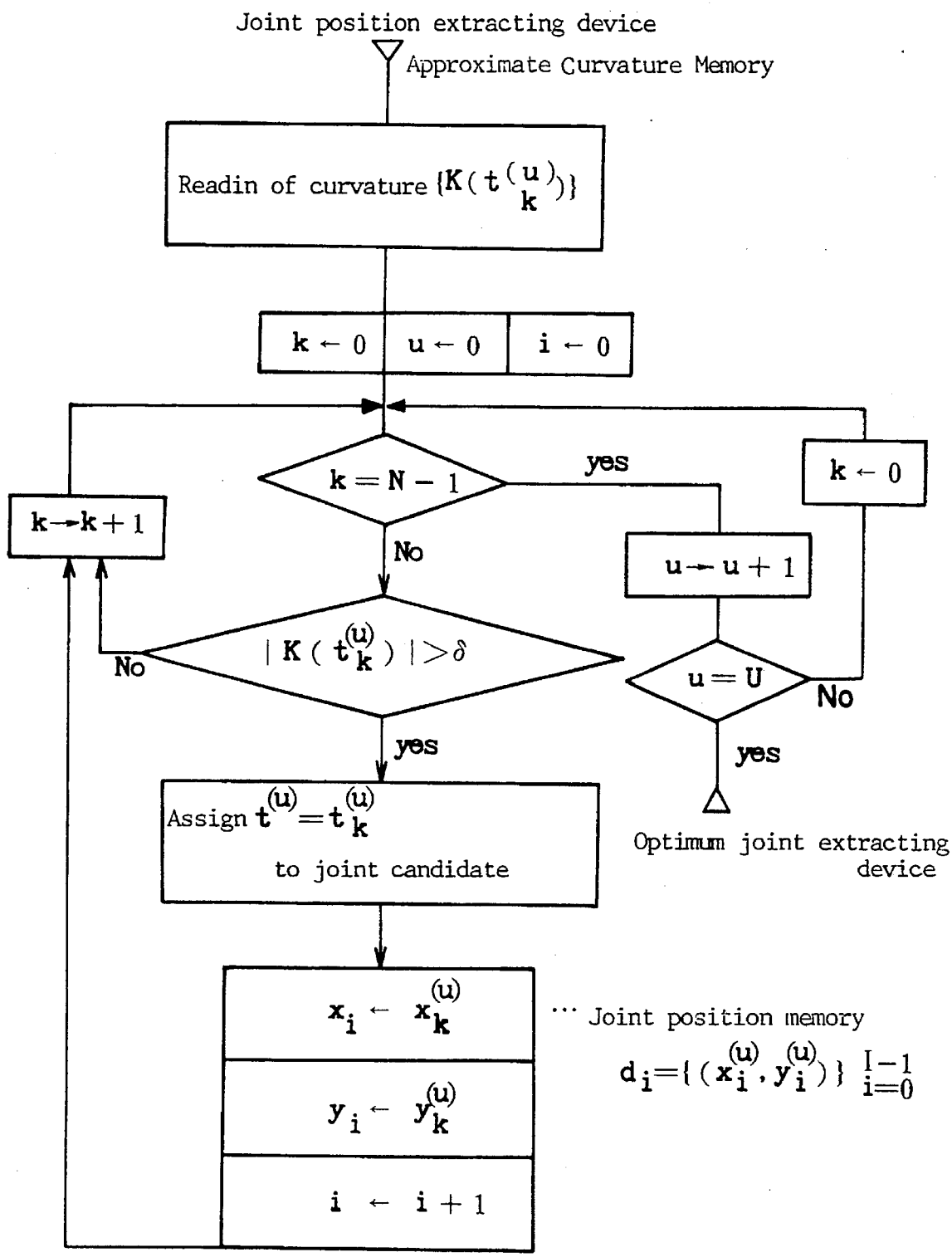
FIG. 14 is a flow chart of abstracting joints from the curvature calculated.

The flow chart of FIG. 14 clarifies the processes of abstracting joints. Previously approximate curvatures of all peripheral points have been determined. The data of the approximate curvatures are now utilized. The approximate curvatures are input (readin) from the approximate curvature memory 110. The curvatures are indicated by $\{K(t_k^{(u)})\}$. For all peripheral points k (k=0 to N(u)) of series u, the curvature $K(t_k^{(u)})$ is compared with a threshold $\delta$ which has been decided preliminarily in accordance with the purpose. If the curvature is bigger than the threshold $\delta$ at a point, the point is a temporary joint. The condition of a temporary joint is given by the inequality $$|K(t_k^{(u)})| > \delta \tag{34}$$

Since a joint is a point at which the inclination of a line is discontinuous and the curvature is large, the above inequality determines joints temporarily.

Therefore, the points with a curvature bigger than $\delta$ are assigned to temporary joints. The coordinates $(x_k^{(u)}, y_k^{(u)})$ of the joints are stored in a joint position memory 118. "i" denotes the number of temporary joints hereafter. The i-th temporary joint is indicated as $d_i(x_i^{(u)}, y_i^{(u)})$. The parameter k of peripheral points is replaced by the new parameter i. Although parameters k and i are affixed to coordinates x and y, k indicates peripheral points and i designates joints selected from peripheral points. The comparison of $K(t_k^{(u)})$ with $\delta$ is carried out at all peripheral points of the u-th series. Then the similar procedures are repeated to the (u+1)-th series. Thus all coordinates of temporary joints of all peripheral point series are extracted.

Figure 15:
FIGS. 15(a) and 15(b) depict original mother characters of "あ" and "求" for making a character font.
Figure 15:
Figure 16:
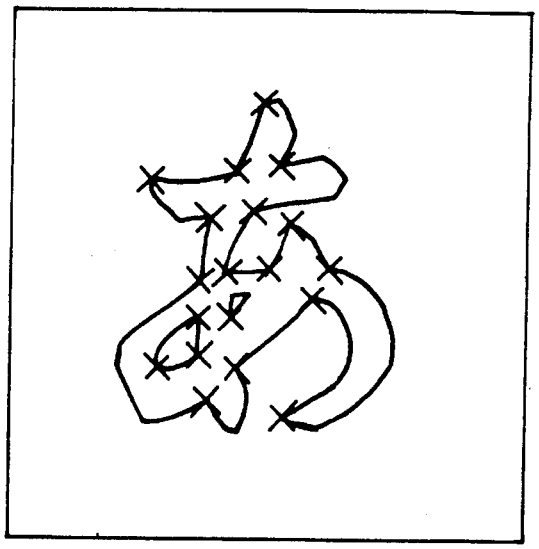
FIGS. 16(a) and 16(b) depict peripheral lines of "あ" and "求" on which joints are denoted by x.
Figure 16:
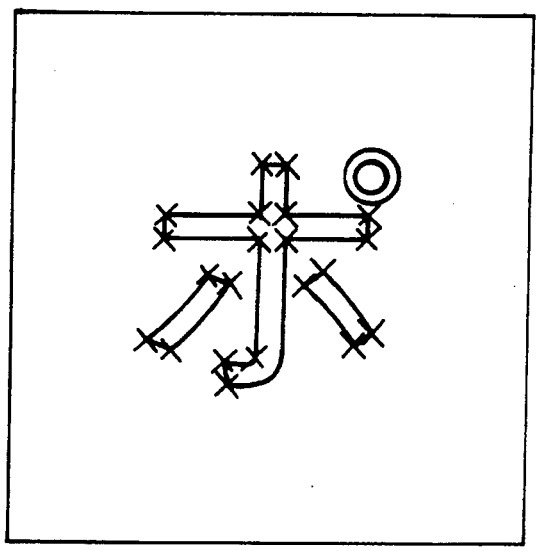

Joints are again explained more intuitively. FIGS. 15(a) and 15(b) show mother characters of "あ" (a) and "ポ" (b). The characters are input into an image memory. The peripheral points are extracted. The joints are extracted from the peripheral points. FIGS. 16(a) and 16(b) show the result of the extraction of joints. Symbols "x" indicate joints.

Figure 17B:
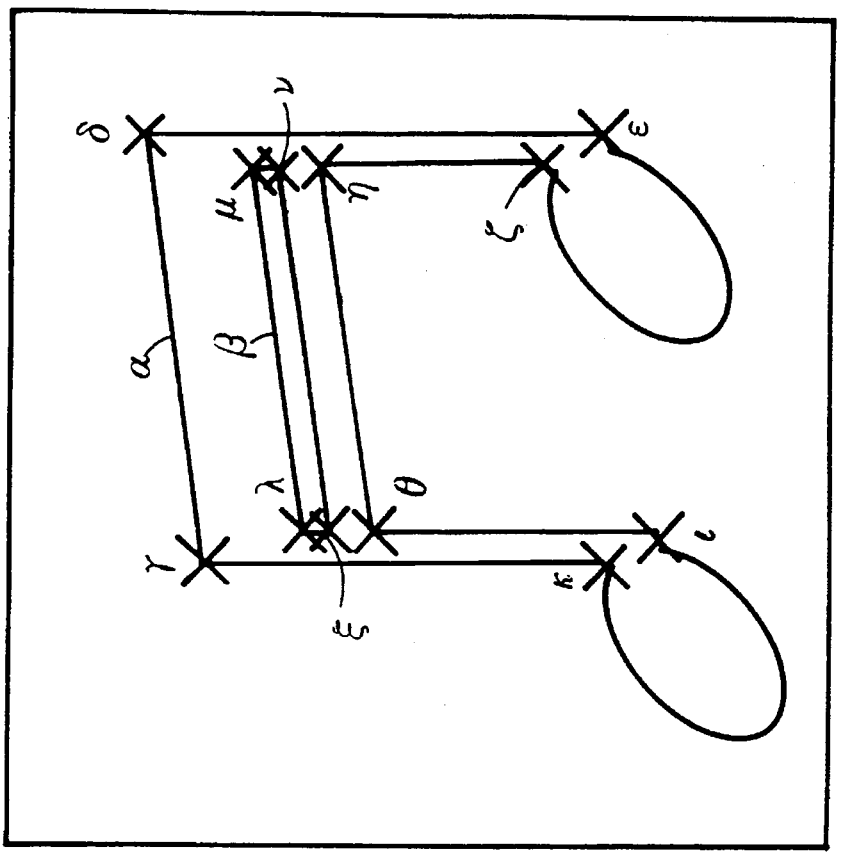
Figure 17A:
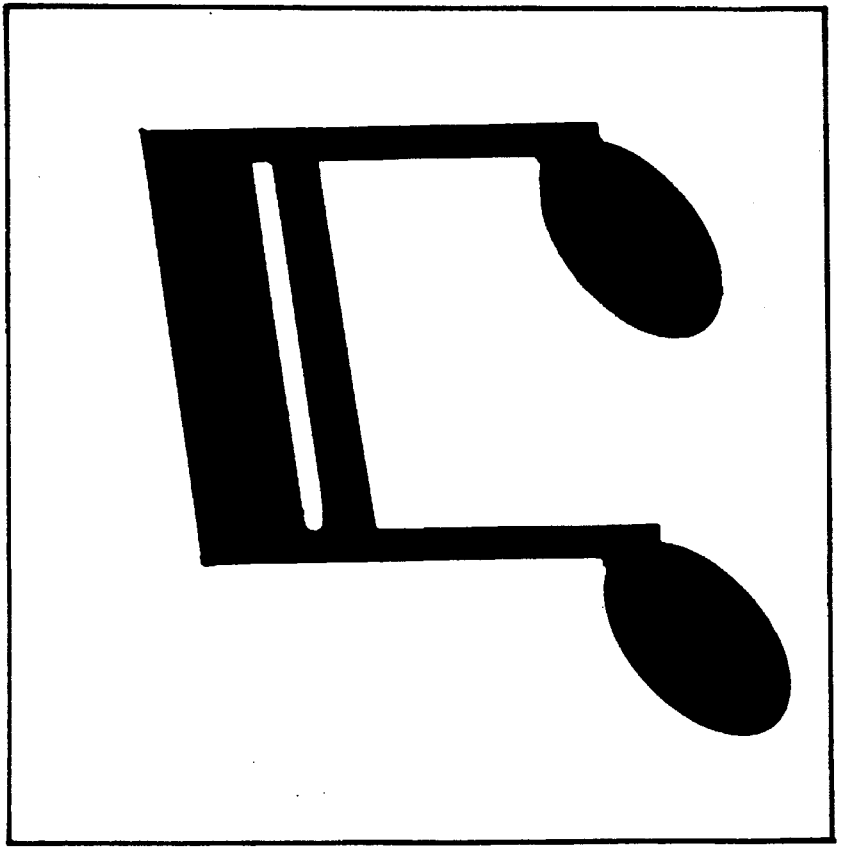

FIGS. 17(a) and 17(b) depict an example of a musical note (sixteenth note). The note contains two vertical lines on right and left sides and two slanting lines connecting the two vertical lines. Ellipsoids hang at the feet of the vertical lines. FIG. 17(a) is an original figure. FIG. 17(b) is the result of the peripheral point extraction and the joint extraction. The points with "x" are joints. The figure has only two peripheral lines $\alpha$ and $\beta$. Peripheral line $\alpha$ is an outer longer peripheral loop. Peripheral line $\beta$ is an inner shorter loop. The outer peripheral loop $\alpha$ has joints $\gamma, \delta, \epsilon, \zeta, \eta, \theta, \iota$ and $\kappa$. Line $\gamma$-$\delta$, line $\delta$-$\epsilon$, line $\zeta$-$\eta$, line $\eta$-$\theta$, line $\theta$-$\iota$, and line $\kappa$-$\gamma$ are straight lines. Line $\epsilon$-$\zeta$ and line $\iota$-$\kappa$ are free curves. The inner loop $\beta$ has straight lines $\lambda$-$\mu$ and $\nu$-$\xi$. Other lines $\mu$-$\nu$ and $\xi$-$\lambda$ are arcs or free curves. This example has many straight lines. It is important to specify a straight line in the figure as a straight line in the compressed data.

Figure 18B:
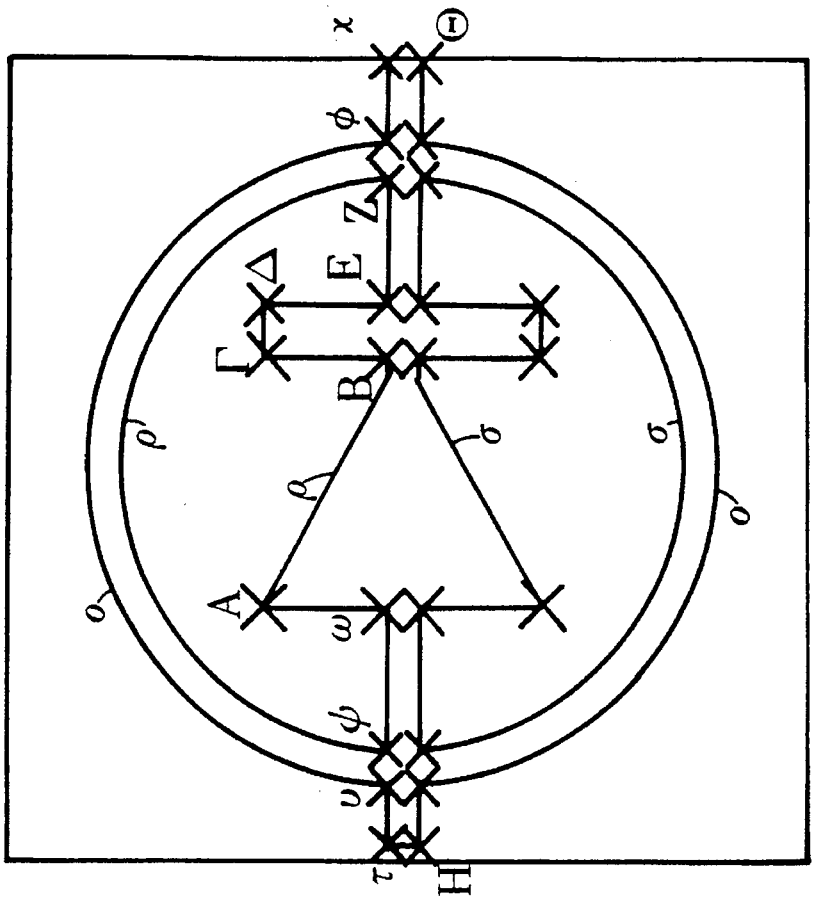
Figure 18A:
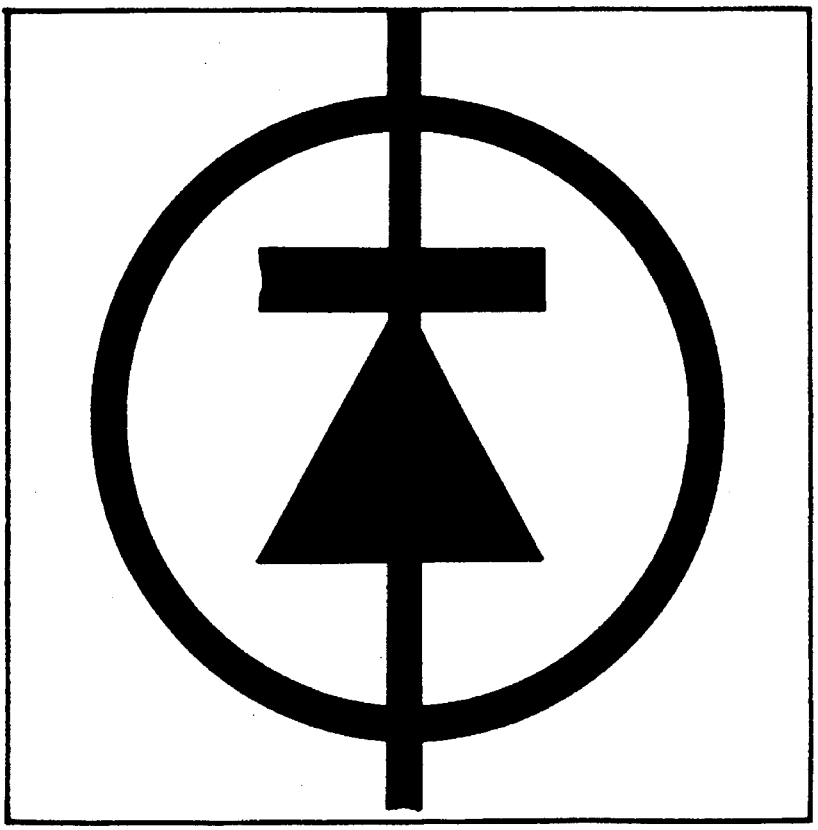
Figure 45A:
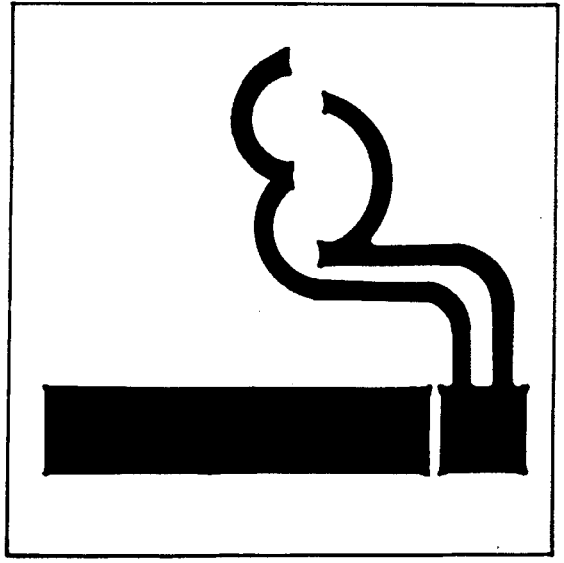
FIG. 45(*a*) depicts an original illustration of a tobacco to be compressed and stored in a memory and FIG. 45(*b*) depicts a final illustration of a tobacco reproduced from the stored data according to this invention.
Figure 45B:
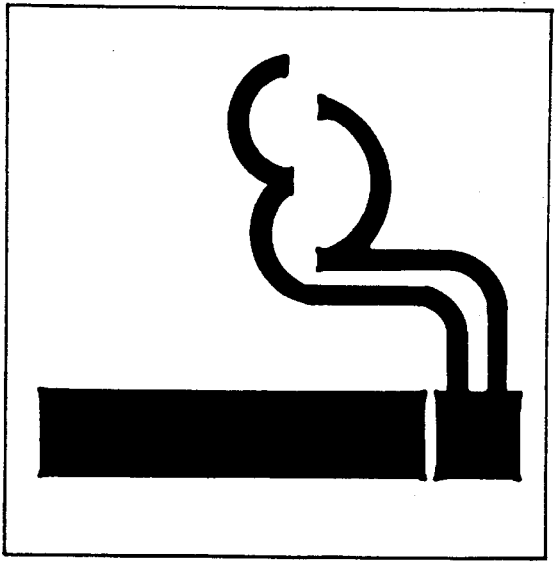
Figure 53:
FIG. 53 is an example of a logo-illustration including many free curves.
Figure 54:
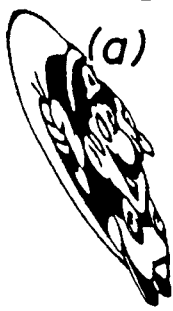
FIGS. 54(*a*)–54(*f*) are figures which are reproduced by compressing the illustration of FIG. 53, memorizing the data, and reproduced from the data with anisotropic reduction or rotation.
Figure 54B:
Figure 54:
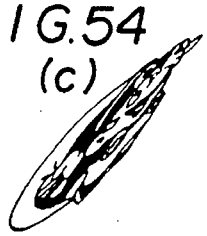
Figure 54:
Figure 54:
Figure 54:
Figure 55B:
FIGS. 55(*a*) and 55(*b*) depicts modified characters and logomarks, wherein FIG. 55(*a*) is a reduced figure and FIG. 55(*b*) is an enlarged figure. One can be transformed to the other by this invention.
Figure 55:
Figure 56:
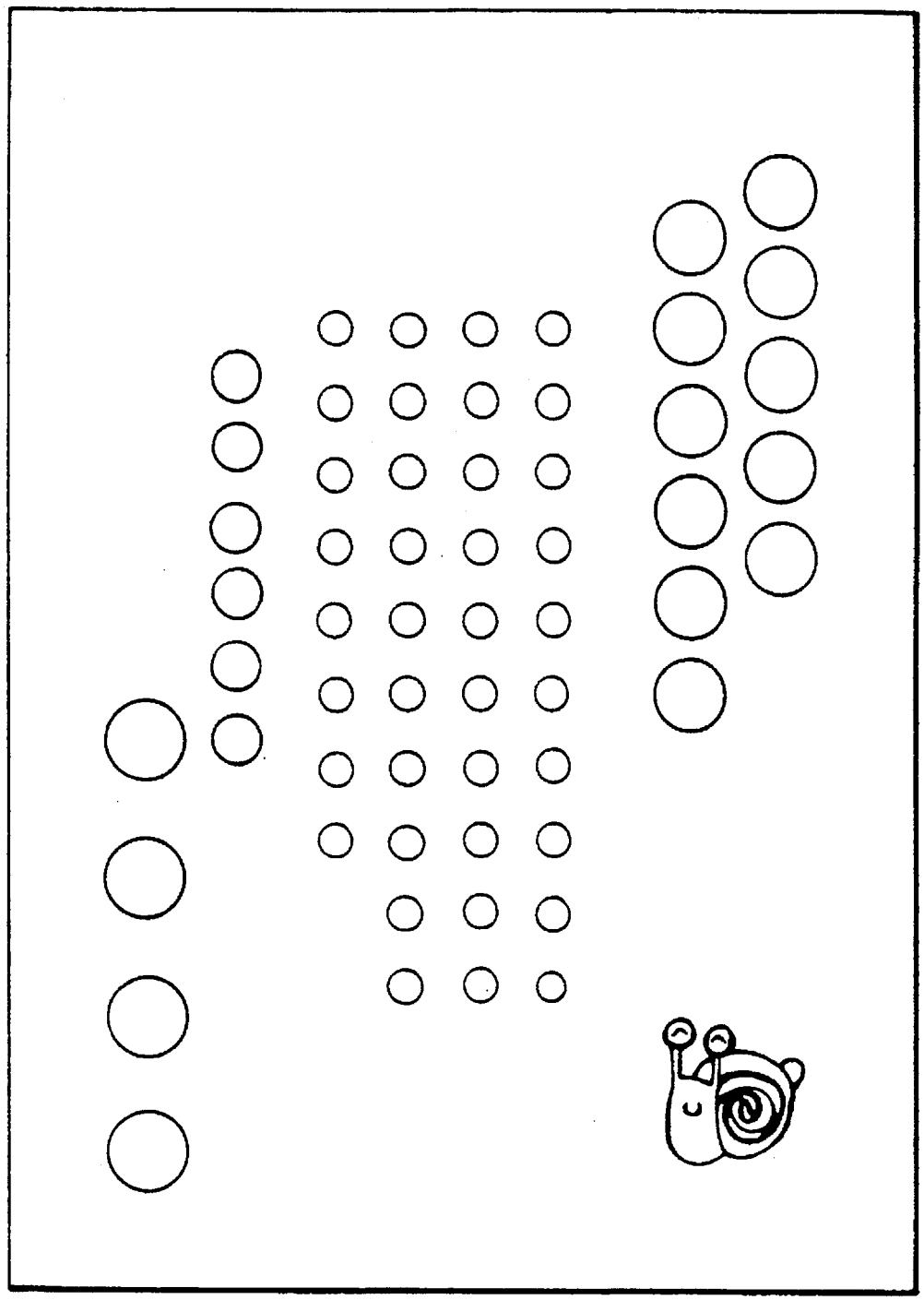
FIG. 56 is an example of a mail card in which an illustration of a snail has been interposed by this invention.

FIGS. 18(a) and 18(b) depict an example of a diode. FIG. 18(a) is an original figure which has a large circle, a small triangle, a short vertical line, and a long horizontal line. FIG. 18(b) shows the result of the extraction of peripheral lines and extraction of joints. The figure contains three peripheral point series: an outer circular peripheral line o and two inner peripheral lines ρ and σ. The outer peripheral line has eight joints. Symbols τ, ν, φχ, Θ and H are attached only to upper-half joints. Line τ-ν is a short straight line. Curve ν0φ is a half circle. Line φ-χ is a short straight line. Line χ-H is a short straight line. Line Θ-π is a free curve. Two inner peripheral lines are symmetric with regard to the middle horizontal line. Thus, upper half periphery ρis explained. Line φ-ω is a straight line. Line ω-A is a straight line. Line A-B seems a straight line, but is truly a free curve, because it turns a little near B. Line B-Γ, line Γ-Δ, line Δ-E and line E-Z are straight lines. Line Z-φ is a half circle. The figure is also constructed mainly by straight lines. The majority of lines are straight lines; the next majority are arcs; few lines are free curves. Geometry defines such a part of a straight line having both ends as a segment of a line, a half part having one end as a half line and a full straight line with no ends as a straight line. However, this specification calls a segment, a half line and a full line of a straight line as a straight line for simplicity. The proportion of straight lines, arcs and free curves depends on the original objects. In general, Japanese cursive characters, e.g. "あ" "は" include many free curves. Chinese characters contain many straight lines. Drawings, marks, and illustrations include various proportions of straight lines, arcs and free curves. Three kinds of lines, i.e. a straight line, an arc and a free curve are fundamental elements. The diode of FIG. 18(*a*) has many straight lines. But all marks or drawings do not necessarily include straight lines as the majority. Some of drawings include many arcs (e.g. FIG. 45(*a*) and FIG. 56). Others mainly include free curves (e.g. FIG. 51, FIG. 53, FIG. 55(*a*) and FIG. 57). Drawings, illustrations or logomarks are produced by designers from free passions. Nobody knows the proportion of the fundamental elements included in the drawings.

[I. Joint Position Memory 118]

Joint position memory memorizes the numbers and the coordinates of the temporary joints obtained by the former process. There are different kinds of joints, i.e. temporary joints determined from the bigness of curvature, joint candidates, optimum joints, neighboring joints and final joints which shall be explained later.

[J. Optimum Joint Extraction Device 120]

The joints which have been described are temporary joints which have been determined by the greatness of curvature. However, the temporary joints are not necessarily optimum joints. When an image scanner optically inputs an original character, drawing, illustration or logomark, noise is frequently included in a readin image stored in an image memory by the reflection, diffraction or scattering of light from the object at lenses or glasses and the invasion of external light. The noise sometimes reduces curvatures at junction points of two lines or curves. Owing to the reduction of the curvature, a point which has a big curvature more than δ inherently fails to be extracted as a joint. Contrarily some intermediate points of a straight line or a curve may be extracted as joints, when the noise enhances the curvature to a value more than δ at the point. Thus the joints extracted only by the curvature are not always optimum joints which represent the original object clearly and concisely.

Therefore, optimum joints must be searched out. An optimum joint must lie in the vicinity of the temporary joint previously found. Optimum joints should be turning points of lines, from the definition. The optimum joints are inherent to the original object, i.e. character, drawing, illustration or mark. Optically-induced noise forbids determining optimum joints only from the greatness of curvature of the optically-input image without ambiguity.

Figure 19:
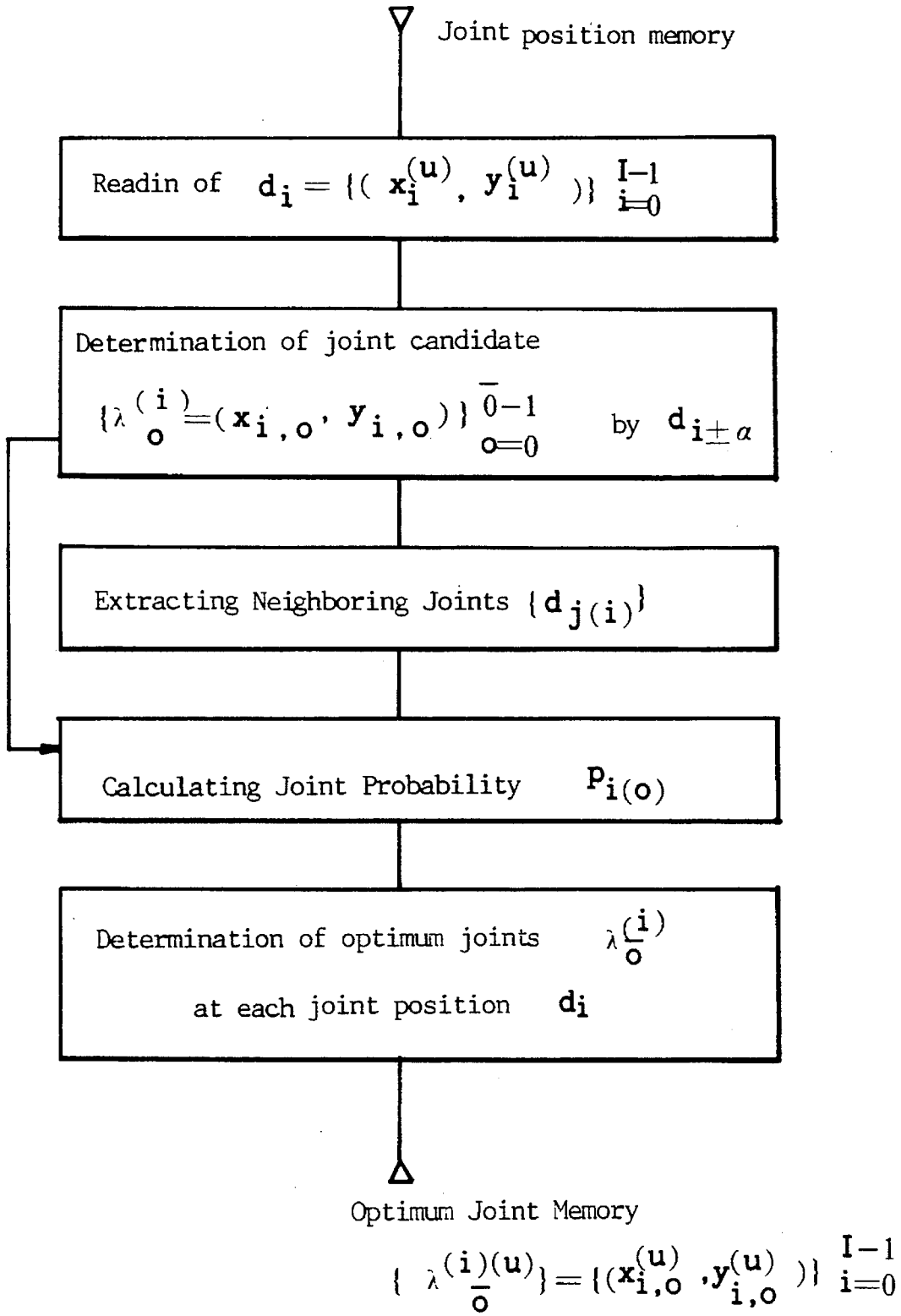
FIG. 19 is a flow chart for extracting optimum joints.

FIG. 19 is a flow chart of an optimum joint extraction device. First, the parameters $d_i(x_i^{(u)}, y_i^{(u)})_{i=0}^{I-1}$ of temporary joints are input (readin) from the joint position memory. Here u is the number of peripheral point series. "i" is the number of temporary joint in the u-th series. I is the total number of temporary joints in the u-th series.

Joint candidates are introduced to the peripheral points in the vicinity of a temporary joint. A joint candidate is a point on the peripheral line distanced by less than α from the temporary joint. A joint candidate of the i-th temporary joint $(x_i, y_i)$ is indicated by $\lambda_o^{(u)}$ or $\lambda_o^{(i)}$ $(x_{io}, y_{io})$ accompanied by its coordinates. The temporary joint has the suffix of series number u. The joint candidate $\lambda_o^{(i)}$ is of course one of the joint candidates near the i-th temporary joint of the u-th series. The series number u is omitted from the representation of joint candidate $\lambda_o^{(i)}$ for simplicity. One temporary joint has several candidates. 2α denotes the number of candidates. Suffix "o" is the number of candidates for distinguishing the joint candidate from others (2α−1). Joints candidates are defined as α neighboring peripheral points in front of the temporary joint and α neighboring peripheral points at the back of the temporary joint as shown in FIG. 20. A black dot is the central temporary joint which is denoted as $x_i$ ($y_i$ is omitted in the representation for the sake of simplicity).

The position of the temporary joint should be denoted by $d_i$. But instead of $d_i$, $x_i$ is used for clarifying the position coordination of the temporary joint. The joint candidates are identified by o=0, 1, 2, . . . , 0−1. Preceding α peripheral points and succeeding α peripheral points are joint candidates of $x_i$. "o=0" is assigned to the first peripheral point in the preceding point. The temporary joint itself is one of a joint candidate of o=α+1. The total number of joint candidate 0 is 2α+1. An optimum joint is one of the joint candidates. The selection of optimum joints from joints candidates improves the quality of reproduced objects. α determines the scope of searching optimum joint. If a large discrepancy is expected between the optimum joints and the temporary joints, large α shall be required for precise determination of optimum joints. However, large α increases the amount of the following calculation. Pertinent value of α shall be chosen by balancing the preciseness and the calculation time.

Figures 32A, 32B, 32D:
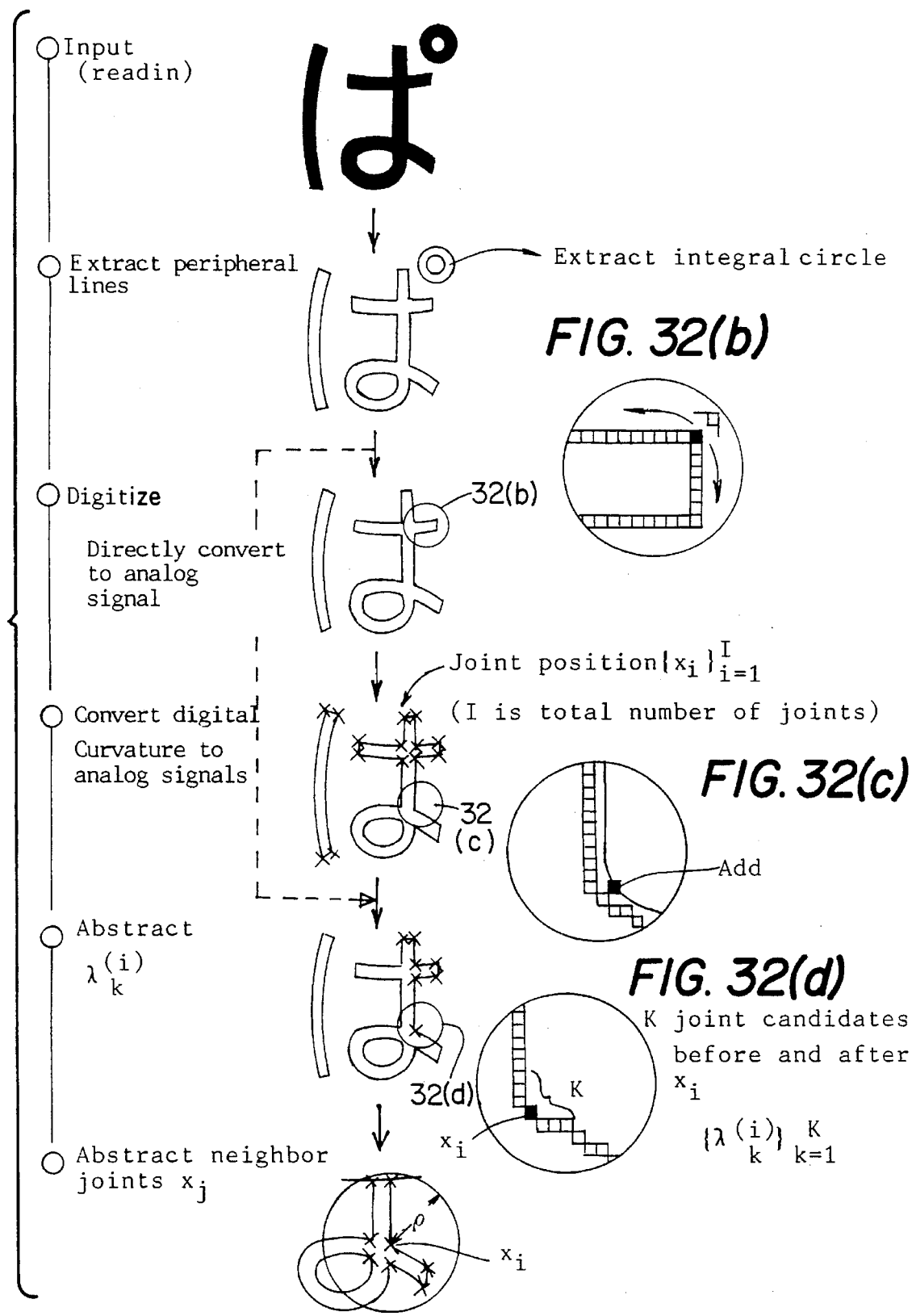

Next, neighboring joints $\{d_j(x_j^{(u)}, y_j^{(u)})\}$ are extracted. Neighboring joint is also a new concept indispensable for the construction of this invention. The neighboring joint is required for searching optimum joints. "neighbor" means that the point is neighboring to the temporary joint $x_i$ on process. The definition of a neighboring joint is a temporary joint which lies within a distance ρ from the outstanding (present) temporary joint $x_i$ and is either connected by a continuous peripheral line to the outstanding (present) temporary joint or enclosed by the peripheral loop including the present temporary joint $x_i$. In other words, the neighboring joint is connected with the outstanding temporary joint on process and is included in a circle of a radius ρ having the temporary joint as the center. FIGS. 32(*a*)–32(*d*) show an example of the neighboring joints. The bottom figure demonstrates the neighboring joints of the present temporary joint $x_i$. A small circle of a radius ρ is depicted. In this example, the circle encloses seven other temporary joints. Six of the seven temporary joints are connected with the central present temporary joint $x_i$ by the continual peripheral lines. Thus the six temporary joints are the neighboring joints of $x_i$. Another temporary joint in the inner peripheral loop also exists in the circle. The inner temporary joint is not directly connected with the temporary joint $x_i$. Thus the seven temporary joints are all neighboring joints of $x_i$.

FIGS. 33(a)–33(c) exhibit another example of neighboring joints in the figure of diode. The bottom partial figure has a circle of a radius $\rho$ with the center $x_i$. The circle encloses five temporary joints. Two right temporary joints are clearly neighboring joints of $x_i$, because the two are connected with $x_i$ by the peripheral line. Lower temporary joint $\Lambda$ is a neighboring joint of $x_i$ from the same reason. Left lower temporary joint M is not connected with $x_i$. But M is enclosed by the outer peripheral line to which $x_i$ belongs. Thus M is also a neighboring joint of $x_i$. Left temporary joint N is not directly connected with $x_i$. But it is enclosed by the outer periphery on which $x_i$ lies. N is a neighboring joint of $x_i$. All temporary joints encircled are neighboring joints of $x_i$ in this example. Although the concept of neighboring joints is difficult to understand, the examples have simply clarified the definition of the neighboring joints.

"j" is the number of identifying neighboring joint. Since the temporary joint has been specified by i, the neighboring joint is indicated by j in order to avoid confusion. The first condition that the neighboring joint lies within a circle of a radius $\rho$ with a center $x_i$ is expressed by $$\{(x_i-x_j)^2+(y_i-y_j)^2\}^{1/2}<\rho \quad (35)$$

The other one condition is that the neighboring joint is connected directly with the outstanding temporary joint on process. The reason why the neighboring joint must be connected with the outstanding temporary joint is because the extraction of optimum joints has a purpose of joining a pair of joints at both sides of a crossing point as smoothly as possible. Whether a temporary joint is connect with the outstanding temporary joint $x_i$ is easily known by examining whether both temporary joints belong to the same peripheral point series. The other alternate condition is that the temporary joint should be enclosed by the peripheral line of $x_i$. The reason of the condition also results from the same purpose above-mentioned.

The neighboring joint should be indicated as $d_j(x_j^{(u)}, y_j^{(u)})$ rigorously. But the neighboring joint will be denoted simply by $x_j$. "$x_j$" also includes the y-coordinate of course.

J is the number of neighboring joints of $x_i$. Sometimes J may be 0. Occasionally J may be more than 1. "J=0" means that the outstanding temporary joint $x_i$ has no neighboring joint. "J is more than 1" means that there are several neighboring joints for $x_i$. Different treatments must be done for the two cases. The treatments are explained for a first case of $J \geq 1$ and a second case of $J<1$ ($J=0$), respectively.

The first case of $J \geq 1$ is further divided into two cases. Outer peripheral points have been traced clockwise. Inner peripheral points have been traced counterclockwise. Some neighboring joints precede the outstanding temporary joint $x_i$. Such preceding neighboring joints are named output neighbor. The other neighboring joints succeed the outstanding joint $x_i$. Such succeeding neighboring joints are named input neighbor. Neighboring joints appear at a crossing point in general. Thus, neighboring joints lie nearly along an extension of a tangent line of the peripheral line at the the outstanding temporary joint $x_i$. Then tangent lines at $x_i$ of the periphery are drawn like an arrow toward the direction of tracing. The neighboring joint which lies at the top of the arrow is an input neighbor, because the arrow seems to enter the neighboring joint. The other neighboring joint which lies at the end of the arrow is an output neighbor, because the arrow seems to emanate from the neighboring joint. The definition of input neighbor and output neighbor is rather difficult to understand. Optimum joints shall be selected from joint candidates.

[CASE 1 $J \geq 1$ and output neighbor]

FIG. 21 shows the case of $J \geq 1$ and output neighbor. Four temporary joints $x_{j-1}$, $x_j$, $x_i$, $x_{i+1}$ align nearly along a line. All four temporary joints have $2\alpha+1$ joint candidates on the peripheral lines. A line which connects four joint candidates is selected from each group of candidates. The line must been a part of a smooth line. Thus, the joint candidates must be chosen in order to maintain the line as smooth as possible. The requirement of smooth connecting line determines the most favorable selection of joint candidates. The selected candidates are now called optimum joints. The selection of optimum joints from the candidates is one of the most difficult parts of this invention. Therefore, the way of selection will be clarified in detail.

In FIG. 21, $x_i$ (near point C) is an outstanding temporary joint which has been first selected by the bigness of curvature. This point is the center of this process. The neighboring joint is $x_j$ (near B). This is output neighbor. In the case of an output neighbor, the next temporary joint $x_{i+1}$ (near D) of the outstanding joint $x_i$ (near C) and the former temporary joint $x_{j-1}$ (near A) of the output neighbor $x_j$ (near B) shall be into consideration. The temporary joints have $(2\alpha+1)$ own joint candidates. $\lambda_{l'}^{(j-1)}$ are joint candidates of $x_{j-1}$. $\lambda_l^{(j)}$ are candidates of $x_j$. $\lambda_o^{(i)}$ are candidates of $x_i$. $\lambda_{o'}^{(i+1)}$ are candidates of $x_{i+1}$. Upper bracketed suffixes j−i, i and i+1 denote the origin of the candidate groups. Lower suffixes l', l, o and o' mean the number in the group. A is one of the candidates $\lambda_{l'}^{(j-1)}$. B is one of the candidates $\lambda_l^{(j)}$. C is one of the candidates $\lambda_o^{(i)}$. D is one of the candidates $\lambda_{o'}^{(i+1)}$.

The candidates have of course x-coordinates and y-coordinates. Namely, exact expression of the candidates are $A=\lambda_{l'}^{(j-1)}(x_{l'}^{(j-1)}, y_{l'}^{(j-1)})$, $B=\lambda_l^{(j)}(x_l^{(j)}, y_l^{(j)})$, $C=\lambda_o^{(i)}(x_o^{(i)}, y_o^{(i)})$, $D=\lambda_{o'}^{(i+1)}(x_{o'}^{(i+1)}, y_{o'}^{(i+1)})$. But the expression of x-coordinates and y-coordinates are omitted for simplicity. All four candidates are gradually determined by probability calculations step by step.

Two candidates A and B on both ends are fixed for a while. The intermediate candidates C and D are variables of $(2\alpha+1)$. Lines connecting the four points A, B, C and D are considered. Since C and D have $(2\alpha+1)$ variables, there are $(2\alpha+1)^2$ different lines which can connect A, B, C and D. The continuous line connecting the four points can be obtained by piecewise approximation based on Fluency functions. The decision of B and C depends on the degree of smoothness of the connecting line ABCD. The line ABCD must have been a smooth straight line or smooth curve in an original object. B and C which give the smoothest interpolation shall be chosen. Selection of the smoothest line refines the figures and excludes the noise.

The problem is now how to express the condition of the most perfect smoothness of the line. Perhaps there are some ways to estimate the smoothness of a line. Here the smoothness is estimated by the number of the points of inflection. A point of inflection is a point at which the curvature changes its sign. A meandering line have many points of inflection. Smooth means small fluctuation of curvature. Thus a smooth line maintains the curvature nearly at a constant value in some length. A smoother line has less numbers of points of inflection. Smooth interpolation is safely displaced by few number of points of inflection. The criterion of determining B and C is minimizing the number of points of inflection of the connecting line ABCD.

Since the candidates have many members, the approximation of line ABCD must be repeated several times. Repetition of approximation calculation heightens the precision of approximation. "t" indicates the time of repetition of the approximation calculation. The t-th time approximation is based on the result of the (t–1)-th time approximation. The similar calculation is iterated several times.

In the t-th time calculation, two end points A and D are fixed (A and D have been determined at the (t–1)-th time calculation). B and C are variables which are selected from the candidates $\lambda_l^{(j)}$ (l=0 to $2\alpha$) and $\lambda_o^{(i)}$ (o=0 to $2\alpha$). The approximation calculation of the connecting line ABCD is repeated by changing the parameters l and o by one with regarding B and C. The fitness of the candidates $\lambda_l^{(j)}$ and $\lambda_o^{(i)}$ to points B and C is expressed in a form of a probability function. The probability function includes a coefficient $r_{ij}(ol)$ designating the smoothness of the line ABCD. The coefficient $r_{ij}(ol)$ is named a fitness coefficient. Here i is the number of the outstanding temporary joint $x_i$, j is the number of the neighboring joint $x_j$, o is the number of candidate $\lambda_o^{(i)}$ for C, and l is the number of the candidate $\lambda_l^{(j)}$ for B. The fitness coefficient $r_{ij}(ol)$ is defined to be 1 for a sufficiently smooth curve and to be a value less than 1 for an unsmooth (meandering) curve. Thus, the fitness coefficient can be a parameter for estimating the fitting of curve ABCD.

Figure 22:
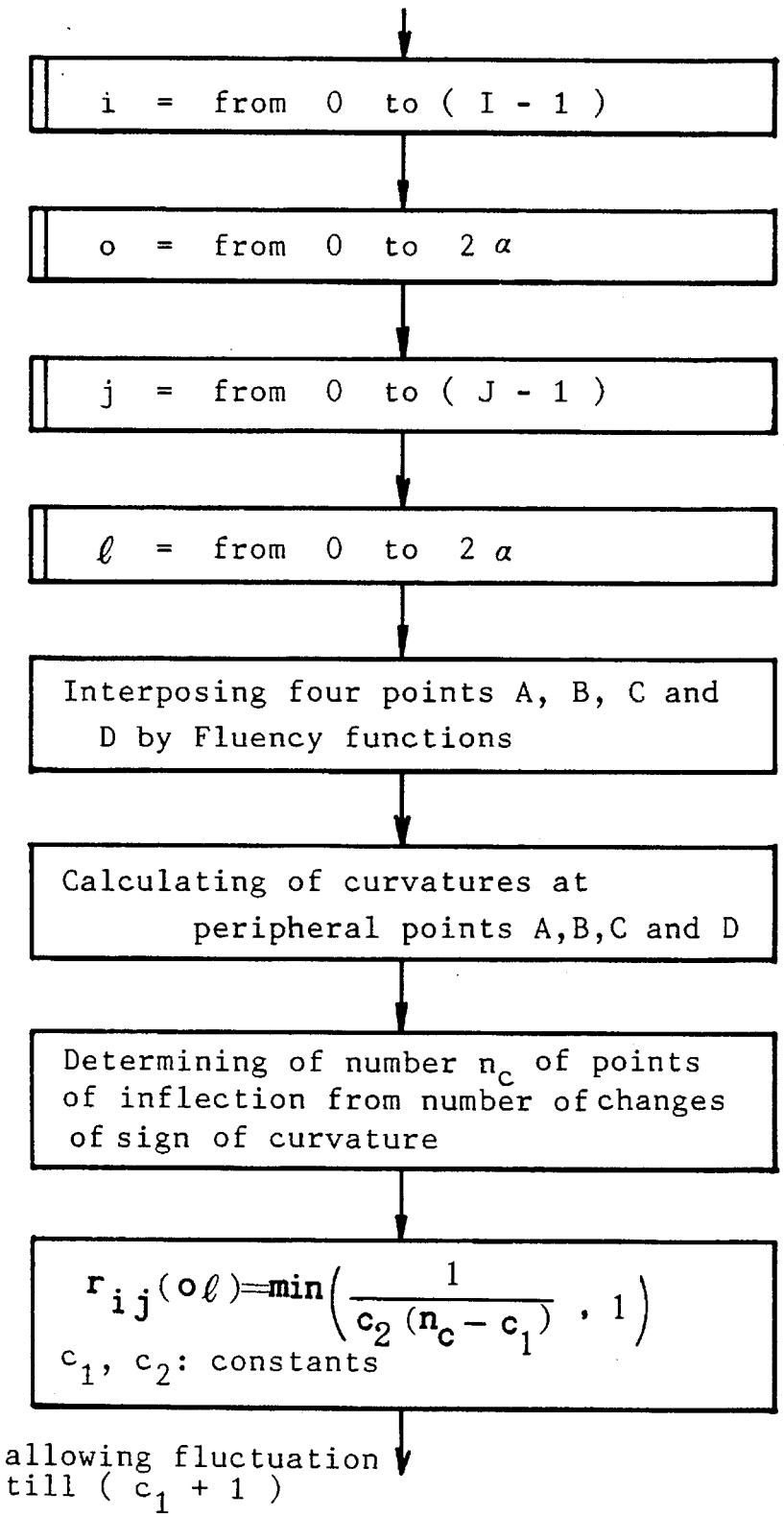
FIG. 22 is a flow chart of the decision of matching coefficients when neighbor joints exist.

FIG. 22 is a flow chart for determining the fitness coefficient $r_{ij}(ol)$ in the case of $J \geq 1$ (there is a neighboring joint). The scopes of parameters are defines at first. "i" takes the number 0 to I–1. The whole approximation is repeated for all temporary joints $x_i$ from i=0 to I–1. "o" is the number of ($2\alpha+1$) candidates of $x_i$. "o=from 0 to $2\alpha$" means that the calculation is repeated for all candidates of $x_i$. "j" is the number of neighboring joints. If plural neighboring joints exist, the calculation shall be repeated (from j=0 to J–1) for all the neighboring joints. Since J>1, sometimes two or three neighboring joints may exist. "l" is the number of the ($2\alpha+1$) joint candidates of $x_j$. "l=from 0 to $2\alpha$" means the calculation shall be repeated for all candidates of $x_j$. Thus, the following calculation shall be repeated with regard to four parameters i, o, j and l.

First points A ($\lambda_r^{(j-1)}$), B ($\lambda_l^{(j)}$), C ($\lambda_{o(i)}$) and D ($\lambda_o^{(i+1)}$) are approximated with a line by Fluency functions in the manner similar to the approximation for calculating curvature. Second order Fluency functions are adopted as bases (m=2).

$$S_x(t)=\Sigma_{k=-2}^{M+2} C_k^{(x)} \phi_k(t) \quad (36)$$

$$S_y(t)=\Sigma_{k=-2}^{M+2} \{-M+2C_k^{(x)} \phi_k(t)\} \quad (37)$$

$$\phi_k(t)=3(t/M)^{-2}\Sigma_{q=0}^{3} (-1)^q \{t-(k+q)(T/M)\}^2+/\{q!(3-q)!\} \quad (38)$$

$$k=-2, -1, 0, 1, 2, \ldots, M+2 \quad (39)$$

Here t is a continuous, intermediate variable. The "t" is not the former "t" for representing the times of approximation. AT the first data approximation for calculating curvature, the whole peripheral points are approximated on one definition region by Fluency functions. However, here only four points are approximated by Fluency functions. AD is the definition region [0,T]. The calculation shown by FIG. 10 is carried out. Since the number of points are very small, the approximation is easily done. The error is estimated by the method of least square. When the error decreases under a certain threshold, the coefficients of the base functions are determines. This approximation produces an approximating curve ABCD.

Then the curvature $K(t_{w(u)})$ is calculated at the points A, B, C and D by twice differentiating the approximating functions $S_x(t)$ and $S_y(t)$.

$$K(t_{w(u)})=\{S_x'(t_w^{(u)})S_y''(t_w^{(u)})-S_x''(t_w^{(u)})S_y'(t_w^{(u)})\}/\{S_x'(t_w^{(u)})^2+S_y'(t_w^{(u)})^2\}^{3/2} \quad (40)$$

where w=A, B, C and D.

Instead of all points on the curve ABCD, the curvature is calculated only for four points A, B, C and D. It takes little time.

The number no of points of inflection is reckoned from the times of the change of the sign of the curvature. The number $n_c$ is of course less than three, because the line connects only four points. FIG. 23 exemplifies different curves with different number $n_c$ of points of inflection. "x" indicates a point of inflection. FIG. 23(a) shows a meandering curve having three point of inflection ($n_c$=3). Frequent change of the curve means the selection of points B and C from their candidates is inappropriate. FIG. 23(b) indicates a curve having two points of inflection ($n_c$=2). The curve of FIG. 23(b) is smooth than the curve of FIG. 23(a). But the curve of FIG. 23(b) is still unsuitable. The selection of B and C is improper. FIG. 23(c) denotes a curve with one point of inflection ($n_c$=1). The curve of FIG. 23(c) is better than FIG. 23(a) or FIG. 23(b). But FIG. 23(c) is still not the best. FIG. 23(d) exhibits a curve without point of inflection ($n_c$=0). The curve of FIG. 23(d) changes little the curvature. The curve is the most smoothest one. Clearly this is the best selection of B and C. B and C are temporarily determined. Since B and C is one of the candidates $\{\lambda_l^{(j)}\}$, $\{\lambda_o^{(i)}\}$, the temporarily selected B and C are specified by parameters l and o. The fitness coefficient $r_{ij}(ol)$ should be defined to be 1 at the best case. For example, the fitness coefficient $r_{ij}(ol)$ is defined by $$r_{ij}(ol)=\min \{1/c_2(n_c-c_1), 1\} \quad (41)$$

where $\min\{\ldots,\ldots\}$ means to take smaller value of the two in $\{\ldots,\ldots\}$ and $c_1$ and $c_2$ are constants. For example, if $c_1=-1$ and $c_2=\frac{3}{4}$, $r_{ij}(ol)=\frac{1}{3}$ for $n_c=3$ (FIG. 23(a)), $r_{ij}(ol)=\frac{4}{9}$ for $n_c=2$ (FIG. 23(b)), $r_{ij}(ol)=\frac{2}{3}$ for $n_c=1$ (FIG. 23(c)). Then $r_{ij}(ol)=1$ for $n_c=0$. Instead of Eq. (41), a simple $r_{ij}(ol)=1/c_2(n_c-c_1)$ is also available for selecting suitable B and C. In any definitions, $r_{ij}(ol)$ must have a bigger value for smaller number $n_c$, because $r_{ij}(ol)$ indicates the degree of fitness of the connecting curve ABCD. The fitness coefficient $r_{ij}(ol)$ at this stage has been calculated from the numbers of the points of inflection. The fitness coefficients will repeatedly calculated by changing the end points A and D, because A and D are also renewed in order to enhance the smoothness of the connection line ABCD. The iteration of calculations will be explained later. Here the determination of $r_{ij}(ol)$ in the case of J>1 has been clarified.

[CASE 2 (J<1; there are no neighboring joints)]

Figure 24:
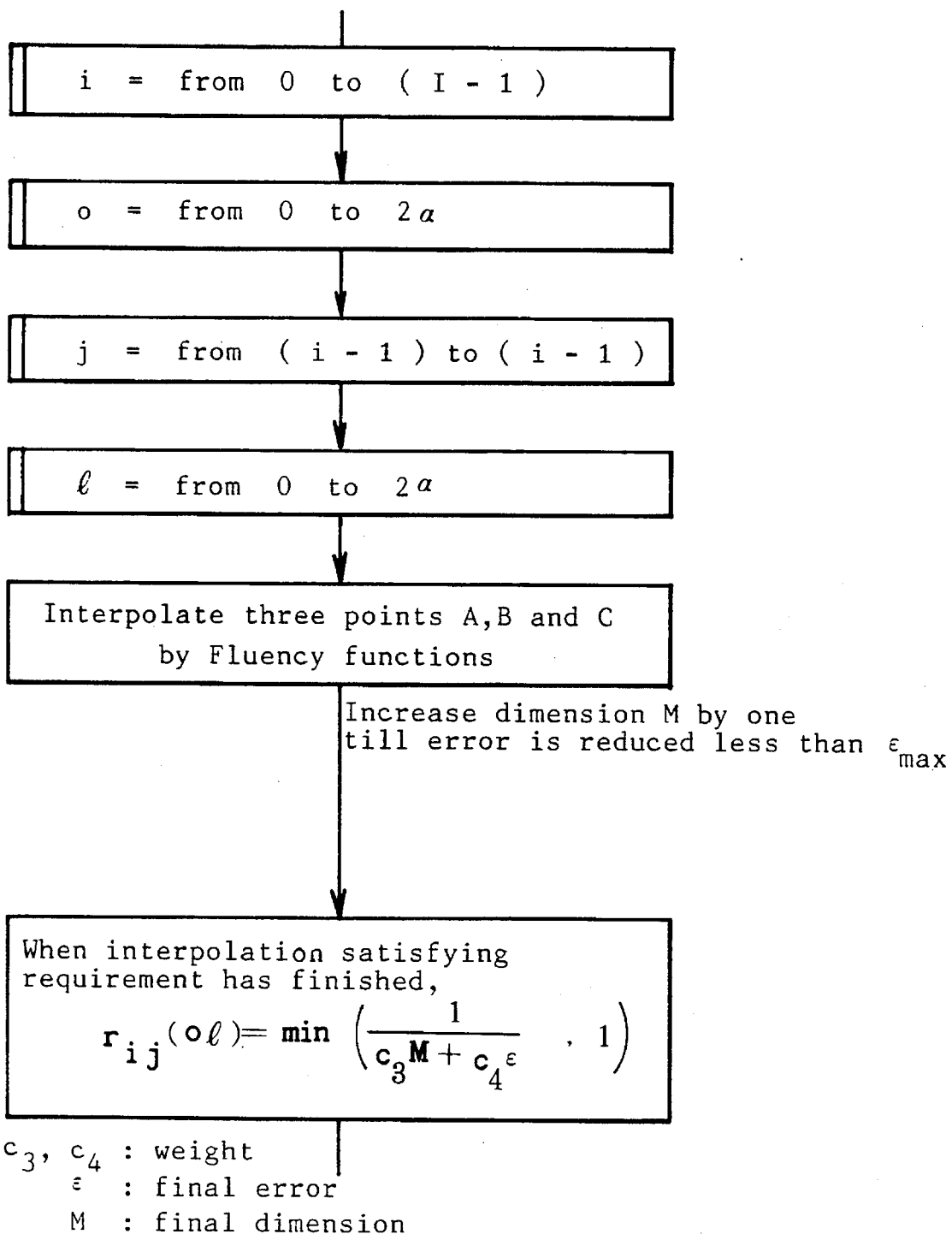
FIG. 24 is a flow chart for determining matching coefficients when no neighboring joint exists.
Figure 25:
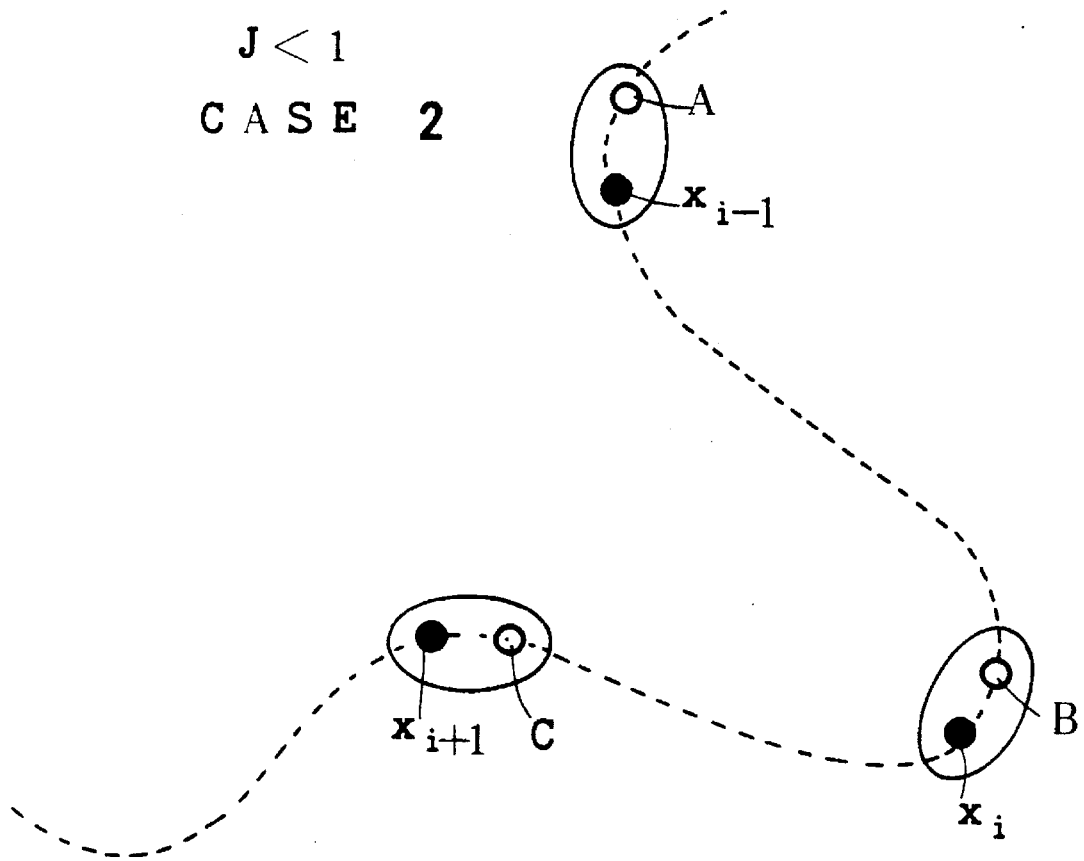
FIG. 25 explains the definition and numbers of the joint candidate B of the temporary joint, forward joint candidate A for another temporary joint and backward joint candidate C for the other temporary joint when the temporary joint has no neighboring joint.

FIG. 24 is a flow chart for calculating the fitness coefficient $r_{ij}(ol)$ in the case of J<1. The outstanding temporal joint $x_i$ has no neighboring joint. FIG. 25 shows an example of the temporary joints and joint candidates. The peripheral line has the outstanding temporary joint $x_i$, a preceding temporary joint $x_{j-1}$ and a succeeding temporary joint $x_{j+1}$. The temporary joints $x_{j-1}$, $x_j$, and $x_{i+1}$ have $2\alpha+1$ joint candidates $\lambda_l^{(i-1)}$, $\lambda_o^{(i)}$ and $\lambda_h^{(i+1)}$. A is one of $\lambda_l^{(i-1)}$. B is one of $\lambda_o^{(i)}$. C is one of $\lambda_h^{(i+1)}$. The purpose is to finding the smoothest curve which connects three points A, B, and C selected from the joint candidate grips. FIG. 24 defines the scopes of the parameters.

"i" is the number of the temporary joint. "i=from 0 to I−1" means that the same calculation shall be done for all temporary joints. "o" is the number of joint candidates of the outstanding temporary joint. "o=from 0 to 2α" means that the same calculation should be done for all candidates. "j" is inherently a number of neighboring temporary joint. But in this case there is no neighboring joint. The temporary joint $x_j$ corresponds to the preceding temporary joint $x_{i-1}$. Thus j=i−1. In the flow chart, this is expressed by from i−1 to i−1.

A curve ABC is considered. Points A and B are variables. Since A is one of $\lambda_l^{(i-1)}$, A changes according to the parameter "l". Since B is one of $\lambda_o^{(i)}$, B changes according to the parameter "o". On the contrary, point C is a fixed point. C is the point of maximizing $P_{i+1}^{(i-1)}$ (h) among the joint candidates $\lambda_h^{(i+1)}$ of the next temporary joint $x_{i+1}$. "t−1" means the former time of approximation. Three points A, B and C are connected by a line which is approximated by Fluency functions. Variable points $A(\lambda_l^{(i-1)})$ and $B(\lambda_o^{(i)})$ are denoted by "o" and "l". The smoothness of the line ABC is estimated by a fitness coefficient $r_{ij}(ol)$. As already explained, dimension M is the parameter for controlling the degree of approximation owing to Fluency functions. High dimension can enhance the degree of approximation. The approximation is also done by the method of FIG. 10. However, it takes little time because there are only three points to be joined in this case. The precision of approximation is enhanced by repeating the similar approximation calculation several times. "t" indicates the time of the approximation calculation. The error is estimated by the method of least square by the equation similar to Eq. (16) or Eq. (29). "$\epsilon_{max}$" is a predetermined threshold of the error of the approximation of the line ABC. When the error of the approximation by the M dimension Fluency functions surpasses $\epsilon_{max}$, the approximation calculation shall be repeated on the bases of Fluency functions of M+1 dimensions. Raising dimension M of Fluency functions reduces the error of the approximation. The approximation calculation is repeated till the error becomes less than $\epsilon_{max}$. The final dimension is denoted by M. The final error is indicated by $\epsilon$. The fitness coefficient $r_{ij}(ol)$ is defined e.g. as $r_{ij}(ol)$=min $\{1/(c_3 M + c_4 \epsilon), 1\}$. If the final dimension M is too large and the final error is too big, the approximation based on the assumption $A=\lambda_l^{(i-1)}, B=\lambda_o^{(i)}$ is not good. It is desirable to approximate three points at a lower dimension M with a lower error. This is the calculation of the fitness coefficient $r_{ij}(ol)$. The coefficient will be used in the calculation of probability calculation. "t" is the time of iteration of the approximation. "t" takes only 0 to four for example. The chain of approximation calculation will be cut at fourth repetition.

[CASE 3 (J≧1 and input neighbor)]

Figure 26:
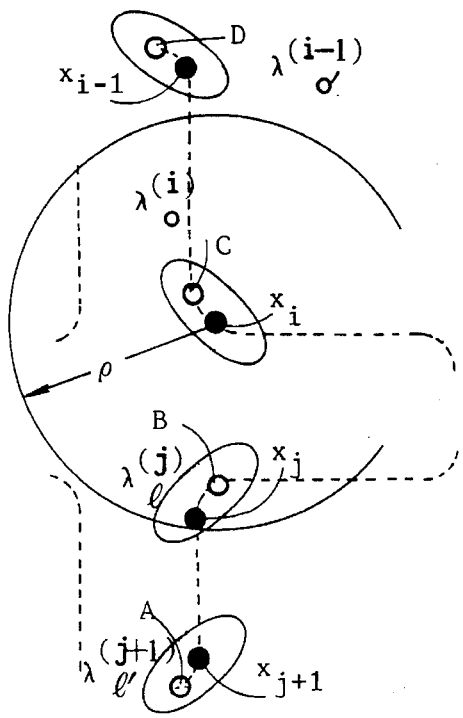
FIG. 26 demonstrates the definition and numbers of the joint candidate C near the temporary joint selected by the bigness of curvature, another joint candidate B near a neighboring joint of input neighbor and another joint candidate D of a temporary joint just before the temporary joint.

FIG. 21 shows the way of determining the smoothest connection curve in the case of J>1 and the neighboring joint $x_j$ being an output neighbor. Similar calculation will also be done in the case of J≧1 and the neighboring joint $x_j$ being an input neighbor. But the position of four points are slightly different. FIG. 26 demonstrates the nomination of four points in the case of input neighbor. A neighboring joint $x_j$ lies within a circle of a radius ρ with the center $x_j$. However, $x_j$ is posterior to $x_i$ with regard to the direction of tracing of the peripheral line. Four points which should be taken into account are the outstanding temporary joint $x_i$, the neighboring joint $x_j$, the latest temporary joint $x_{i-1}$ before $x_i$ and the next temporary joint $x_{j+1}$ of the neighboring joint $x_j$. All four temporary joints $x_{i-1}$, $x_i$, $x_j$ and $x_{j+1}$ have (2α+1) joint candidates $\{\lambda_o^{(i-1)}\}$, $\{\lambda_l^{(j)}\}$ and $\{\lambda_r^{(j+1)}\}$ respectively. The joint candidates have two-dimensional expressions; $\lambda_{o'}^{(i-1)}=(x_{o'}^{(i-1)}, y_{o'}^{(i-1)})$, $\lambda_o^{(i)}=(x_o^{(i)}, y_o^{(i)})$, $\lambda_l^{(j)}=(x_l^{(j)}, y_l^{(j)})$, $\lambda_r^{(j+1)}=(x_r^{(j+1)}, y_r^{(j+1)})$. Four points A, B, C and D are taken from the four groups of joint candidates. A is one of $\lambda_r^{(j+1)}$ ($x_r^{(j+1)}$, $y_r^{(j+1)}$) which maximizes the probability $P_{j+1}^{(i-1)}$(l') at the latest stage of approximation. B is one of $\lambda_l^{(j)}(x_l^{(j)}, y_l^{(j)})$. C is one of $\lambda_o^{(i)}$ ($x_o^{(i)}, y_o^{(i)}$). D is one of $\lambda_{o'}^{(i-1)}$ ($x_{o'}^{(i-1)}, y_{o'}^{(i-1)}$) which maximizes the probability $P_{i-1}^{(i-1)}$(o') at the latest approximation. Four points A, B, C and D are connected by a line which is determined by Fluency function. The connection line ABCD is estimated by the fitness coefficient $r_{ij}(ol)$.

[Determination of Input Neighbour and Output Neighbor]

An outstanding temporary joint $x_i$ often has neighboring joints. There are two kinds of neighboring joints. One is an input neighbor. The other is an output neighbor. An arrow which connects the outstanding temporary joint $x_i$ with other temporary joint is imaginarily drawn to the direction of the tracing of peripheral line. If the arrow enters the neighboring joint, the joint is an input neighbor. If the arrow emanates from the neighboring joint, the joint is an output neighbor.

The input and output neighbor is a concept which is difficult to understand. A joint often has two kinds of neighboring joints. Two kinds of neighboring joints must be distinguished in order to select better joint candidates for making the connecting line smoother.

Figure 27A:
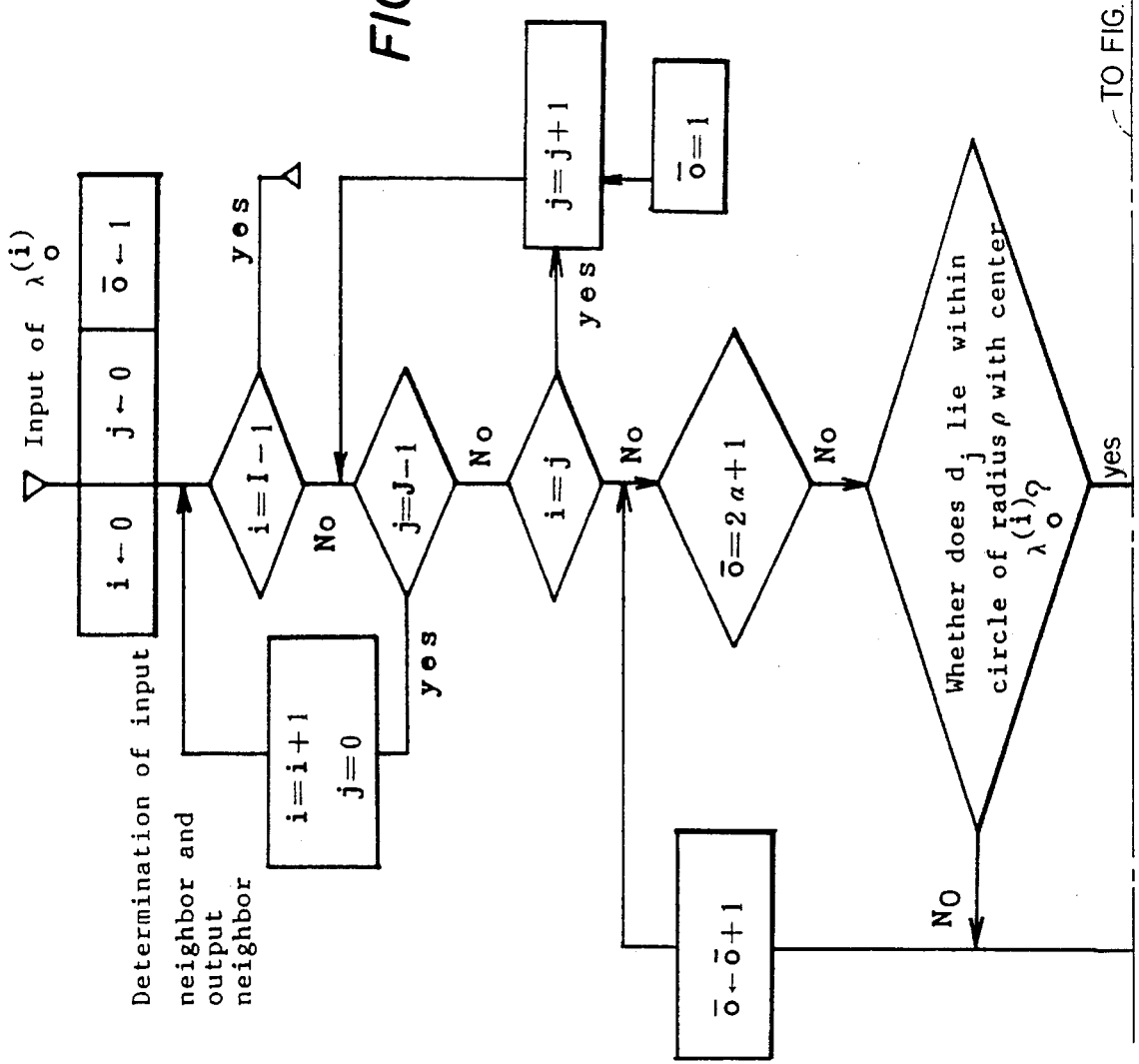
FIGS. 27(a) and 27(b) are a flow chart for determining whether neighboring joints are input neighbor or output neighbor.
Figure 27B:
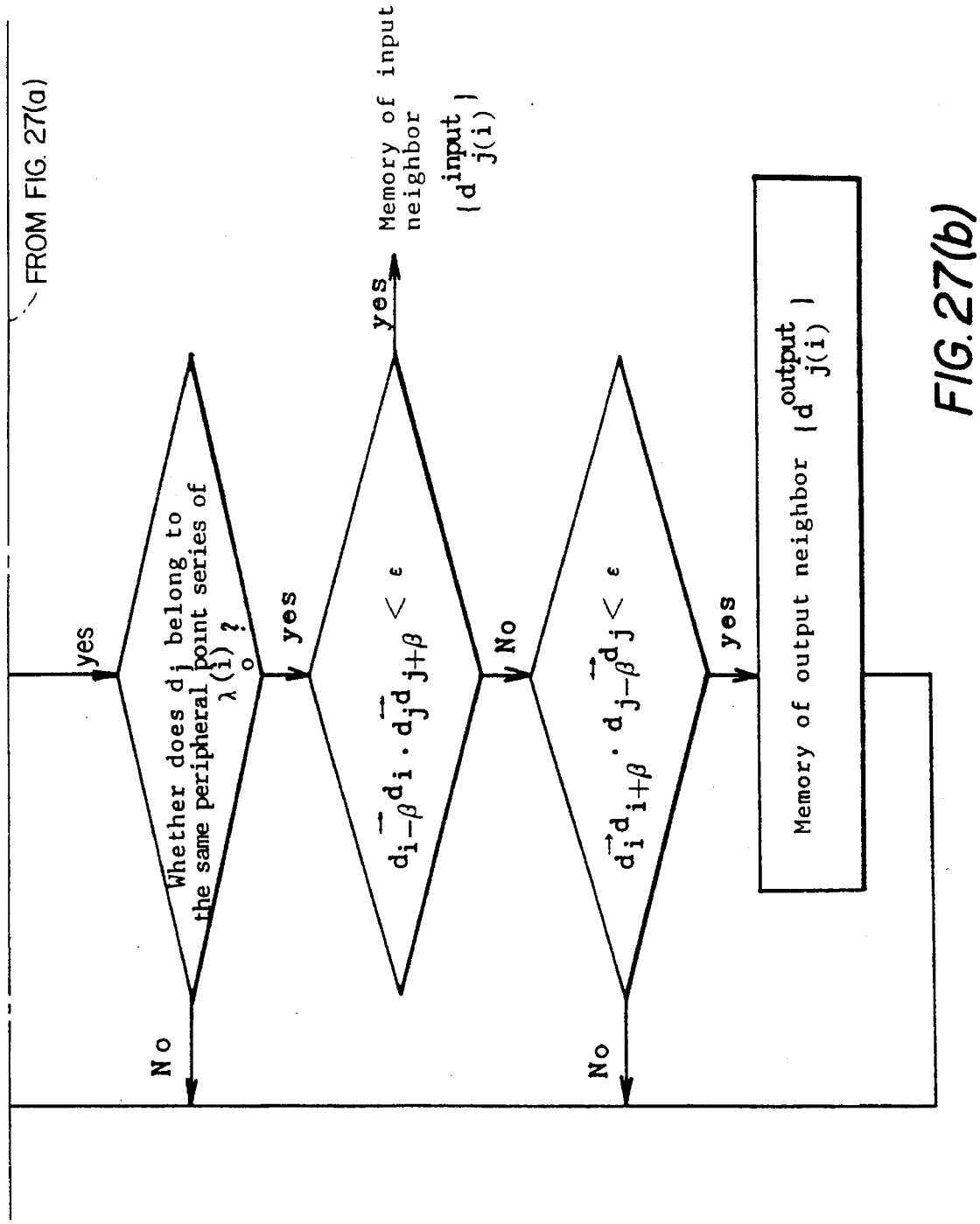

FIGS. 27(a) and 27(b) are a flow chart for judging whether a neighboring joint is an input neighbor or an output neighbor. "i" is the number of the temporary joint $x_i$ which plays a central role in the calculation of determining the smoothest curve connecting four points. "j" is the number of probable neighboring joints. "o" is the number of joint candidates of $x_i$. The data of all the joint candidates $\lambda_o^{(i)}$ of $x_i$ are input. "$d_j(x_j^{(u)}, y_j^{(u)})$" is the coordinate of the j-th temporary joint $x_j$. The first problem is whether $d_j$ is one of neighboring joints of the candidate group $\lambda_o^{(i)}$ ($x_o^{(i)}, y_o^{(i)}$) of $x_i$. If $d_j(x_j^{(u)}, y_j^{(u)})$ is a neighboring joint of $\lambda_o^{(i)}$, $d_j$ must satisfy the following inequality, $$\{(x_o^{(i)}-x_j)^2+(y_o^{(i)}-y_j)^2\}^{1/2}<\rho. \qquad (42)$$

This is an inequality similar to Eq. (35). Eq. (35) uses the coordinates of temporary joints as it is. But Eq. (42) replaces the temporary joint $x_i$ by its joint candidate $\lambda_o^{(i)}$. If $d_j$ satisfies Eq. (42) for some value of o, $d_j$ may be a neighboring joint of $x_i$. Further, it shall be investigated whether $d_j$ belongs to the same peripheral point series including $\lambda_o^{(i)}$. If so, $d_j$ is a neighboring joint $x_j$ of $x_i$.

Since the definition of the neighboring joint is clarified, the distinction of the input and the output will be explained. "$d_i$" denotes "$x_i$". "x" has been a symbol of temporary joints. "d" signifies arbitrary peripheral points. In order to expand the scope of consideration to arbitrary peripheral points, the parameters are now converted to "d". "$d_{i-b}$" indicates the peripheral point preceding $d_i$ by b peripheral points. Similarly, "$d_{j+b}$" indicates the peripheral point succeeding $d_j$ by b peripheral points. FIG. 27 shows "β" as the parameter of difference from point i or point j, but "b" replaces β in this description, because β cannot be reduced to a suffix. A vector $d_{i-b}d_i$ is nearly a tangent line at $d_i$ of the peripheral line. The vector $d_{i-b}d_i$ is directed toward the direction of the tracing of the peripheral line.

Another vector $d_jd_{j+b}$ is nearly a tangent line at $d_j$ of the peripheral line. The vector $d_jd_{j+b}$ is also directed toward the direction of the tracing. An inner product of vector $d_{i-b}d_i$ and vector $d_jd_{j+b}$ calculated. If the inner product is small enough, two vectors meet at a right angle each other. The condition is described by the inequality;

vector $d_{i-b}d_i$·vector $d_jd_{j+b}$<ε. +tm  (43)

Here ε is a small constant. If $d_j$ suffices (43), $d_j$ is an input neighbor. Thus, $d_j$ is stored in a memory as an input neighbor $d_{j(i)}^{input}$ of $X_i$.

On the contrary, vector $d_{j-b}d_j$ has the direction of tracing near $d_j$. But the inclination of vector $d_{j-b}d_j$ is different from vector $d_jd_{j+b}$, because the inclination changes at the temporary joint $d_j$ with a big curvature. The condition of output neighbor is described by, vector $d_id_{i+b}$·vector $d_{j-b}d_j$<ε.  (44)

If $d_j$ satisfies the inequality, $d_j$ is an output neighbor of $x_i$. Then, the data are stored in a memory as $\{d_j^{output}(i)\}$. FIGS. 27($a$) and 27($b$) show the definition due to inner product of vectors.

However, another definition by outer product of vectors is also available for the input neighbor and the output neighbor. Outer products of vectors is more convenient for finding parallel vectors.

(input neighbor)|vector $d_{i-b}d_i$×vector $d_jd_{j+b}$|<ε  (45)

(output neighbor)|vector $d_id_{i+b}$×vector $d_{j-b}d_j$|<ε  (46)

The definition using outer products distinguishes more clearly the kinds of neighbors. If inequalities (45) and (46) are insufficient. In addition to the outer products, the distinction of the input and output neighbors is obtained from the signs of the inner products of vectors.

vector $d_{i-b}d_i$·vector $d_jd_{j+b}$  (47)

vector $d_id_{i+b}$·vector $d_{j-b}d_j$  (48)

[Calculation of Probability]

Figure 28A:
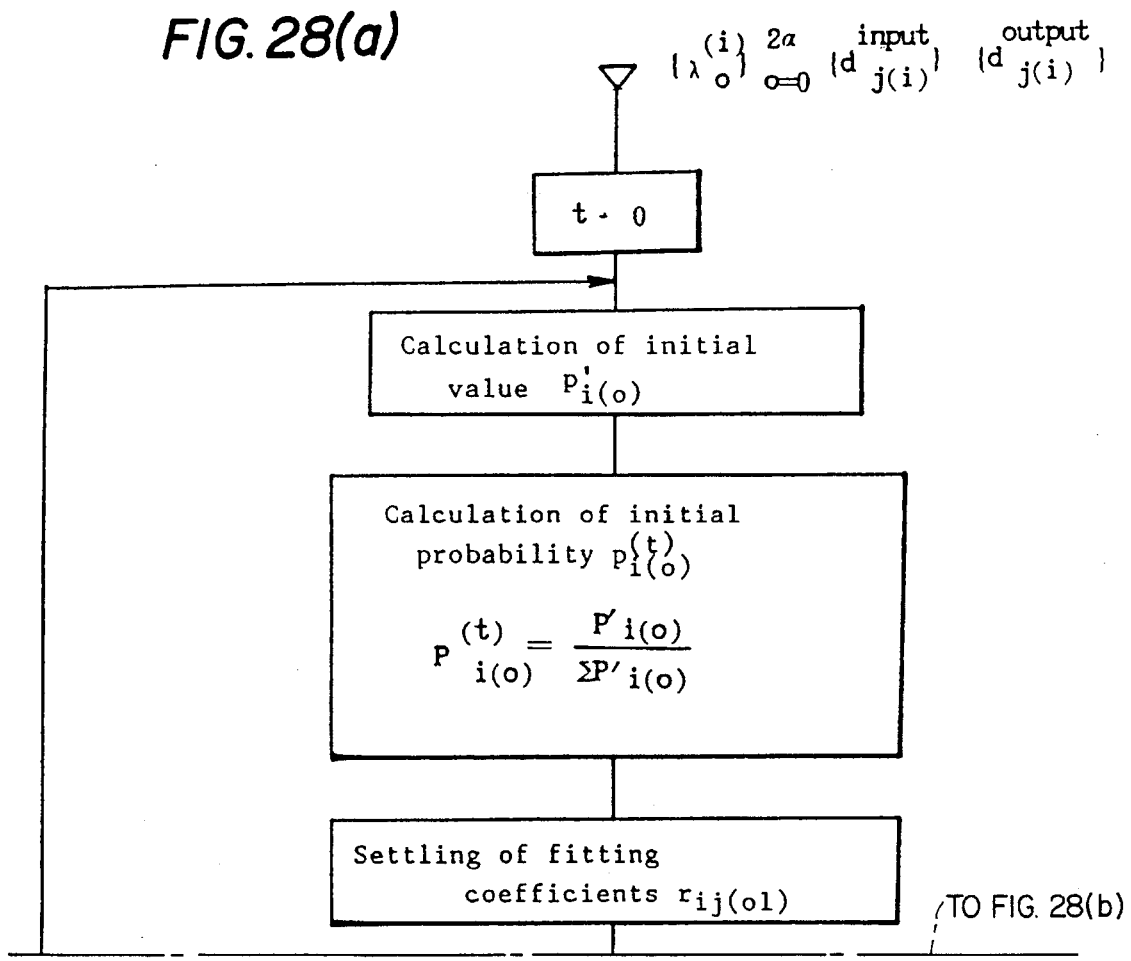

Optimum joints can be obtained from the following calculation of probability on joint candidates. FIGS. 28($a$) and 28($b$) are a flow chart of the probability calculation. The calculation takes into account the joint candidates and the input neighboring joint and output neighboring joint;

$\lambda_o^{(i)}(x_o^{(i)}, y_o^{(i)}), d_j^{input}(i), d_j^{output}(i)$  (49)

where $\lambda_o^{(i)}(x_o^{(i)}, y_o^{(i)})$ is joint candidates near the outstanding temporary joint $x_i$, "o" is the number of joint candidates. $d_j^{input}$ is the coordinate of the neighboring joint of $x_i$ of the input neighbor. $d_j^{output}(i)$ is the coordinate of the neighboring joint of $x_i$ of the output neighbor.

The above data are input in the optimum joint extraction device J at first. The calculation of probability is iterated several times. The times of iteration are denoted by "t". In the probability calculation, the maximum t is predetermined to, e.g. four times (t=0 to 4) instead of estimating the error by the method of least square. Of course, the times of iteration may be increased to five times or reduced to three times.

Probability variable $P_i^{(t)}(o)$ is defined. $P_i^{(t)}(o)$ is the probability that the o-th joint candidate of $x_i$ should be the optimum joint instead of $x_i$ at the t-th iteration of calculation. There are 2α+1 joint candidates for $x_i$. The joint candidate which gives the highest probability $P_i^{(t)}$ among all the candidates $\lambda_o^{(i)}$ at the final iteration is assigned to an optimum joint. At first, initial probability is given by some way which will be explained later. Iteration of probability calculations heightens the probability of the joint candidate which is suitable for the optimum joint and reduces the probability of another joint candidates which are not suitable for the optimum joint. Of course, there are several ways for defining the probability of selecting the optimum joint. Here the probability is determined as follows.

Complementary probability $Q_i^{(t)}(o)$ is introduced for giving another probability of the o-th joint candidate at t-th iteration. The complementary probability $Q_i^{(t)}(o)$ is a sum of the input probability $q_i^{input}(o)$ and the output probability $q_i^{output}(o)$. Of course, $q_i^{input}(o)$ and $q_i^{output}(o)$ change according to the time of iteration. But the time parameter "t" is omitted for simplicity. The complementary probability $Q_i^{(t)}(o)$ is given by, $Q_i^{(t)}(o)=q_i^{input}(o)+q_i^{output}(o)$  (50)

$q_i^{input}(o)$ is defined as $q_i^{input}(o)=\max\{r_{ij}(ol) \times P_j^{(t)}(l)\}$  (51)

($\lambda_l^{(j)}$ is one of the joint candidates of an input neighbor $d_j^{input}(i)$)  (52)

In Eq. (51), "max{ ... }" means that the maximum value in { ... } shall be taken by changing the parameter "l". This process selects the joint candidate $\lambda_l^{(j)}$ in the input neighbor $x_j$ which gives the smoothest curve in the restricted condition. FIGS. 28($a$) and 28($b$) show the definition of the input and the output probability in the square. The max calculation has a requirement described below. But the requirement cannot be written because of the restriction of typewriting. Bracket (52) describes the requirement instead of symbols. The fitness coefficient $r_{ij}(ol)$ has been previously determined e.g. Eq. (41). Similarly the output probability $q_j^{output}(o)$ is defined by, $q_j^{output}(o)=\max\{r_{ij}(ol) \times P_j^{(t)}(l)\}$  (53)

($\lambda_l^{(j)}$ is one of the joint candidates of an output neighbor $d_j^{output}(i)$)  (54)

"max" in Eq. (53) means that the maximum shall be taken by changing "l". Namely the joint candidate of the output neighboring joint $x_j$ shall be selected by the criterion that the candidate realizes the smoothest curve in the temporarily restricted requirement. Eq. (51) and Eq. (53) select the joint candidates of the neighboring joints $x_j$'s which produce the smoothest curve connecting four points ABCD in FIG. 21 and FIG. 26. The reason why the contributions from the input neighbor and the output neighbor should be added is that the process aims at searching the optimum point among the candidates of $x_i$ which maximizes the smoothness of two crossing curves, one of which passes at the input neighbor and the other of which passes at the output neighbor.

The (t+1)-th probability $P_i^{(t+1)}(o)$ is defined by the functions of the t-th time probability and the t-th time complementary probability $Q_i^{(t)}(o)$, as follows:

$P_i^{(t+1)}(o)=P_i^{(t)}(o) \, Q_i^{(t)}(o) / \{\Sigma_{o=0}^{2\alpha+1} P_i^{(t)}(o) \, Q_i^{(t)}(o)\}$  (55)

where the summation of the denominator is carried out with regard to the joint candidates $\lambda_o^{(i)}$ of $x_i$. "o" changes from 0 to $2\alpha+1$. $\alpha$ is replaced by a in the suffix, because $\alpha$ cannot be converted into a suffix because of the restriction of typewriting. Eq. (55) is written at the bottom of the square of FIG. 28. The calculation shall be iterated e.g. from t=0 to t=4. Initial probabilities should be given for $P_i^{(\square)}(o)$ at t=0 for starting the iteration of probability calculation. The initial probabilities $Pi(0)(o)$ can be given in any ways. Here for example, the candidates nearer to the outstanding temporary joint $x_i$ are allotted with a bigger initial probability. This allocation is based on the assumption that the optimum joint may lie in the vicinity of the temporary joint $x_i$ and the highest initial probability $P_i^{(\square)}(o)$ of the temporary joint may facilitate the convergence of the probabilities $P_i^{(t)}(o)$.

Figure 30:
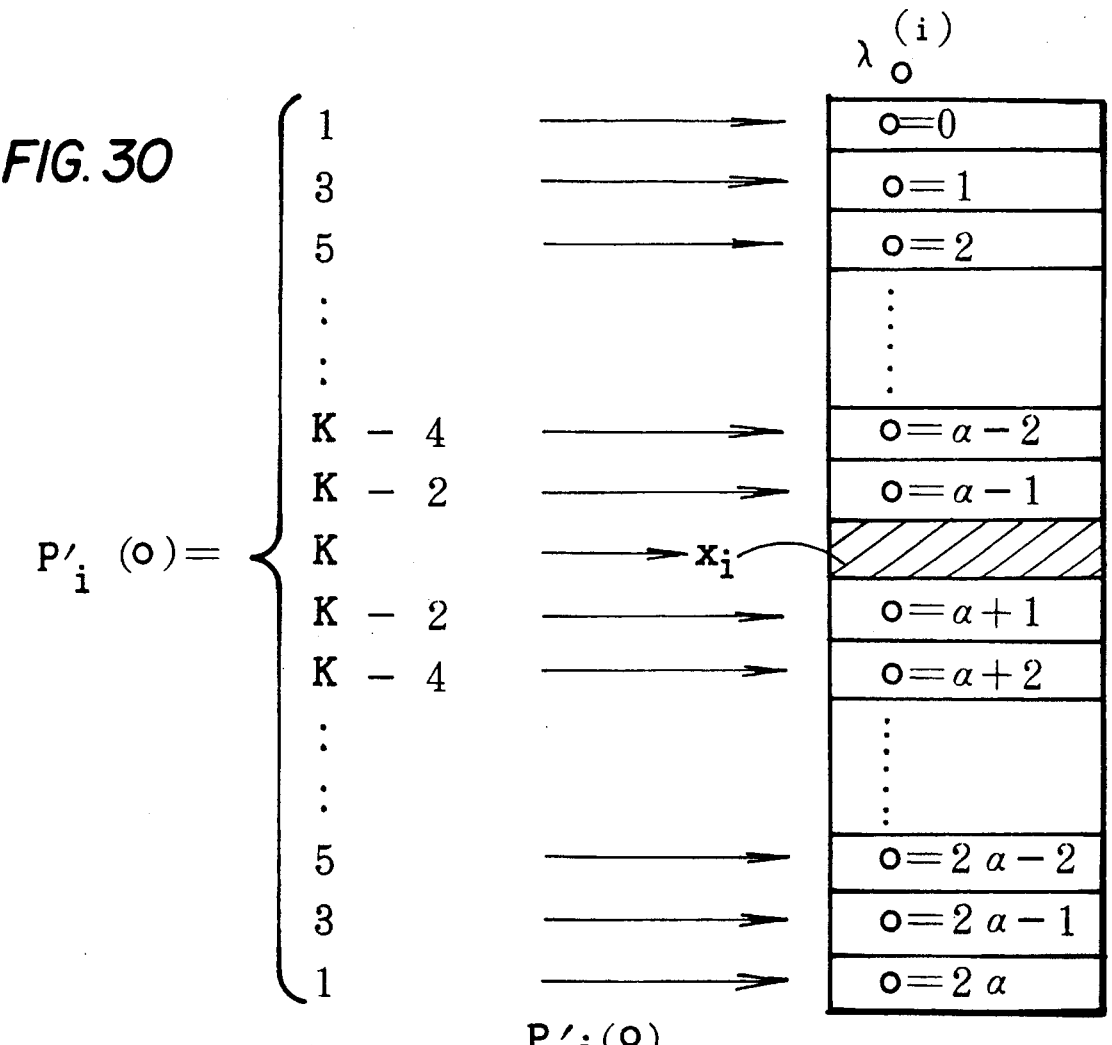
FIG. 30 is an explanatory figure exhibiting initial probabilities given to 2α+1 joint candidates in the vicinity of a temporary joint.

FIG. 30 clarifies the allotment of the initial probabilities $P_i^{(0)}(o)$ to the joint candidates $\lambda_o^{(i)}$. There are $(2\alpha+1)$ joint candidates $\lambda_o^{(i)}$, where "o" is the number (o=0 to $2\alpha+1$) of the candidates. "o=$\alpha$" is the temporary joint itself. Preliminary values of $P'_i(o)$ take e.g. the biggest value K at o=$\alpha$ and takes (K-2) at o=$\alpha$-1 or o=$\alpha$+2. $P'_i(o)$ lowers by 2, being distanced by one candidate from the middle temporary joint $x_i$. $P'i(o)$ is 1 for o=0 and o=$2\alpha$, as exhibited in FIG. 30. The preliminary values $P'_i(o)$ make the initial probability $P_i^{(o)}(o)$ by normalizing themselves.

$$P_i^{(o)}(o)=P'_i(o)/\Sigma_{o=0}^{2a+1} P'_i(o) \qquad (56)$$

where $\alpha$ of the final number of summation is replaced with a by the same reason at Eq. (55). The sum is from o=0 to $2\alpha+1$ with regard to o; the candidates of $x_i$. The initial probabilities $P_j^O(l)$ for neighboring joints or for other joints are similarly predetermined by the similar formula to Eq. (56).

Since the initial probabilities $P_i^{(o)}(o)$ and $P_j^{(0)}(l)$ are allotted, $q_i^{output}(o)$ and $q_i^{input}(o)$ at the first time (t=1) of iteration can be reckoned from the fitness coefficients $r_{ij}(ol)$. Then $q_i^{output}(o)=\max\{r_{ij}(ol) P_j^{(\square)}(l)\}$, where the variable is "l" which is the number of the output neighboring joint $x_j$. This equation selects the most probable candidate of the neighboring joint $x_j$ for forming the smoothest curve ABCD. $q_i^{input}(o)=\max\{r_{ij}(ol) P_j^{(\square)}(l)\}$, where the variable is "l" which is the number of the input neighboring joint. This equation chooses the most probable candidate of the input neighboring joint for forming the smoothest curve ABCD. The parameters "l" and curves ABCD are of course different from each other for the input probability $d_i^{input}(o)$ and the output probability $d_i^{output}(o)$, although the same notations are used.

Then, $Q_i^{(0)}(o)=q_i^{output}(o)+q_i^{input}(o)$. The complementary probability at the zero time iteration is obtained. The first time probability $P_i^{(1)}(o)$ is calculated by $P_i^{(1)}(o)=P^{(\square)}(o) Q_i^{(0)}(o)/\{\Sigma_{o=\square}^{2a+1}P_i^{(\square)}(o) Q_i^{(0)}(o)\}$. Then at the first time iteration, $q_i^{output}(o)=\max\{r_{ij}(ol) P_j^{(1)}(l)\}$ and $q_i^{input}(o)=\max\{r_{ij}(ol) P_j^{(1)}\}$. In the first equation of $q_i^{output}(o)$, j is the output neighboring joint and "l" denotes the joint candidates of the same output neighboring joint. On the contrary, j of the latter $q_i^{input}(o)$ is the input neighboring joint and "l" denotes the joint candidates of the same input neighbor. "j" and "l" are different in the equations of $q_i^{output}(o)$ and $q_i^{input}(o)$. Then $Q_i^{(1)}(o)=q_i^{output}(o)+q_i^{input}(o)$. The first time complementary probability has been obtained.

The second iteration shall be done. $P_i^{(2)}(o)=P_i^{(1)}(o) Q_i^{(1)}(o)/\{\Sigma_{o=}^{2a+1}P_i^{(1)}(o) Q_i^{(1)}(o)\}$ from Eq. (55) at t=1. Then $q_i^{output}(o)=\max\{r_{ij}(ol) P_j^{(2)}(l)\}$ and $q_i^{input}(o)=\max\{r_{ij}(ol) P_j^{(2)}(l)\}$ from Eqs. (51) and (53) at t=2. $Q_i^{(2)}(o)=q_i^{output}(o)+q_i^{input}(o)$. From $P_i^{(2)}(o)$ and $Q_i^{(2)}(o)$ the third time probability $P_i^{(3)}(o)$ shall be obtained. The calculation shall be iterated till t reaches some predetermined time. In this example, the iteration shall be ended at t=4.

Figure 31:
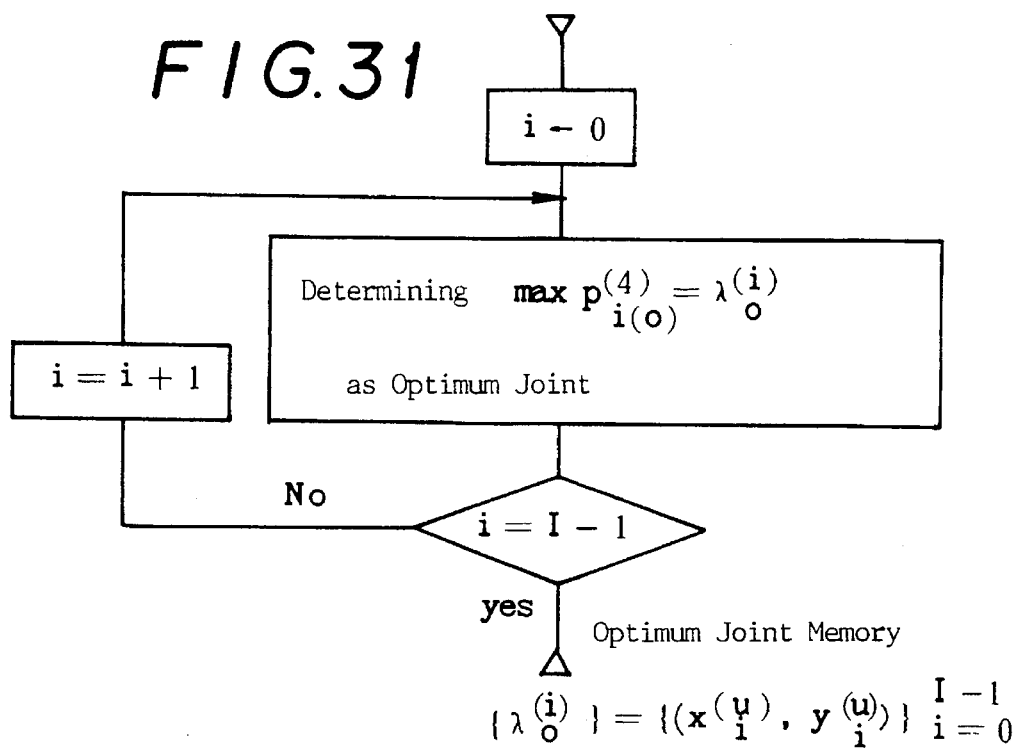
FIG. 31 is a figure for demonstrating the steps of calculating probability variables of all temporary joints, assigning the joint candidate which gives the biggest probability to the optimum joint and memorizing the optimum joint.

FIG. 31 shows the process for determining the optimum joint. The final output is an assembly of probabilities $\{P_1^{(4)}(o)\ i=0^{I-1}{}_{o=0}{}^{o-1}\}$. The number "o" of joint candidates changes from 0 to 0-1 (=$2\alpha$) for all temporary joints $x_i$'s. The number of temporary joints changes from 0 to I-1. $P_1^{(4)}(o)$ signifies the probability that the o-th candidate $\lambda_o^{(i)}$ of the temporary joint $x_i$ should be an optimum joint in the vicinity of $x_i$.

The joint candidate which has the largest probability $P_i^{(4)}(o)$ at the final stage of iterations (e.g. t=4) is assigned to be an optimum joint. FIG. 31 demonstrates that the optimum joint is determined to the joint candidate $\lambda_o^{(i)}$ which gives max $\{P_i^{(4)}(o)\}$ among all candidates of $x_i$. The optimum joint replaces the temporary joint. The temporary joint now loses the title of a joint. Therefore, an optimum joint can be determined from the joint candidate in the vicinity of a temporary joint $x_i$. Such a calculation shall be done with all temporary joints. The coordinates of all the optimum joints $\{\lambda_o^{(i)}\}=\}(x_i^{(u)}, y_i^{(u)})\}_{i=\square}^{I-1}$ are stored in the optimum joint memory M.

This invention seeks temporary joints at first from the curvature, develops the probable joints to joint candidates near the temporary joints and determined optimum joints from the candidates. This is an important feature of this invention. The revision is based on the discovery of the Inventor that the temporary joints found from the bigness of curvature are not necessarily the most pertinent joints.

[Other Definition of Fitness Coefficients]

The condition for the optimum joints has been the least number of points of inflection of the curve connecting four points. Namely, the optimum joints are selected from the purpose for obtaining the smoothest curve connecting four points on both sides of a crossing point. Alternative for revising the joints is a method of treating directly the curvature of the curves instead of the number of points of inflection.

Figure 29:
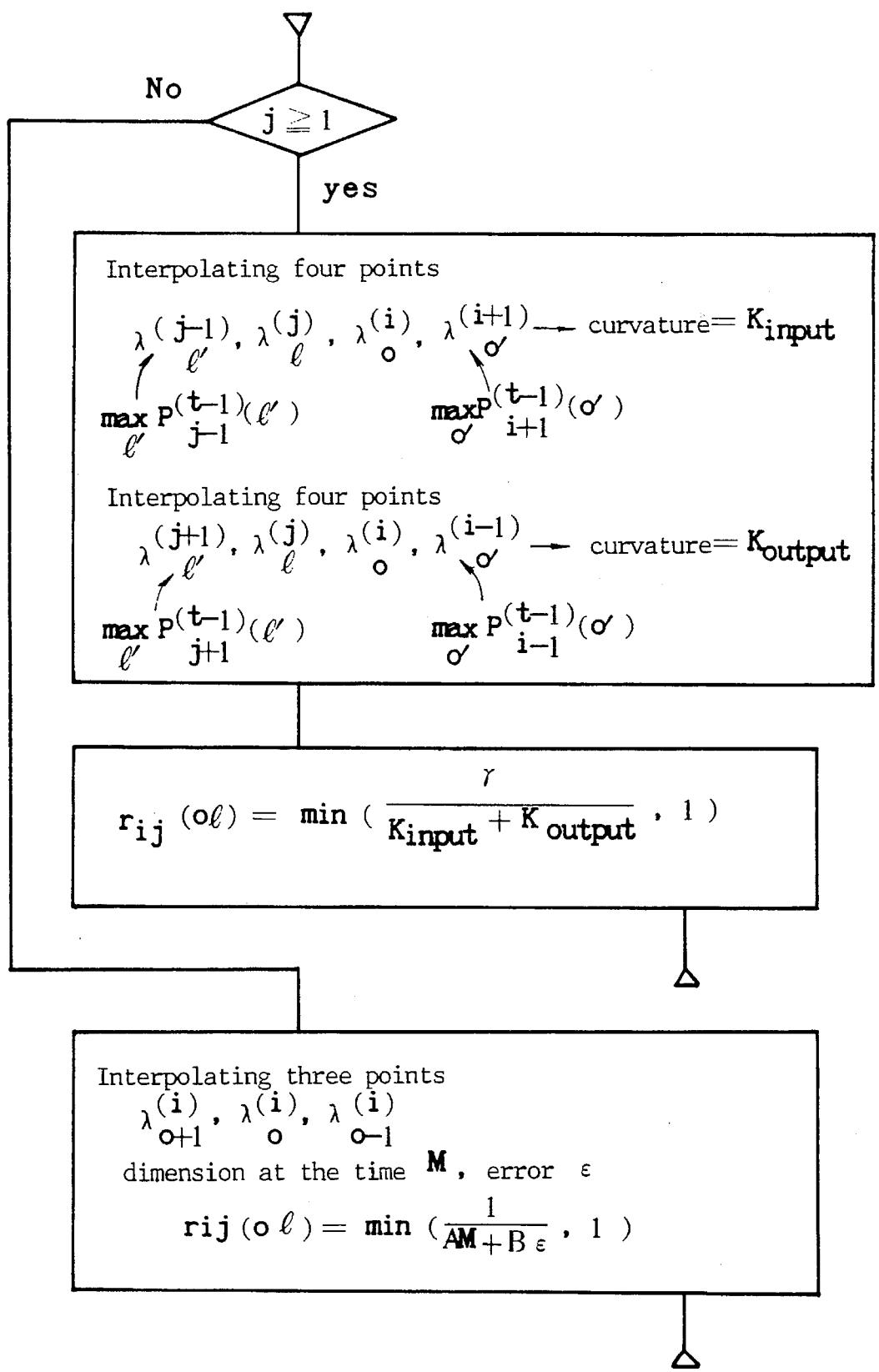
FIG. 29 is a flow chart showing another way of determining the matching coefficients.

FIG. 29 is a flow chart of another method for determining the optimum joints directly from the curvature. "J≧1" is the condition that there are some neighboring joints $x_j$ near the temporary joint $x_i$. In the case, an input neighbor and an output neighbor $x_j$ are also considered. The latest joint and the next joint of $x_i$ or $x_j$ are taken into consideration for forming a curve connecting the four points as shown in FIG. 21 and FIG. 26. Then the maximum curvature of the curve is calculated instead of the number of points of inflection.

The middle square of FIG. 29 clarifies the definitions of maximum curvatures "$K_{output}$" and "$K_{input}$". "$K_{input}$" is the maximum curvature of the curve connecting four points $\lambda_r^{(j-1)}, \lambda_i^{(j)}, \lambda_o^{(i)}$ and $\lambda_o^{(i+1)}$ in the case of the input neighbor. In the four points, two ends are fixed points. $\lambda_r^{(i-1)}$ is the joint candidate which maximizes the latest probability $P_{j-1}^{(t-1)}(l')$. Namely $\lambda_r^{(j-1)}=\max P_{j-1}^{(t-1)}(l')$. $\lambda_o^{(i+1)}$ is the joint candidate which maximizes the latest probability $P_{i+1}^{(t-1)}(o')$. Namely $\lambda_o^{(i+1)}=\max P_{i+1}^{(t-1)}(o')$. "$K_{output}$" is the maximum curvature of the curve connecting another four points $\lambda_r^{(j+1)}, \lambda_i^{(j)}, \lambda_o^{(i)}$ and $\lambda_o^{(i-1)}$ in the case of the output neighbor. Two ends are fixed points. $\lambda_r^{(j+1)}=\max P_{j+1}^{(t-1)}(l')$. $\lambda_o^{(i-1)}=\max P_{i-1}^{(t-1)}(o')$. The smoothest curve must have the least value of the maximum curvature. The smaller the maximum curvature of a line is, the smoother the line is. The least maximum curvature is desirable for forming the smoothest line. Then the another method of this invention defines the fitness coefficient $r_{ij}$ as the minimum of the sum of the maximum curvatures $K_{input}$ and $K_{output}$.

$$r_{ij}(ol)=\min\{\gamma(K_{input}+K_{output})^{-1}, 1\} \qquad (57)$$

where $\gamma$ is a constant which is nearly equal to the least value of $(K_{input}+K_{output})$. "min {a, b}" is equal to the smaller member of a and b. The second square of FIG. 29 shows the definition of the fitness coefficient $r_{ij}$(ol). The newly defined fitness coefficient is larger for a curve of smaller curvature. The new $r_{ij}$(ol) can also estimate the smoothness of a curve.

The bottom square of FIG. 29 exhibits the determination of r(o) in the case of J=0, i.e. no neighboring joint. Three points $\lambda_{o+1}^{(i)}, \lambda_o^{(i)}, \lambda_{o-1}^{(i)}$ are connected by a curve using the second order Fluency functions. $r_{ij}$(ol)=min $\{(A M+B \epsilon)^{-1}, 1\}$, where M is the dimension of the approximation and $\epsilon$ is the error of the method of least square. $\lambda_o^{(i)}$ is one of the joint candidates of $x_i$. $\lambda_{o-1}^{(i)}$ and $\lambda\square+1^{(i)}$ are other joint candidates distanced from $x_i$ by "l" peripheral points.

The following process is similar to the former method. The calculation of-probabilities is repeated four times. At t=4, the iteration of calculation is stopped. The joint candidate which has the largest probability $P_i^{(4)}$(o) shall be chosen as an optimum joint of the group to which $x_i$ belongs. Such a calculation shall be done with all temporary joints. The coordinates of all the optimum joints $\{\lambda_o^{(i)}\}=\{(x_i^{(u)}, y_i^{(u)})\}_{i=\square}^{I-1}$ are stored in the optimum joint memory M.

[K. Optimum Joint Memory 122]

The optimum joint memory 122 stores all the optimum joints which have been determined in the former processes. The optimum joints are memorized in the form $\{(x_i^{(u)}, y_i^{(u)})\}_{i=0}^{I-1}$. "u" is the number of the peripheral points series. "i" is the number of the peripheral point in the u-th series. "i" has been a number of a temporary joint and "$x_i$" has been a temporary joint ($x_i$ represents $y_i$ also ) so far. Here the number "i" is now affixed to the optimum joints. The representation $x_i$ of an optimum joint must not be confused with the representation $x_i$ of a temporary joint. The common use of "i" will cause no problem, because one optimum joint corresponds to one optimum joint and the optimum joint either is the temporary joint itself or lies near the temporary joint.

The process have been explained so far step by step. But the processes are so complicated that the method of the invention may not be clearly understood as a whole. Here the whole of the method is retrospected by FIGS. 32(a)–32(d) exemplifying the operations. FIGS. 32(a)–32(d) show the treatment of a character "は". The uppermost drawing is the black character which is input into an image memory A by an image scanner. Image processing extracts the peripheral point series. The peripheral point series are denoted by the blank character of the second drawing. The righthand double circles are extracted in the integral circle extraction process and are memorized in the integral circle memory. The double circles are excluded in the following operations.

The rest is "は" which is exhibited by the third drawing of FIG. 32. The blank "は" has three independent peripheral point series. All peripheral points in a series are connected by a closed loop whose form is approximated by piecewise polynomials based on Fluency functions, e.g. the second order Fluency functions as bases. Then the curvatures are calculated at all points by twice-differentiating the piecewise polynomials representing the closed loop. Temporary joints are extracted as the peripheral point with a big curvature. The righthand encircled drawing exemplifies a temporary joint at a corner. In general, temporary joints appear at turning points of the closed loop. The fourth figure of FIG. 32 shows some of the temporary joints "x" abstracted by the bigness of the curvature. Since the temporary joint is selected by the curvature, a blunt corner, e.g. sometimes the lower, righthand corner encircled is not abstracted as a joint. In the case, a joint shall be added to the blunt corner as shown in the second enlarged drawing of FIG. 32. Then K (=I=2α+1) peripheral points in the vicinity of the temporary joint are defined as joint candidates $\{\lambda_k^{(i)}\}_{k=1}^{K}$ or $\{\lambda_o^{(i)}\}_{o=\square}^{I-1}$. The sixth figure of FIG. 82 shows the extraction of neighboring joints of the temporary joint $x_i$ which is the right blunt corner. The processes have already been explained till the extraction of the neighboring joints.

The treatments are again retrospected on an example of the illustration of diodes of FIGS. 33(a–33(c). This figure is produced by adding an extra round at upper right of the diode of FIG. 18 or FIG. 50 for clarifying the treatment of integral circles. The original drawing is read-in by an image scanner into an image memory A. Peripheral point series are extracted by the image processing. The blank figure consisting of peripheral point lines is exhibited by the second drawing of FIG. 33. There are five independent peripheral point series. Two circles at the upper right are extracted by the integral circle extraction and are stored in the integral circle memory.

The rest is constructed with a round, a triangle and a segment of a line. There are three peripheral point series. All point series are outlined by curves which approximate the point series with piecewise polynomials based on Fluency functions. The curvatures are calculated by differentiating the piecewise polynomials or directly from the peripheral points. A corner of the peripheral line is extracted as a temporary joint as shown in the enlarge, encircled figure of FIG. 33. Temporary joints are denoted by "x" in the fourth drawing. Turning points or joining points of segments become temporary joints. Since the temporary joints are abstracted by the bigness of curvature, a blunt corner at which two segments meet at an obtuse angle sometimes fails to be selected as a joint. In the case, the corner shall be added as a temporary joint. In the example of FIG. 33, all turning points can be selected by the curvature. There is no need to add a joint. Then K (=2α+1=I) peripheral points in the vicinity of the temporary joints are assigned to joint candidates $\{\lambda_k^{(i)}\}_{k=1}^{K}$ or $\{\lambda_o^{(i)}\}_{o=0}^{I-1}$. Peripheral points Λ, M and N which lie within the circle of a radius ρ with the center $x_i$ are extracted as neighboring joints of $x_i$. These processes have been clarified so far.

[L. Joint Elimination Device 124]

The assembly of the joints sometimes includes needless joints. The needless joints are generated by various reasons, e.g. the noise inherently included in the original figures, the noise yielded from the optical input of the figures, etc. The needless joints will dissipate the capacity of memory and will degrade the quality of reproduced objects. The joint elimination device 124 removes the needless joints which are included in straight lines or arcs. Of course unnecessary joints are also contained in free curves. However, free curve has a probability including various partial lines. It is difficult to distinguish needless joints from necessary joints.

Figure 34:
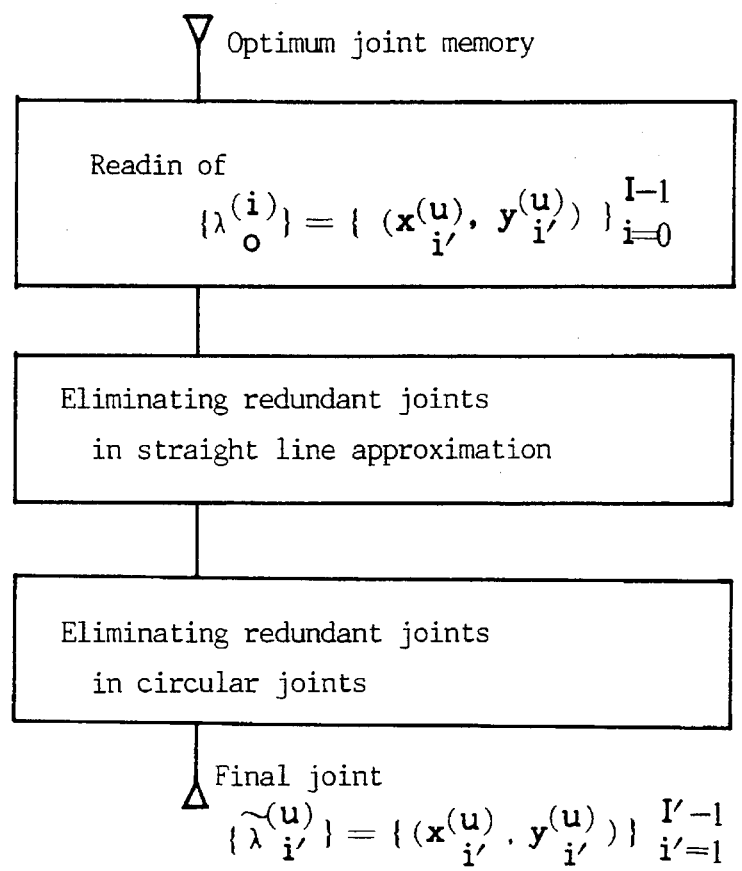
FIG. 34 is a flow chart for eliminating unnecessary joints and for determining optimum joints.

FIG. 34 is a flow chart for the elimination of needless joints. At first, the optimum joints $\{\lambda_o^{(i)}\}=\{(x_i^{(u)}, Y_i^{(u)})\}_{i=\square}^{I-1}$ are read-in from the optimum joint memory K into the joint elimination device. "i" is the number of joint in a series. "u" is the number of the peripheral point series. At the first stage, needless, redundant joints are eliminated from straight-lines. Then redundant joints in arcs are removed. The leftover joints are called final joints. Neither new joints are added to the final joints nor joints are removed from the final joints. The final joints are specified by the number "i" instead of "i". The final joint are memorized in a final joint memory as $(x_{i'}^{(u)}, y_{i'}^{(u)})$.

[Elimination of Redundant Joints of Straight Lines]

Figure 35:
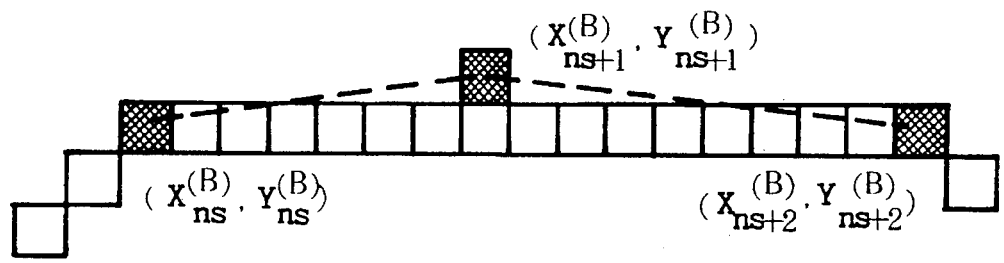
FIG. 35 is a figure of pixels for showing end joints and an intermediate joint which is now judged whether to be eliminated or not, when plural joints of straight line align in series.
Figure 36:
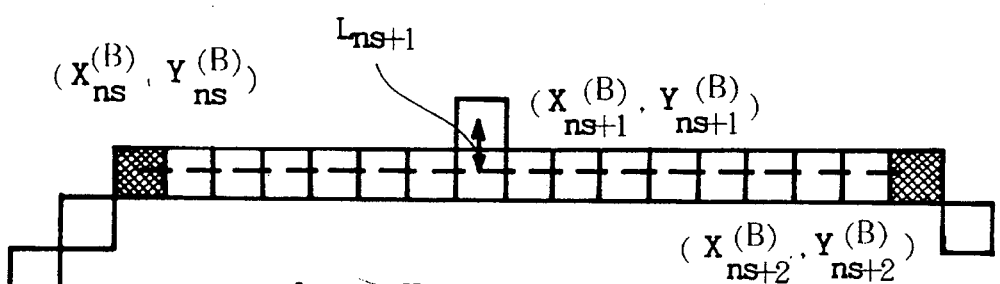
FIG. 36 is an explanatory figure denoting the elimination of the intermediate point, when the vertical line drawn from the intermediate joint is shorter than a threshold.

FIG. 35 shows an intermediate joints existing midway in a straight line. The coordinates of the joints are denoted by $(X_{i4}^{(B)}, Y_{i4}^{(B)})$. The joints are estimated one by one. When more than three joints lie in a straight line, the joints are designated by $i_4$=ns, ns+1, ns+2, respectively. End joints $(X_{ns}^{(B)}, Y_{ns}^{(B)})$ and $(X_{ns+2}^{(B)}, Y_{ns+2}^{(B)})$ are connected by a straight line. A vertical line is drawn from the intermediate joints $(X_{ns+1}^{(B)}, Y_{ns+1}^{(B)})$ to the straight line. $L_{ns+1}$ indicates the length of the vertical line. When the length of the vertical line is smaller than a predetermined constant $K_7$.

$$L_{ns+1} < K_7 \tag{58}$$

the intermediate joints shall be eliminated. FIG. 36 demonstrates the final state of the straight line after the intermediate joints has been removed and the end joints are connected by a straight line.

On the contrary, when the vertical line $L_{ns+1}$ is bigger than the constant $K_7$.

$$L_{ns+1} \geq K_7 \tag{59}$$

intermediate joints shall be maintained. Such an estimation is done for all joints of straight lines.

[Elimination of Joints of Arcs]

Figure 37:
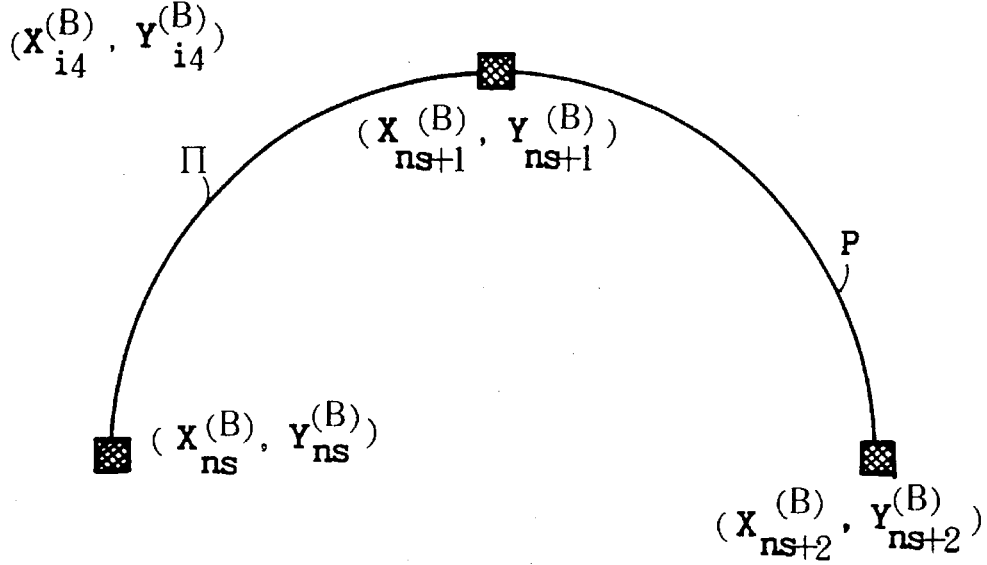
FIG. 37 is a figure for showing end joints and intermediate joint of circle which is now judged whether to be removed or not, when more than three joints lie along a circle.
Figure 38:
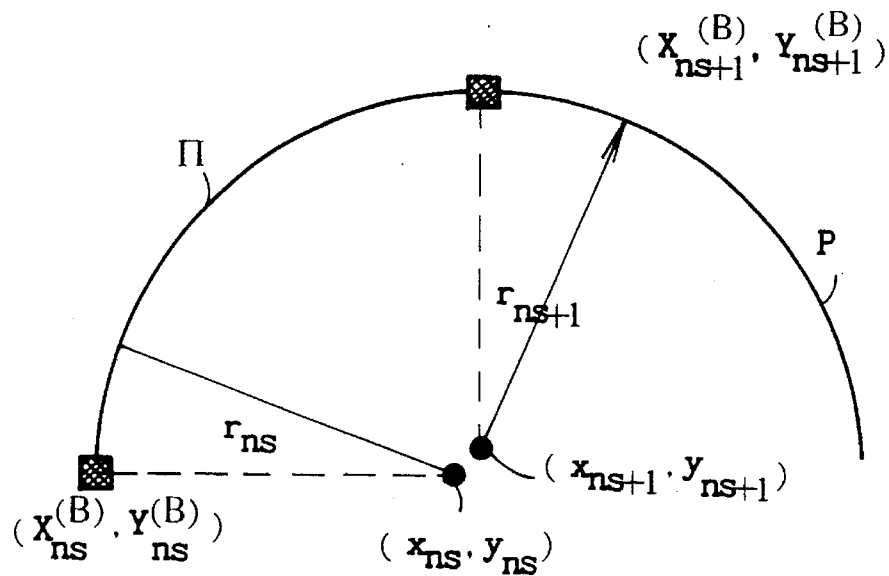
FIG. 38 is a figure showing the radius and center of the circle beginning from the first joint, and the radius and center of the circle beginning from the second joint.

Sometimes the joints which have been extracted for arcs so far included several joints which exist near an arc. In this case, if the intermediate joints is removed, the quality of the data of the arc is maintained. Therefore, the intermediate joints should be eliminated. The judgment whether the intermediate joints should be removed or not will be done as follows. FIG. 37 shows the case of the joints existing on an arc. The joint of the arc is denoted by $(X_{i4}^{(B)}, Y_{i4}^{(B)})$. $i_4$ is the joint number. As shown in FIG. 37, if three joints $(X_{ns}^{(B)}, Y_{ns}^{(B)})$ $(X_{ns+1}^{(B)}, Y_{ns+1}^{(B)})$ and $(X_{ns+2}^{(B)}, Y_{ns+2}^{(B)})$ exist along the arc, the elimination of the joint becomes into a question. An arc II starts from $(X_{ns}^{(B)}, Y_{ns}^{(B)})$. Another arc starts from $(X_{ns+1}^{(B)}, Y_{ns+1}^{(B)})$. As shown in FIG. 38, $r_{ns}$ and $r_{ns+1}$ indicate the radiuses of the arcs II and P. The coordinate of the centers of II and P are denoted by $(x_{ns}, y_{ns})$ and $(x_{ns+1}, y_{ns+1})$. Both arcs II and P shall be deemed as two parts of a single arc, when the following conditions are satisfied by the radiuses and coordinates of the centers, $$|r_{ns+1} - r_{ns}| < K_8 \tag{60}$$

$$\{(x_{ns+1} - X_{ns})^2 + (y_{ns+1} - y_{ns})^2\}^{1/2} < K_9 \tag{61}$$

Namely, if the centers are nearly the same points and the radiuses are nearly the same length, the two arcs II and P are deemed to be parts of the same arc. In this case, the intermediate joints $(X_{ns+1}^{(B)}, Y_{ns+1}^{(B)})$ should be removed as an unnecessary joint. If the inequalities (60) and (61) are not satisfied, the intermediate joint is maintained.

Such a judgment, elimination and maintenance will be done for all joints of all arcs. The thresholds of the radius difference and center difference should be properly predetermined in accordance with the purpose. Preferably "$K_8=1$ and $K_9=2$" is convenient in many cases. The above-mentioned processes can eliminate needless joints in straight lines or arcs. The elimination is not only effective to compress the data for storing but also profitable to heighten the quality of the data by revising the figures which are inherently straight lines or arcs to ideal shapes. The remaining joints are true, meaning joints. They are named final joints.

[M. Final Joint Memory 126]

Final joints which have been obtained by the eliminating needless joints are stored into a final joint memory 126. The data to be stored are coordinates $(x_{i'}^{(u)}, y_{i'}^{(u)}) i=\square^{I'-1}$, as shown at the bottom of FIG. 34.

[N. Data Approximation Device B 128]

Figure 39:
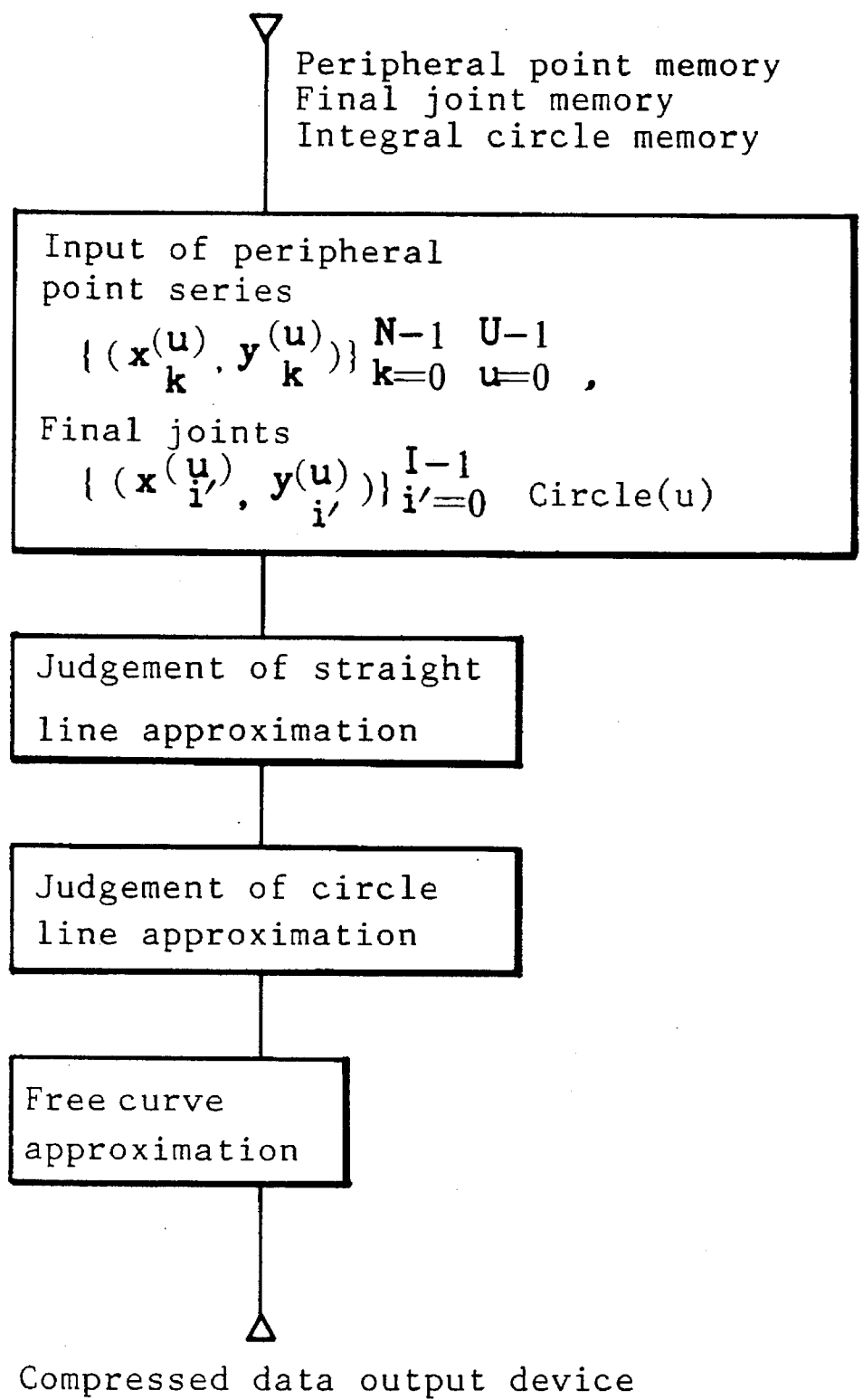
FIG. 39 is a flow chart for explaining the processes of inputting peripheral point groups, final joints and integral circles, approximating the data, and expressing the peripheral points by approximation functions.
Figure 40:
FIG. 40(*a*) depicts an original character "体(tai)" to be compressed and stored in a memory and FIG. 40(*b*) depicts a character "体(tai)" reproduced from the stored data according to this invention.
Figure 40:
Figure 41:
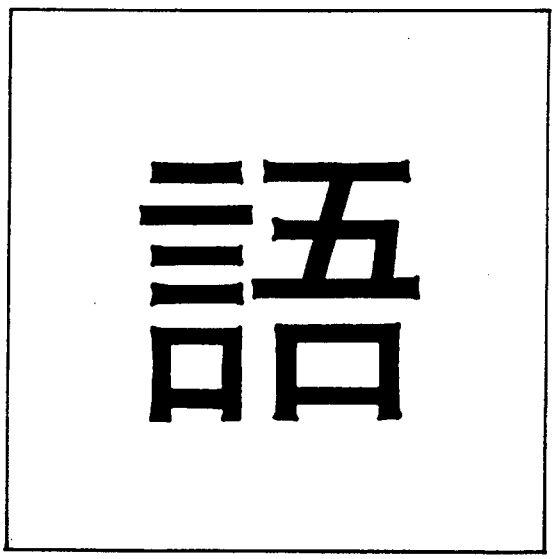
FIG. 41(*a*) depicts an original character "語(go)" to be compressed and stored in a memory and FIG. 41(*b*) depicts a character "語(go)" reproduced from the stored data according to this invention.
Figure 41:
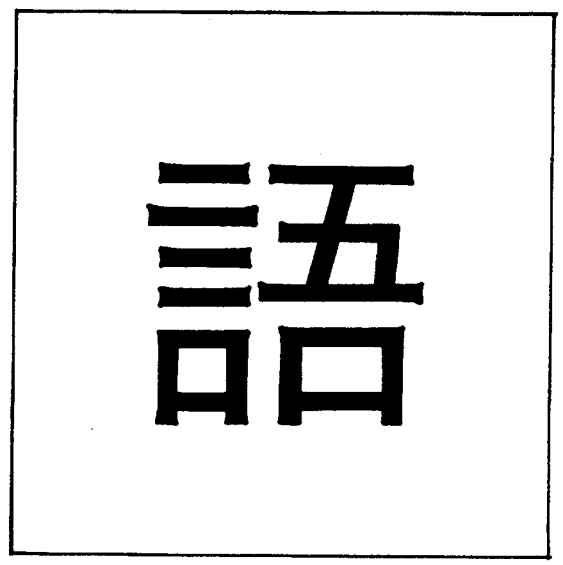
Figure 42A:
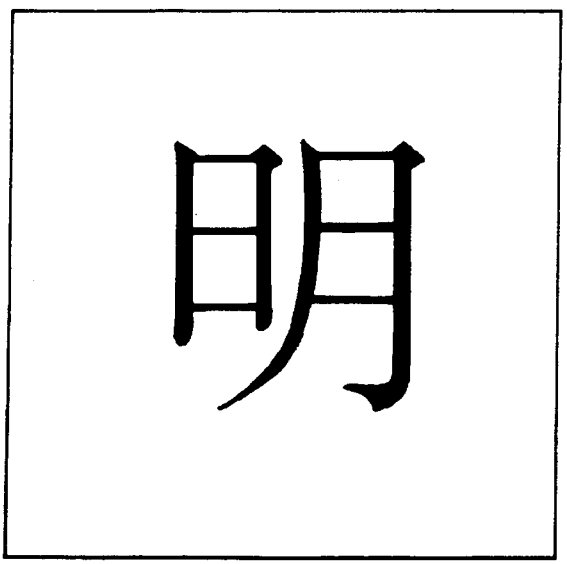
FIG. 42(*a*) depicts an original character "明(mei)" to be compressed and stored in a memory and FIG. 42(*b*) a character "明(mei)" reproduced from the stored data according to this invention.
Figure 42B:
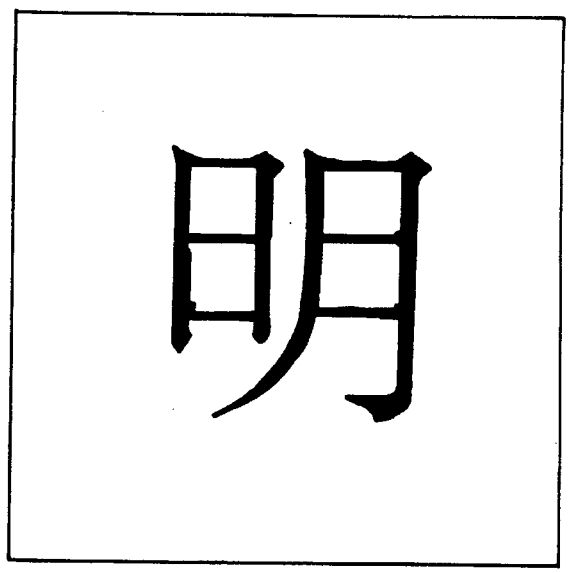

The data approximation device B 128 is a device which approximates the objects by the data, e.g. peripheral point series, final joints, integral circles, etc. This is one of the most important parts of this invention. FIG. 39 shows the data which are input to the data approximation device B.

Peripheral point series memory 104 . . . peripheral point series $\{(x_k^{(u)}, y_k^{(u)})\}_{k=0}^{N(u)-1} {}_{=0}^{(U-1)}$ Final joint memory 126 . . . final joints $\{(x_{i'}^{(u)}, y_{i'}^{(u)})\}_{i=0}^{I'-1}$ Integral circle memory 114 . . . circle (u)

where the suffix "u" is the number of peripheral point series, "k" is the number of the peripheral point in the series "u" and "N(u)" is the total number of peripheral point series "u". "i'" is the number of the final joint of the series "u". Since all final joints are known, the line between two neighboring final joints will be approximated with a straight line, an arc or a free curve. An intermediate variable t is used to express x-coordinate and y-coordinate. The lines are given by $s_x(t)$ and $s_y(t)$ in the intermediate variable expression. The operation is similar to the first approximation process which expressed the whole of the peripheral point series by a single set of piecewise polynomials. However, this time the definition region of polynomials is restricted between two neighboring joints. The scope of the variable t; the definition region of $s_x(t)$ and $s_y(t)$ are different from that of the previous approximation. In addition to the different scope, the shapes of the lines are known from the beginning of the approximation B. It has been known whether the line starting from a joint is a straight line, an arc or free curve, when the curvatures were calculated at all peripheral points.

Since the shapes of the lines have been memorized, the lines starting from arbitrary joints can be distinguished. If the curvatures at all points are 0, the line is a straight line. If the curvature at all points are the same definite value, the line is an arc. If the curvatures change in the peripheral point series, the line is a free curve. The preliminary classification of the shapes facilitates the determination of the parameters in the approximation calculation.

However, on the contrary, even if the result of the calculation of curvature is not memorized, this invention is also available, because the shapes of the curves can be classified at this stage.

[Approximation of Straight Lines]

The calculation of approximation of the definition region of a straight line is explained first. The definition region has been judged as a straight line at the stage of the extraction of joints. In this case, x-approximation function $s_x(t)$ is a first order function connecting the initial point $x_1$ and the final point $x_{n3}$. Similarly, the y-approximation function $s_y(t)$ is a first order function connecting the initial point $y_1$ and the final point $y_{n3}$. x-function and y-function are first order functions of t. The parameter determining the line is the proportional constant of $s_x(t)$ to $s_y(t)$. However, this proportional constant need not be memorized, because if the initial point $(x_1, y_1)$ and the final point $(x_{n3}, y_{n3})$ are known, a straight line can be drawn between two points. Further, the final point $(x_{n3}, y_{n3})$ will be given as the starting point at the next joint. Thus, the coordinate of the final point need not be memorized at the joint.

[Approximation of Arcs]

The approximation of the definition region of arcs is explained. The definition region has been judged as an arc at the stage of the extraction of joints. Approximation functions $s_x(t)$ and $s_y(t)$ indicating an arc can be represented by linear combinations of the trigonometric functions as follows;

$$S_x(t)=A_x\cos(2\pi t/(T/n_{arc}))+B_x\sin(2\pi t/(T/n_{arc}))+C_x \quad (62)$$

$$S_y(t)=A_y\cos(2\pi t/(T/n_{arc}))+B_y\sin(2\pi t/(T/n_{arc}))+C_y \quad (63)$$

where the definition region is $[0,T]$ for t, $n_{arc}$ is a ratio of the length of the arc to the length of the full circle. Namely, $n_{arc}$ is the quotient of the central angle divided by 360 degrees. For example, in the case of a fourth arc $n_{arc}$ is ¼. $2\pi n_{arc}$ is the central angle of the arc. The variable $2\pi t/(T/n_{arc})$ is the central angle of the arc from the beginning point to the current parameter t. $(C_x,C_y)$ is the coordinate of the center of the arc. $A_x$ and $B_y$ are constants defining the size of the arc. The approximation functions will signify an arc, if the parameters satisfy the following equations;

$$A_x^2+B_x^2=A_y^2+B_y^2 \quad (64)$$

$$B_y/A_y=B_x/A_x \quad (65)$$

The parameters determining the arc are the coefficients $A_x$, $B_x$, $C_x$, $A_y$, $B_y$, $C_y$ and $n_{arc}$ of the functions $s_x(t)$ and $s_y(t)$. If the definition region has been known as an arc from the beginning of the approximation, such parameters can be uniquely determined by the coordinate of the initial point, the final point the intermediate point and the curvature.

[Approximation of Free Curves]

The definition region which is neither a straight line nor an arc is approximated by a free curve. The line is also represented by the intermediate parameter t. A peripheral point has two dimensional coordinate $(x_{i3}^{(u)}, y_{i3}^{(u)})$. But the two dimensional coordinate is decoupled into the intermediate variable representation $(t_{i3}^{(u)}, x_{i3}^{(u)})$ and $(t_{i3}^{(u)}, y_{i3}^{(u)})$. "k" has been a parameter of peripheral points so far. But "k" is used to signify the number of pieces of a definition region from now. Thus, "i3" denotes the number of the peripheral points instead of "k". The total number of the peripheral points is denoted by "n3". The approximation functions $s_x(t)$ and $s_y(t)$ are developed on the basis of the second order Fluency functions $\phi_{k3}$. Fluency functions are explained in FIG. 46. The second order Fluency function has non-zero value only in three pieces. The definition region is $[0, T]$. The second order Fluency function is given by $$\phi_{k3}(t)=3(T/M)^{-2}\Sigma_{q=0}^3(-1)^q(t-\xi_{k+q})_+^2/\{(q!(3-q)!)\} \quad (66)$$

where M is the dimension of the function; the number of pieces included in the definition region. The function $s_x(t_{i3})$ and $s_y(t_{i3})$ are expressed by linear combination of the second Fluency functions with coefficients $c_k^{(x)}$ and $c_k^{(y)}$.

$$S_x(t_{i3})=\Sigma_{k=-2}^{M+2}c_k^x\phi_{k3}(t_{i3}) \quad (67)$$

$$S_y(t_{i3})=\Sigma_{k=-2}^{M+2}c_k^y\phi_{k3}(t_{i3}) \quad (68)$$

here, when $t > \xi_{k+q}$, $(t-\xi_{k+q})_+^2 = (t-\xi_{k+q})^2$ (69)

when $t \leq \xi_{k+q}$ $(t-\xi_{k+q})_+^2 = 0$ (70)

"$\xi_{k+q}$" is the coordinate of the pieces of the definition region T divided by M.

$$\xi_{k+q}=(k+q)\,T/M \quad (71)$$

The coefficients $c_k^{(x)}$ and $c_k^{(y)}$ shall be determined to approximate the peripheral points $(x_{i3}^{(u)}, y_{i3}^{(u)})$ by $s_x(t_{i3})$ and $s_y(t_{i3})$. The method of least squares estimates the error. Minimizing the error by the method of least squares gives preferable coefficients. The error Q is defined as a sum of squares of deviations;

$$Q=\Sigma_{i3=1}^{n3}|x_{i3}^{(u)}-s_x(t_{i3})|^2+\Sigma_{i3=1}^{n3}|y_{i3}^{(u)}-s_y(t_{i3})|^2 \quad (72)$$

The condition for minimizing the error Q gives the following sets of equations.

$$\Sigma_{k=-2}^{M+2}c_k^x\{\Sigma_{i3=1}^{n3}\phi_{k3}(t_{i3})\phi_{m3}(t_{i3})\}=\Sigma_{i3=1}^{n3}x_{i3}\phi_{m3}(t_{i3}) \quad (73)$$

$$\Sigma_{k=-2}^{M+2}c_k^y\{\Sigma_{i3=1}^{n3}\phi_{k3}(t_{i3})\phi_{m3}(t_{i3})\}=\Sigma_{i3=1}^{n3}y_{i3}\phi_{m3}(t_{i3}) \quad (74)$$

$$m=-2,-1,0,1,\ldots,M+2 \quad (75)$$

The coefficients $c_k^{(x)}$, and $c_k^{(y)}$ are obtained by solving the sets of equations. To estimate the validity of coefficients, maximum errors $\epsilon$ at all points should be calculated.

$$\epsilon=\max_{i3=0}^{n3}\{(x_{i3}^{(u)}-s_x(t_{i3}))^2-(y_{i3}^{(u)}-s_y(t_{i3}))^2\}^{1/2} \quad (76)$$

where the range of i3 in the maximum operation is from 0 to (n3−1). The maximum of error in the range is found by the operation. If $\epsilon$ is smaller than a constant, the approximation is valid. For example, the approximation is judged whether $\epsilon$ is smaller than 0.9 or not. If $\epsilon$ is larger than a constant, the similar approximation shall be done by increasing the dimension M to (M+1). When the dimension is raised, the precision of the approximation is heightened because the numbers or pieces and base Fluency functions increase. The error $\epsilon$ will eventually decrease less than 0.9 in the example. Then, the approximation calculation should be ended. The original free curve is approximated in a satisfactory degree.

[O. Compressed Date Output Device 130]

The peripheral point series of the original character font, logomarks, illustrations or figures have been separated to straight lines, integral circles, arcs and free curves as elementary lines by the processes mentioned so far. The elementary lines have starting points, final points, inclinations, centers and radiuses, etc. as the parameters defining the original objects. The elementary lines have different kinds of data to be stored.

In the case of a straight line, a flag which denotes the straight line and the coordinate of the starting point shall be stored. The coordinate of the final point is not stored at the stage, because the final point will be given as a starting point of the next definition region. The inclination of the straight line which is an important parameter is not also stored because the inclination will become clear by connecting the initial point and the next point.

In the case of an integral circle, the data can be obtained directly from the integral circle memory G. The data have been extracted by the first data approximation device A. The parameters of an integral circle are a flag indicating an integral circle, a coordinate of the initial point of arc, a ratio of arc (length of arc/full circle length), the number of peripheral points and the coefficients of the functions.

In the case of a free curve, the data are the dimension M of the base functions, the number of peripheral points, the middle points of the change of the free curve and the coefficients of the functions.

[P. Compressed Data Memory 132]

The compressed data memory 132 memorizes the data of straight lines, integral circles and free curves. The data will be output later at some suitable timing. This device compresses the data and stores the compressed data. The structures of the data stored in the compressed data memory 132 are shown in Table 1.

The sizes of the data are explained now. A straight line connecting two neighboring joints requires one byte for a flag indicating a straight line and two bytes for an initial joint coordinate (x,y). Thus a straight line requires three bytes in all. An arc connecting two neighboring joints demands one byte for a flag indicating an arc, two bytes for coordinates of an initial points, four bytes for signifying the center angle of the arc, one byte for indicating the number of peripheral points and twelve bytes for designating the coefficients of the approximation functions. Thus, an arc needs twenty bytes in all. In the case of a free curve, the line demands one byte for the dimension M, one byte for the number of peripheral points, two bytes for signifying the center of the change of peripheral points and 2M bytes for the coefficients of the approximation function. Therefore, a free curve needs 4+2M bytes in all.

The periphery reproduction device 134, the character • logomark • illustration reproduction device 136 and the reproduced data output device 138 construct together a reproduced data generation device 140 which can reproduce any original objects into any size of reproduced ones.

TABLE 1

| Data structure produced by this invention | | |
|---|---|---|
| | Contents | size (Byte) |
| Line between joints is a straight line | 1. A flag denoting a straight line | 1 per line |
| | 1. A coordinate of an initial point | 2 per line |
| Line between joints is an arc | 1. A flag denoting an arc | 1 per line |
| | 1. A coordinate of an initial point | 2 per line |
| | 1. A ratio $n_{arc}$ of arc to full circle ($\frac{1}{4} \leq n_{arc} \leq 1$) | 4 per line |
| | 1. Number of peripheral points | 1 per line |
| | 1. Coefficients of approximating functions (six) | 12 per line |
| Line between joints is a free curve | 1. Dimension M of base functions ($M \geq 3$) | 1 per line |
| | 1. Number of peripheral points | 1 per line |
| | 1. Center of change of Curve ($\mu_x, \mu_y$) | 2 per line |
| | 1. Coefficients of approximating functions $C_x, C_y$ | 2M per line |

[R. Periphery Reproduction Device 134]

The periphery reproduction device 134 reproduces peripheral lines of the character font, logomarks or illustrations from the compressed data stored in the memory 132. The kinds of peripheral lines are straight lines, integral line, arcs and free curves.

[Reproduction of a Straight Line]

A straight line is reproduced by connecting the initial point with the joint of the next definition region by a straight line. The data of the inclination is unnecessary.

[Reproduction of an Integral Circle]

An integral circle can be reproduced by depicting a circle having the radius and the center output from the memory 132.

[Reproduction of an Arc]

An arc can be reproduced by substituting data ($A_x$, $B_x$, . . . ) into the following equations;

$$S_x(t) = A_x \cos\{2\pi t/(T/n_{arc})\} + B_x \sin\{2\pi t/(T/n_{arc})\} + C_x \quad (77)$$

$$S_y(t) = A_y \cos\{2\pi t/(T/n_{arc})\} + B_y \sin\{2\pi t/(T/n_{arc})\} + C_y \quad (78)$$

The coordinates x and y are obtained from $S_x(t)$ and $S_y(t)$ by changing the intermediate parameter t in the definition region [0, T].

[Reproduction of a Free Curve]

The value of the base function $\phi_k$ at a sampling point $t_i$ which lies within the piece [(L−1)/(T/M), L(T/M)] ($1 \leq L \leq M$) is given by;

$$\phi_k(t_i) = 0.5p^2 \quad k = L \quad (79)$$
$$\phi_k(t_i) = p(1-p) + 0.5 \quad k = L+1 \quad (80)$$
$$\phi_k(t_i) = 1 - \phi_L(t_i) - \phi_{L+1}(t_i) \quad k = L+2 \quad (81)$$
$$\phi_k(t_i) = 0 \quad k \leq L-1, L=3 \leq k \quad (82)$$

where $p = L - t_i M/T$. The coefficients $C_k^{(x)}$ and $C_k^{(y)}$ have been output from the memory 132. Thus the approximation function $S(t_i)$ is given by the linear combination of base functions $\phi_k$ with the output coefficients;

$$S(t_i) = \Sigma_{k=L}^{L+2} C_k \phi_k(t_i) \quad (83)$$

[S. Character • Logomark • Illustration Reproduction Device 136]

The peripheral lines have been reproduced by the preceding processes. The inner parts of the closed peripheral lines are filled with black pixels. Then, original characters, logomarks or illustrations are reproduced. Otherwise, the outer parts of closed peripheral lines are replaced by black pixels. Then, a reversed figure is reproduced.

[T. Reproduced Data Output Device 138]

For example, in order to reproduce an image of the object from the coefficients of the functions, a layout editor which can designate the size of the reproduced image from 1 mm square to A4 size can be used. The produced image is printed by a laser printer with 300 DPI fineness or a laser printer with 600 DPI fineness. Otherwise, the image can be reproduced by a cutting plotter or laser cutter with 400 DPI fineness. The character font, logomarks or illustrations have been memorized in the form of the coefficients of the functions. The position of the reproduced image can be arbitrary designated. Thus, this invention can output the reproduced image with arbitrary size at an arbitrary position on a sheet of paper, plastic cloth, etc. The whole of the above-mentioned devices can be installed by a program using C-language into a PC-9801DA equipped with a numerical operation processor of floating point. In order to examine the effects of the invention, the data were compressed by the method of this invention with regard to Ming-cho type "明", "体", Gothic type "語" and other characters of JIS first level. The results are shown in Table 2.

Figure 43A:
FIG. 43(*a*) depicts an original illustration of a sixteenth note to be compressed and stored in a memory and FIG. 43(*b*) depicts a final illustration of a sixteen note reproduced from the stored data according to this invention.
Figure 43B:

FIGS. 40(a) to FIG. 42(b) show the original characters of "明", "体" and "語", and the reproduced characters by a 300 DPI printer according to this invention. The characters have been reproduced with a high fidelity. Furthermore, the music note of FIG. 43(a), the circular graph of FIG. 44(a) and the tobacco of FIG. 45(a) were treated by this invention. The result is shown in Table 3.

TABLE 2

Quantity of data, Compression ratio, Time for compression (character font data)

|  | Quantity of Data (Byte) | Compression ratio (%) | Compression time (sec.) |
| --- | --- | --- | --- |
| Ming-Cho Type |  |  |  |
| 「明」 (Mei) Ming-Cho Type | 317 | 3.87 | 2.67 |
| 「体」 (Tai) Gothic Type | 452 | 5.52 | 1.51 |
| 「語」 (Go) | 184 | 2.25 | 4.01 |
| Average JIS first level (Ming-Cho Type) | 363 | 4.43 | 3.21 |

TABLE 3

Quantity of data, Compression ratio, Time for compression (logomarks, illustrations)

|  | Quantity of Data (Byte) | Compression ratio (%) | Compression time (sec.) |
| --- | --- | --- | --- |
| Music Note | 135 | 1.65 | 12.23 |
| Circular Graph | 284 | 3.47 | 8.66 |
| Tobacco | 264 | 3.22 | 8.48 |
| Average of 50 figures | 251 | 3.06 | 11.06 |

Further, original figures and their reproduced figures are exhibited in FIGS. 43(a), 43(b), FIGS. 44(a), 44(b), FIGS. 45(a), 45(b) and FIGS. 50(a), 50(b). The reproduced figures are excellent. It is difficult to distinguish the original figures from the reproduced ones.

Table 2 and Table 3 indicate the quantity of the data compressed (bytes), compression ratio (%), and the time (sec) for compression. The compression rate is defined as the quotient of the compressed data quantity divided by the original image quantity (nearly 8 kbytes). The quotient is multiplied by 100 in order to express the compression rate in percent. The original figures, for example, are read in by an optical image reader (image scanner) with a read-in window of 256 pixels×256 pixels. In the case, the original image data are about 8 kbytes. The quantity of the data is reduced to 300 bytes to 500 bytes in the case of character font or to 100 bytes to 300 bytes in the case of illustrations by the method of this invention. Therefore, the compression rate is 2% to 6% in this invention. This invention succeeds in extremely reducing the quantity of image data. The time for compression is several seconds per one character or one illustration. It is a very short time. Here, the compression time is the CPU time including the time for dividing and synthesizing data and the time for converting the compressed data into graphic data. This invention is featured by small quantity of stored data and short processing time. Especially, printing letters can be treated in a very short time by this invention, because most of the printing letters are mainly built by segments of straight lines which are extracted as clear-cut joints at the first stage of operations. The printing letters have few joints which shall be chosen and modified at the later stage of operations.

[U. Image Memory 2]

The reproduced character font, logomarks and illustrations are stored in the image memory 2 (U) 142 as it is. This memory means all devices which memorize the characters, illustrations or logomarks output by a printer. A video camera can be utilized for the memory. A printed sheet of paper is another type of image memory. This invention can dispense with the image memory 142.

What I claim is:

1. An apparatus for inputting, compressing and outputting characters, illustrations, drawings and logomarks comprising:

an image scanner for reading in characters, illustrations, drawings or logomarks as an image on an image screen having pixels arranged in a matrix on which a two-dimensional coordinate is defined, an image memory for memorizing the image as a binary image defined on the pixels, a peripheral point extraction device for extracting peripheral points and peripheral point series from the memorized image and representing the peripheral points by the series number and the two-dimensional coordinate defined on the pixels, a peripheral point memory for memorizing the series number and the two-dimensional coordinate (X,Y) of the peripheral points, a first data approximation device for approximating x-coordinates and y-coordinates of the peripheral points by piecewise polynomials $S_x(t)$ and $S_y(t)$ based upon Fluency functions having an intermediate variable t until an error between the coordinates and the approximating polynomials at the peripheral points decreases below a predetermined threshold, a curvature calculation device for calculating curvatures at all peripheral points by differentiating the piecewise polynomials $S_x(t)$ and $S_y(t)$, an integral circle extraction device for extracting integral circles from the curvatures, a joint position extraction device for extracting temporary joints which are peripheral points having a larger curvature than a threshold, a second data approximation device for approximating the peripheral lines between two neighboring joints by a straight line firstly and by an arc secondly, the second data approximating device approximating x-coordinates and y-coordinates of the peripheral line by piecewise polynomials $S_x(t)$ and $S_y(t)$ based on Fluency functions of dimension M with an intermediate variable t, if an error of approximation by a straight line or an arc is larger than a predetermined constant, the second data approximation device approximating the same line by higher dimensional piecewise polynomials, if the error is still larger than the constant, till the error decreases below a predetermined constant, a compressed data memory for memorizing the coordinates of the joints and the parameters approximating the lines between neighboring joints, a peripheral line reproduction device for reproducing the peripheral closed lines from the data of the joints and the parameters approximating the lines, a reproduction device for reproducing characters, illustrations, drawings and logomarks by giving different colors to inner regions within the peripheral closed lines and to outer regions, and a reproduction data output device for outputting the reproduced data as real characters, drawings, illustrations or logomarks on paper, plastic sheet or other medium.

2. An apparatus as claimed in claim 1, wherein the first data approximation device approximates x-coordinates and y-coordinates of the peripheral line by $S_x(t)$ and $S_y(t)$ which are represented as linear combinations of the second order Fluency functions $\phi_h(t)$ with coefficients $C_h^{(x)}$ and $C_h^{(y)}$:

$$S_x(t) = \sum_{h=-2}^{M+2} C_h^{(x)} \phi_h(t)$$

$$S_y(t) = \sum_{h=-2}^{M+2} C_h^{(y)} \phi_h(t)$$

$$\phi_h(t) = 3(T/M)^{-2} \sum_{q=0}^{3} (-1)^q \{t - (h+q)(T/M)\}_+^2 / \{q!(3-q)!\}$$

where M is a dimension of Fluency functions, T is a definition region of t which is equal to the full length of a peripheral line of a peripheral point series.

3. An apparatus as claimed in claim 2, wherein the first data approximation device estimates the approximation by a sum Q of squares of deviations of $S_x(t)$ and $S_y(t)$ from x-coordinates and y-coordinates at all peripheral points:

$$Q = \sum_{k=0}^{N(u)-1} [\{S_x(t_k^{(u)}) - x_k^{(u)}\}^2 + \{S_y(t_k^{(u)}) - y_k^{(u)}\}^2]$$

where u is a number of the series, k is a number of the peripheral points, $x_k^{(u)}$ and $y_k^{(u)}$ are coordinates of the k-th point of the u-th series, $t_k^{(u)}$ is a value of t at the k-th point of the u-th series, and the first data approximation device repeats the approximation by raising dimension M by one, until the sum Q decreases below a constant $\epsilon$.

4. An apparatus claimed in claim 3, wherein the first data approximation device defines a matrix G of products of two Fluency functions, vectors $c_x$ and $c_y$ of coefficients and vectors $C_x$ and $C_y$ of sums of products of a Fluency function and a coordinate as:

$$G = \{G_{hw}\} = \left\{ \sum_{k=0}^{N(u)-1} \phi_h(t_k^{(u)}) \phi_w(t_k^{(u)}) \right\}$$

$$c_x = {}^T\{C_{-2}^{(x)}, C_{-1}^{(x)}, \ldots, C_{M+1}^{(x)}, C_{M+2}^{(x)}\}$$

$$b_x = {}^T\left\{ \sum_{k=0}^{N(u)-1} \phi_{-2}(t_k^{(u)}) x_k^{(u)}, \sum_{k=0}^{N(u)-1} \phi_{-1}(t_k^{(u)}) x_k^{(u)}, \ldots, \right.$$

$$\left. \sum_{k=0}^{N(u)-1} \phi_{M+1}(t_k^{(u)}) x_k^{(u)}, \sum_{k=0}^{N(u)-1} \phi_{M+2}(t_k^{(u)}) x_k^{(u)} \right\}$$

$$c_y = {}^T\{C_{-2}^{(y)}, C_{-1}^{(y)}, \ldots, C_{M+1}^{(y)}, C_{M+2}^{(y)}\}$$

$$b_y = {}^T\left\{ \sum_{k=0}^{N(u)-1} \phi_{-2}(t_k^{(u)}) y_k^{(u)}, \sum_{k=0}^{N(u)-1} \phi_{-1}(t_k^{(u)}) y_k^{(u)}, \ldots, \right.$$

$$\left. \sum_{k=0}^{N(u)-1} \phi_{M+1}(t_k^{(u)}) y_k^{(u)}, \sum_{k=0}^{N(u)-1} \phi_{M+2}(t_k^{(u)}) y_k^{(u)} \right\}$$

and the data approximation device obtains the coefficients by matrix equations:

$$c_x = G^{-1} b_x$$

$$c_y = G^{-1} b_y.$$

5. An apparatus as claimed in claim 4, wherein the curvature K(t) at a peripheral point $(x_k^{(u)}, y_k^{(u)})$ is calculated from the approximating equations $S_x(t)$ and $S_y(t)$ as;

$$K(t_k^{(u)}) = \{S_x'(t_k^{(u)}) S_y''(t_k^{(u)}) - S_x''(t_k^{(u)}) S_y'(t_k^{(u)})\} \{S_x'(t_k^{(u)})^2 + S_y'(t_k^{(u)})^2\}^{-3/2}$$

6. An apparatus as claimed in claim 5, wherein the integral circle extraction device calculates an average curvature $K^{(u)} = \{\sum_{k=0}^{N(u)-1} K(t_k^{(u)})\}/N(u)$ and compares the curvatures at all points with the average curvature, and the integral extraction device judges the peripheral point series as an integral circle, if the absolute value of the difference is smaller than $\epsilon_2$ at all points $$|K^{(u)} - K(t_k^{(u)})| < \epsilon_2.$$

7. An apparatus as claimed in claim 5, wherein the joint position extracting device compares the curvatures of all peripheral points with a threshold $\delta$ and designates the peripheral points which satisfy inequality $|K(t_k^{(u)})| > \delta$ as temporary joints.

8. An apparatus as claimed in claim 1, wherein an optimum joint extraction device defines the temporary joints lying at a distance less than $\rho$ from an outstanding joint and belonging to either the same peripheral point series of the outstanding temporary joint $x_1$ or an inner peripheral point series encircled by the peripheral point series of the outstanding temporary joint $x_i$ as neighboring joints $x_j$ of the outstanding temporary joint $x_i$, the optimum joint extraction device defines $2\alpha+1$ peripheral points on both sides of the temporary joints as joint candidates, and optimum joints are selected from joint candidates near the temporary joints by the optimum joint extraction device in order to give the smoothest curve connecting four joint candidates belonging to four neighboring temporary joints or to give the smoothest curve connecting three joint candidates belonging to three neighboring temporary joints.

9. An apparatus as claimed in claim 8, wherein the optimum joint extraction device defines the neighboring joint $x_j$ which lies at a top of an arrow drawn tangentially in the direction of tracing along a peripheral line just behind the outstanding temporary joint $x_i$ as an input neighbor, and defines the neighboring joint which lies at a tall of an arrow drawn tangentially in the direction of tracing along a peripheral line just before the outstanding temporary joint $x_i$ as an output neighbor and the input neighbor and output neighbor are memorized in a memory.

10. An apparatus as claimed in claim 9, wherein the optimum joint extraction device estimates smoothness of the curve connecting the outstanding temporary joint, the neighboring joint, a preceding joint and a succeeding joint of the joints by the number of points of inflection.

11. An apparatus as claimed in claim 9, wherein the optimum joint extraction device gives initial probabilities $P_i'(o)$ to joint candidates $\lambda_o^{(i)}$, calculates first probabilities $P_i^{(1)}(o)=P_i'(o)/\{\Sigma_{o=o}^{2a+1} P_i'(i)\}$, predetermines fitness coefficients $r_{ij})o]=\min \{(c_3M+c_4\epsilon)^{-1}, 1\}$, where $c_3$ and $c_4$ are constants, M is the dimension and $\epsilon$ is the error at the end of interpolation of four points by Fluency functions, calculates $q_i^{input}(o)=\max \{r_{ij}(o])P_j^{(t)}(l)\}$ in an input neighbor, $q_i^{output}(o)=\max \{r_{ij}(o])P_j^{(t)}(l)\}$ in an output neighbor, obtains $Q_i^{(t)}(o)=q_i^{input}(o)+q_i^{output}(o)$, calculates probabilities $P_i^{(t+1)}(o)=P_i^{(t)}(o)Q_i^{(t)}(o)/\{\Sigma_{o=o}^{2a+1} P_i^{(t)}(o)Q_i^{(t)}(o)\}$ repeatedly till t reaches a certain time, and assigns the joint candidate which has the greatest probability as the optimum joint.

12. An apparatus as claimed in claim 9, wherein the optimum joint extraction device estimates smoothness of the curve connecting the outstanding temporary joint, the neighboring joint, a preceding joint and a succeeding joint of the joints by the maximum curvature of the curve.

13. An apparatus as claimed in claim 1, wherein a joint eliminating device removes needless joints without which the peripheral points can be approximated by piecewise polynomials with little error.

14. An apparatus as claimed in claim 13, wherein if a straight line $(X_{ns}^{(B)}, Y_{ns}^{(B)})-(X_{ns+1}^{(B)}, Y_{ns+1}^{(B)})$ and another straight line $(x_{ns+1}^{(B)}, Y_{ns+1}^{(B)})-(X_{ns+2}^{(B)}, Y_{ns+2}^{(B)})$ join at an intermediate temporary joint $(X_{ns+1}^{(B)}, Y_{ns+1}^{(B)})$ with an obtuse angle, and the distance $L_{ns+1}$ from the intermediate temporary joint to a straight line connecting end joints $(X_{ns}^{(B)}, Y_{ns}^{(B)})$ and $(X_{ns+2}^{(B)}, Y_{ns+2}^{(B)})$ is smaller than a constant $K_7$, the intermediate joint $(X_{ns+1}^{(B)}, Y_{ns+1}^{(B)})$ shall be eliminated.

15. An apparatus as claimed in claim 13, wherein if an arc $(X_{ns}^{(B)}, Y_{ns}^{(B)})-(X_{ns+1}^{(B)}, Y_{ns+1}^{(B)})$ and another arc $(X_{ns+1}^{(B)}, Y_{ns+1}^{(B)})-(X_{ns+2}^{(B)}, Y_{ns+2}^{(B)})$ join at an intermediate temporary joint $(X_{ns+1}^{(B)}, Y_{ns+1}^{(B)})$ with an obtuse angle, and the radiuses $r_{ns}$ and $r_{ns+1}$ and the centers $(x_{ns}, y_{ns})$ and $(x_{ns+1}, y_{ns+1})$ of the arcs satisfy inequalities $|r_{ns+1}-r_{ns}|<K_8$ and $|(x_{ns+1}-x_{ns})^2+(y_{ns+1}-y_{ns})^2|^{1/2}<K_9$, the intermediate temporary joint $(X_{ns+1}^{(B)}, Y_{ns+1}^{(B)})$ shall be eliminated.

16. An apparatus as claimed in claim 1, wherein the reproduction data output device is a laser printer which draws reproduced characters, figures, drawings or logomarks on paper or on plastic.

17. An apparatus as claimed in claim 1, wherein the reproduction data output device is a cutting plotter which cuts a plastic sheet a paper sheet or metal sheet along the reproduced peripheral lines in order to produce a cut sheet with an outline similar to the original character, drawing, figure or logomark.

18. An apparatus for inputting, compressing and outputting characters, illustrations, drawings and logomarks comprising:

an image scanner for reading in characters, illustrations, drawings or logomarks as an image on an image screen having pixels arranged in a matrix on which a two-dimensional coordinate is defined, an image memory for memorizing the image as a binary image defined on the pixels, a peripheral point extraction device for extracting peripheral points and peripheral point series from the memorized image and representing the peripheral points by the series number and the two-dimensional coordinate defined on the pixels, a peripheral point memory for memorizing the series numbers and the two-dimensional coordinate (X,Y) of the peripheral points, a first data approximation device for approximating x-coordinates and y-coordinates of the peripheral points by piecewise polynomials $S_x(t)$ and $S_y(t)$ based upon Fluency functions having an intermediate variable t until an error between the coordinates and the approximating polynomials at the peripheral points decreases below a predetermined threshold, a curvature calculation device for calculating curvatures at all peripheral points by differentiating the piecewise polynomials $S_x(t)$ and $S_y(t)$, an approximate curvature memory for storing the curvatures at all peripheral points, an integral circle extraction device for extracting integral circles from the curvatures, an integral circle memory for storing data of radiuses and coordinates of the center of integral circles, a joint position extraction device for extracting temporary joints which are peripheral points having a larger curvature than a threshold, a joint position memory for storing the coordinates of the joints and the numbers of the series, an optimum joint extraction device for selecting optimum joints from joint candidates near the temporary joints which give the smoothest curve connecting four joints candidates belonging to four neighboring temporary joints, an optimum joint memory for storing the coordinates of the optimum joints and the numbers of the series, a joint eliminating device for removing needless joints without which the peripheral points can be approximated by piecewise polynomials with little error, a final joint memory for memorizing the coordinates of the final joints and the number of the series, a second data approximation device for approximating the peripheral lines between two neighboring joints by a straight line firstly and by an arc secondly, the second data approximation device approximating x-coordinates and y-coordinates of the peripheral line by piecewise polynomials $S_x(t)$ and $S_y(t)$ based on Fluency functions of dimension M with an intermediate variable t, if an error of approximation by a straight line or an arc is larger than a predetermined constant, the second data approximation device approximating the same line by higher dimensional piecewise polynomials, if the error is still larger than the constant, until the error decreases below the predetermined constant, a compressed data memory for memorizing the coordinates of the joints and the parameters-approximating the lines between neighboring joints, a peripheral line reproduction device for reproducing the peripheral closed lines from the data of the joints and the parameters approximating the lines, a reproduction device for reproducing characters, illustrations, drawings and logomarks by giving different colors to inner regions within the peripheral closed lines and to outer regions, and a reproduction data output device for outputting the reproduced data as real characters, drawings, illustrations or logomarks on paper, plastic sheet or other medium.

19. A method for inputting, compressing and outputting characters, illustrations, drawings and logomarks comprising the steps of:

inputting characters, illustrations, drawings or logomarks by an image scanner as an image on an image screen having pixels arranged in a matrix on which a two-dimensional coordinate is defined, memorizing the image as a binary image defined on the pixels by an image memory, extracting peripheral points and peripheral point series from the memorized image, representing the peripheral points by the series number and the two-dimensional coordinate defined on the pixels, memorizing the series number and the two-dimensional coordinates (X,Y) of the peripheral points, approximating x-coordinates and y-coordinates of the peripheral points by piecewise polynomials $S_x(t)$ and $S_y(t)$ based upon Fluency functions having an intermediate variable t till an error between the coordinates and the approximating polynomials at the peripheral points decreases below a predetermined threshold, calculating curvatures at all peripheral points by differentiating the piecewise polynomials $S_x(t)$ and $S_y(t)$, extracting integral circles from the curvatures, extracting temporary joints which are peripheral points having a larger curvature than a threshold, selecting optimum joints from joint candidates near the temporary joints which give the smoothest curve connecting four joints candidates belonging to four neighboring temporary joints, removing needless joints without which the peripheral points can be approximated by piecewise polynomials with little error, approximating the peripheral lines between two neighboring joints by a straight line firstly and by an arc secondly, approximating x-coordinate and y-coordinate of the peripheral line by piecewise polynomials $S_x(t)$ and $S_y(t)$ based on Fluency functions of dimension M with an intermediate variable t, if an error of approximation by a straight line or an arc is larger than a predetermined constant, approximating the same line by higher dimensional piecewise polynomials, if the error is still larger than the predetermined constant, till the error decreases below a predetermined constant, memorizing the coordinates of the joints and the parameters approximating the lines between neighboring joints, reproducing the peripheral closed lines from the data of the joints and the parameters approximating the lines, reproducing characters, illustrations, drawings and logomarks by giving different colors to inner regions within the peripheral closed lines and to outer regions, and outputting the reproduced data as real characters, drawings, illustrations or logomarks on paper, plastic sheet or other medium.

20. A method as claimed in claim 19, wherein if the line between two neighboring joints is a straight line, the data to be stored are a flag for Indicating a straight line, and a coordinate of the initial joint.

21. A method as claimed in claim 19, wherein if the line between two neighboring joints is an arc, the data to be stored are a flag for indicating an arc, a coordinate of the initial joint, a ratio of an arc length to a full circle length, a number of peripheral points on the arc and coefficients of approximating functions.

22. A method as claimed in claim 19, wherein if the line between two neighboring joints is a free curve, the data to be stored are a dimension of Fluency functions, a number of peripheral points on the free curve, a center of change of the free curve and coefficients of approximating functions.

\* \* \* \* \*